United States Patent
Abedini et al.

(10) Patent No.: US 12,431,996 B2
(45) Date of Patent: Sep. 30, 2025

(54) TECHNIQUES TO FACILITATE MULTIPLEXING UPLINK SIGNALS OF A REPEATER

(71) Applicant: QUALCOMM Incorporated, San Diego, CA (US)

(72) Inventors: Navid Abedini, Basking Ridge, NJ (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 117 days.

(21) Appl. No.: 18/328,684

(22) Filed: Jun. 2, 2023

(65) Prior Publication Data

US 2024/0056208 A1 Feb. 15, 2024

Related U.S. Application Data

(60) Provisional application No. 63/371,208, filed on Aug. 11, 2022.

(51) Int. Cl.
  *H04J 1/08* (2006.01)
  *H04B 7/01* (2006.01)
  *H04L 5/02* (2006.01)

(52) U.S. Cl.
  CPC .................. *H04J 1/08* (2013.01); *H04B 7/01* (2013.01); *H04L 5/023* (2013.01)

(58) Field of Classification Search
  None
  See application file for complete search history.

(56) References Cited

U.S. PATENT DOCUMENTS

| | | | | |
|---|---|---|---|---|
| 11,510,166 B1* | 11/2022 | Abedini | ............ | H04W 56/0075 |
| 11,864,218 B1* | 1/2024 | Kwok | ................. | H04W 72/541 |
| 2022/0015095 A1* | 1/2022 | Liu | ........................ | H04L 5/1469 |
| 2022/0103247 A1* | 3/2022 | Abedini | ............... | H04B 7/2041 |
| 2023/0283348 A1* | 9/2023 | MolavianJazi | ...... | H04B 7/0695 |
| 2023/0354127 A1* | 11/2023 | Fazili | .................. | H04W 72/046 |

(Continued)

FOREIGN PATENT DOCUMENTS

| | | |
|---|---|---|
| TW | 202337257 A * | 9/2023 |
| WO | WO-2023204543 A1 * | 10/2023 |

(Continued)

*Primary Examiner* — Kodzovi Acolatse
(74) *Attorney, Agent, or Firm* — Procopio, Cory, Hargreaves & Savitch LLP

(57) ABSTRACT

Apparatus, methods, and computer-readable media for facilitating multiplexing of uplink signals at a repeater are disclosed herein. An example, a method for wireless communication at a repeater, includes obtaining a first uplink signal associated with a UE. The example method also includes providing a first uplink communication including the first uplink signal multiplexed with a second uplink signal, the second uplink signal being associated with an MT component of the repeater. Additionally, the example method includes obtaining a multiplexing configuration based in part on at least one of a phase distortion and a power mismatch associated with the first uplink communication. The example method also includes providing a second uplink communication based in part on the multiplexing configuration, the second uplink communication including a third uplink signal multiplexed with a fourth uplink signal.

27 Claims, 22 Drawing Sheets

(56) References Cited

U.S. PATENT DOCUMENTS

| | | | |
|---|---|---|---|
| 2023/0371123 A1* | 11/2023 | Lee | H04L 1/1854 |
| 2024/0023035 A1* | 1/2024 | He | H04W 52/36 |
| 2024/0040591 A1* | 2/2024 | Babaei | H04W 72/25 |

FOREIGN PATENT DOCUMENTS

| | | | |
|---|---|---|---|
| WO | WO-2023211334 A1 * | 11/2023 | H04B 7/15571 |
| WO | WO-2024028280 A1 * | 2/2024 | |
| WO | WO-2024096051 A1 * | 5/2024 | |
| WO | WO-2024171947 A1 * | 8/2024 | |
| WO | WO-2024171948 A1 * | 8/2024 | |

\* cited by examiner

TECHNIQUES TO FACILITATE MULTIPLEXING UPLINK SIGNALS OF A REPEATER

CROSS REFERENCE TO RELATED APPLICATION(S)

This application claims the benefit of and priority to U.S. Provisional Application Ser. No. 63/371,208, entitled "TECHNIQUES TO FACILITATE MULTIPLEXING UPLINK SIGNALS OF A NETWORK-CONTROLLED REPEATER" and filed on Aug. 11, 2022, which is expressly incorporated by reference herein in its entirety.

TECHNICAL FIELD

The present disclosure relates generally to communication systems, and more particularly, to wireless communication employing a repeater.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication. An apparatus may include a network entity, such as a base station. The example apparatus may obtain a first uplink communication including a first uplink signal multiplexed with a second uplink signal, the first uplink signal associated with a user equipment (UE) and the second uplink signal associated with a repeater, such as a network-controlled repeater (NCR). The example apparatus may also provide a multiplexing configuration based in part on at least one of a phase distortion and a power mismatch associated with the first uplink communication.

In another aspect of the disclosure, a method, a computer-readable medium, and an apparatus are provided for wireless communication. An apparatus may include a wireless device, such as a repeater. The example apparatus obtain a first uplink signal associated with a UE. The example apparatus may also provide a first uplink communication including the first uplink signal multiplexed with a second uplink signal, the second uplink signal being associated with a mobile termination (MT) component of the repeater. The example apparatus may also obtain a multiplexing configuration based in part on at least one of a phase distortion and a power mismatch associated with the first uplink communication. The example apparatus may also provide a second uplink communication based in part on the multiplexing configuration, the second uplink communication including a third uplink signal multiplexed with a fourth uplink signal.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
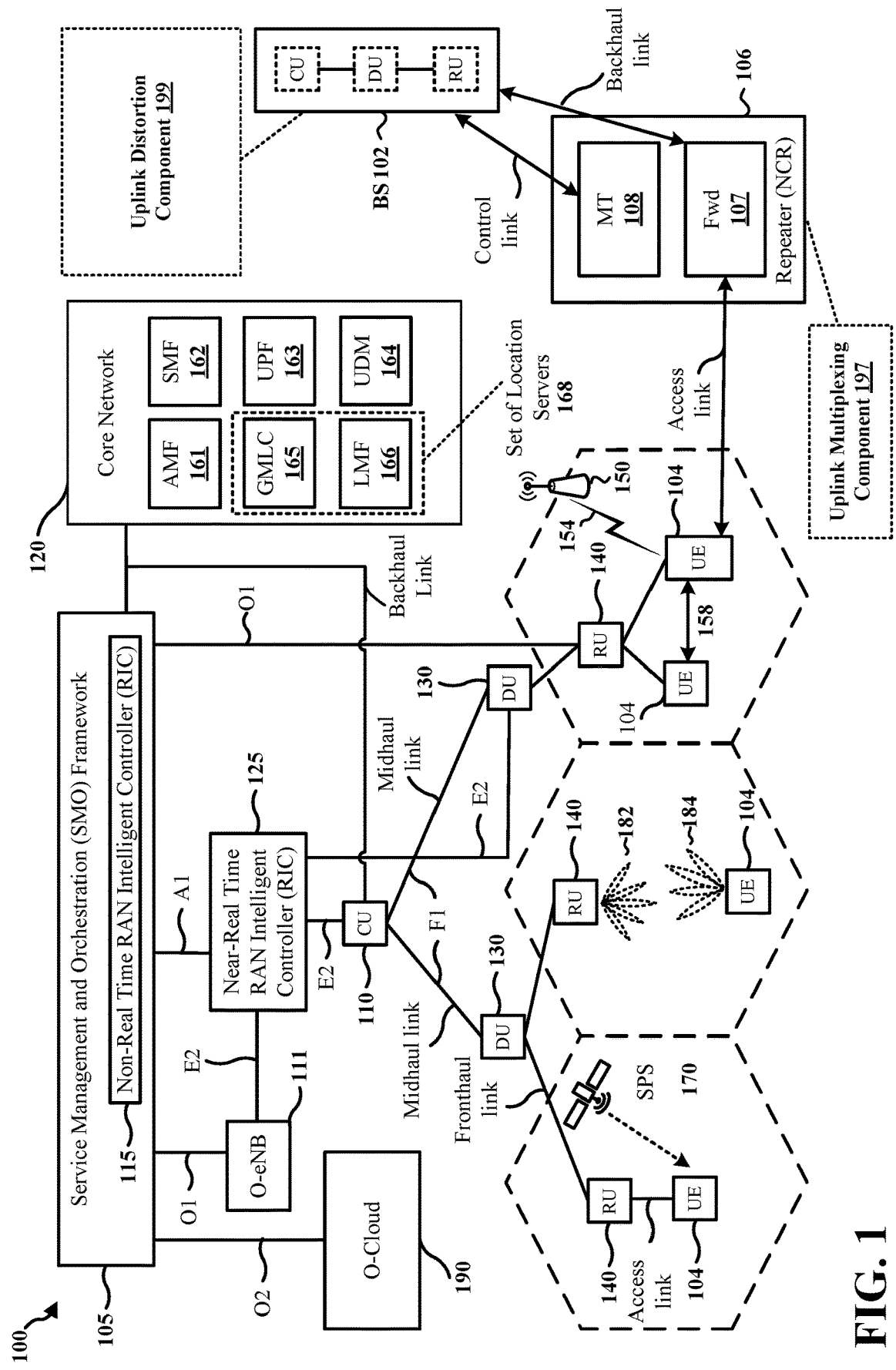
FIG. 1 is a diagram illustrating an example of a wireless communications system and an access network.

A repeater, such as a network-controlled repeater (NCR), may include a forwarding component that is configured to forward signaling (e.g., data and/or control information) between a first wireless device and a second wireless device over an access link. Further, the repeater may include a mobile termination (MT) component that is configured to communicate control signaling that is not forwarded between the first wireless device and the second wireless device. In some examples, the first wireless device may be implemented by a base station. In some examples, the second wireless device may be implemented by a UE. Note, as used herein, the terms "repeater" and "NCR" are used interchangeably and, unless specifically stated otherwise, claimed subject matter is not necessarily intended to be limited to just one example of a repeater, such as an NCR.

In some scenarios, there may be signals at the repeater that are associated with the MT component (e.g., MT signals) and/or the UE (e.g., UE signals). In some such scenarios, the repeater may perform multiplexing of the signals. In some examples, the repeater may perform time-division multiplexing (TDM) of the MT signals and the UE signals. In some examples, the repeater may perform frequency-division multiplexing (FDM) of the MT signals and the UE signals.

In some examples, when performing FDM of an UE uplink signal and an MT uplink signal, there may be phase distortion associated with the UE uplink signal. Additionally, or alternatively, when performing FDM of the UE uplink signal and the MT uplink signal, there may be a power mismatch between two the signals.

In some examples, techniques disclosed herein facilitate resolving unacceptable phase distortion associated with multiplexing uplink signals at the repeater. For example, aspects disclosed herein provide techniques for the repeater to provide feedback to the network entity to assist the network entity to determine a level of phase distortion that may be introduced by the repeater when transmitting multiplexed uplink signals.

In some examples, the network entity may use the feedback provided by the repeater to determine whether the observed phase distortion is due to the multiplexing of uplink signals at the repeater. For example, the network entity may use the feedback to determine whether the observed phase distortion may be attributed to the repeater. In examples in which the network entity determines that the observed phase distortion may be attributed to the repeater, the network entity may determine to apply a multiplexing configuration at the repeater. For example, the network entity may determine to perform a TDM configuration procedure to configure the repeater to perform time-division multiplexing of uplink signals. In other examples, the network entity may determine to perform an FDM configuration procedure to configure the repeater to perform frequency-division multiplexing of UE uplink signals with a dummy signal and MT uplink signals.

As described above, there may be a power mismatch between two signals when the repeater performs multiplexing of uplink signals. For example, when the repeater is combining the UE uplink signal and the MT uplink signal, there may be a relatively large mismatch between the respective powers of the uplink signals. In some examples, the MT uplink signal may be polluted with leakage associated with the UE uplink signal. In some examples, the MT uplink signal and/or the UE uplink signal may be distorted due to a limited dynamic range associated with a power amplifier of the repeater. For example, the limited dynamic range associated with the power amplifier of the repeater may add non-linear amplification of a signal output by the repeater.

Aspects disclosed herein provide techniques for reducing or limiting a power imbalance between the combined UE uplink signal and the combined MT uplink signal. For example, disclosed aspects may limit the power of the amplified combined uplink signal to be less than or equal to a maximum output power supported by the repeater. Disclosed aspects may also limit the amplification gain applied to the received UE uplink signal. In some examples, the limit on the amplification gain may be applied regardless of whether the repeater is multiplexing the received UE uplink signal with an MT uplink signal. Disclosed aspects may also limit the difference in the power spectral density (PSD) associated with the combined UE uplink signal and the PSD associated with the combined MT uplink signal to satisfy a PSD threshold (e.g., the difference is less than or equal to the PSD threshold)

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs (e.g., a CU 110) that can communicate directly with a core network 120 via a backhaul link, or indirectly with the core network 120 through one or more disaggregated base station units (such as a Near-Real Time (Near-RT) RAN Intelligent Controller (RIC) (e.g., a Near-RT RIC 125) via an E2 link, or a Non-Real Time (Non-RT) RIC (e.g., a Non-RT RIC 115) associated with a Service Management and Orchestration (SMO) Framework (e.g., an SMO Framework 105), or both). A CU 110 may communicate with one or more DUs (e.g., a DU 130) via respective midhaul links, such as an F1 interface. The DU 130 may communicate with one or more RUs (e.g., an RU 140) via respective fronthaul links. The RU 140 may communicate with respective UEs (e.g., a UE 104) via one or more radio frequency (RF) access links. In some implementations, the UE 104 may be simultaneously served by multiple RUs.

Each of the units, i.e., the CUs (e.g., a CU 110), the DUs (e.g., a DU 130), the RUs (e.g., an RU 140), as well as the Near-RT RICs (e.g., the Near-RT RIC 125), the Non-RT RICs (e.g., the Non-RT RIC 115), and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU 140 can be implemented to handle over the air (OTA) communication with one or more UEs (e.g., the UE 104). In some implementations, real-time and non-real-time aspects of control and user plane communication with the RU 140 can be controlled by a corresponding DU. In some scenarios, this configuration can enable the DU(s) and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs, DUs, RUs and Near-RT RICs. In some implementations, the SMO Framework 105 can communicate with a hardware aspect of a 4G RAN, such as an open eNB (O-eNB) 111, via an O1 nterface. Additionally, in some implementations, the SMO Framework 105 can communicate directly with one or more RUs via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs, one or more DUs, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs (e.g., the RU 140) and the UEs (e.g., the UE 104) may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UE 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs may communicate with each other using device-to-device (D2D) communication (e.g., a D2D communication link 158). The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with a UE 104 (also referred to as Wi-Fi stations (STAs)) via communication link 154, e.g., in a 5 GHz unlicensed frequency spectrum or the like. When communicating in an unlicensed frequency spectrum, the UE 104/Wi-Fi AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) (e.g., an AMF 161), a Session Management Function (SMF) (e.g., an SMF 162), a User Plane Function (UPF) (e.g., a UPF 163), a Unified Data Management (UDM) (e.g., a UDM 164), one or more location servers 168, and other functional entities. The AMF 161 is the control node that processes the signaling between the UE 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) (e.g., a GMLC 165) and a Location Management Function (LMF) (e.g., an LMF 166). However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the access network of FIG. 1 may include at least one repeater, such as an NCR, as described herein. A repeater 106 may include a forwarding component (e.g., a forwarding component 107 ("Fwd")) that is configured to forward information (e.g., data and/or control signaling) between a first wireless device and a second wireless device over an access link. Further, the repeater 106 may include a mobile termination (MT) component (e.g., an MT 108) that is configured to communicate control signaling (e.g., control information associated with the repeater 106) that is not forwarded between the first wireless device and the second wireless device. In some examples, the first wireless device and the second wireless device may be implemented by a base station and a UE. For example, the first wireless device may be implemented by the base station 102, and the second wireless device may be implemented by the UE 104 of FIG. 1.

According to various aspects, a network entity, such as a base station 102 or a component of a base station (e.g., a CU 110, a DU 130, and/or an RU 140), may be configured to manage or more aspects of wireless communication. For example, the base station 102 may have an uplink distortion component 199 that may be configured to facilitate detecting phase distortion and/or power mismatch between received uplink signals. In certain aspects, the uplink distortion component 199 may be configured to obtain a first uplink communication including a first uplink signal multiplexed with a second uplink signal, the first uplink signal associated with a UE and the second uplink signal associated with a repeater. The example uplink distortion component 199 may also be configured to provide a multiplexing configuration based in part on at least one of a phase distortion and a power mismatch associated with the first uplink communication.

In another configuration, a wireless device, such as the repeater 106, may be configured to manage or more aspects of wireless communication. For example, the repeater 106 may include an uplink multiplexing component 197 configured to facilitate multiplexing uplink signals at the repeater. In certain aspects, the uplink multiplexing component 197 may be configured to obtain a first uplink signal associated with a UE. The example uplink multiplexing component 197 may also be configured to provide a first uplink communication including the first uplink signal multiplexed with a second uplink signal, the second uplink signal being associated with an MT component of the repeater. Additionally, the example uplink multiplexing component 197 may be configured to obtain a multiplexing configuration based in part on at least one of a phase distortion and a power mismatch associated with the first uplink communication. The example uplink multiplexing component 197 may also be configured to provide a second uplink communication based in part on the multiplexing configuration, the second uplink communication including a third uplink signal multiplexed with a fourth uplink signal.

The aspects presented herein may enable a repeater to multiplex uplink signals, which may improve coverage, for example, by reducing phase distortion of the uplink signals and/or by reducing power mismatch between two signals.

Although the following description provides examples directed to 5G NR, the concepts described herein may be applicable to other similar areas, such as LTE, LTE-A, CDMA, GSM, 6G, and/or other wireless technologies, in which a wireless device may be configured to relay forwarding signaling between a network entity and a UE and also communicate control signaling with the network entity.

Figure 2:
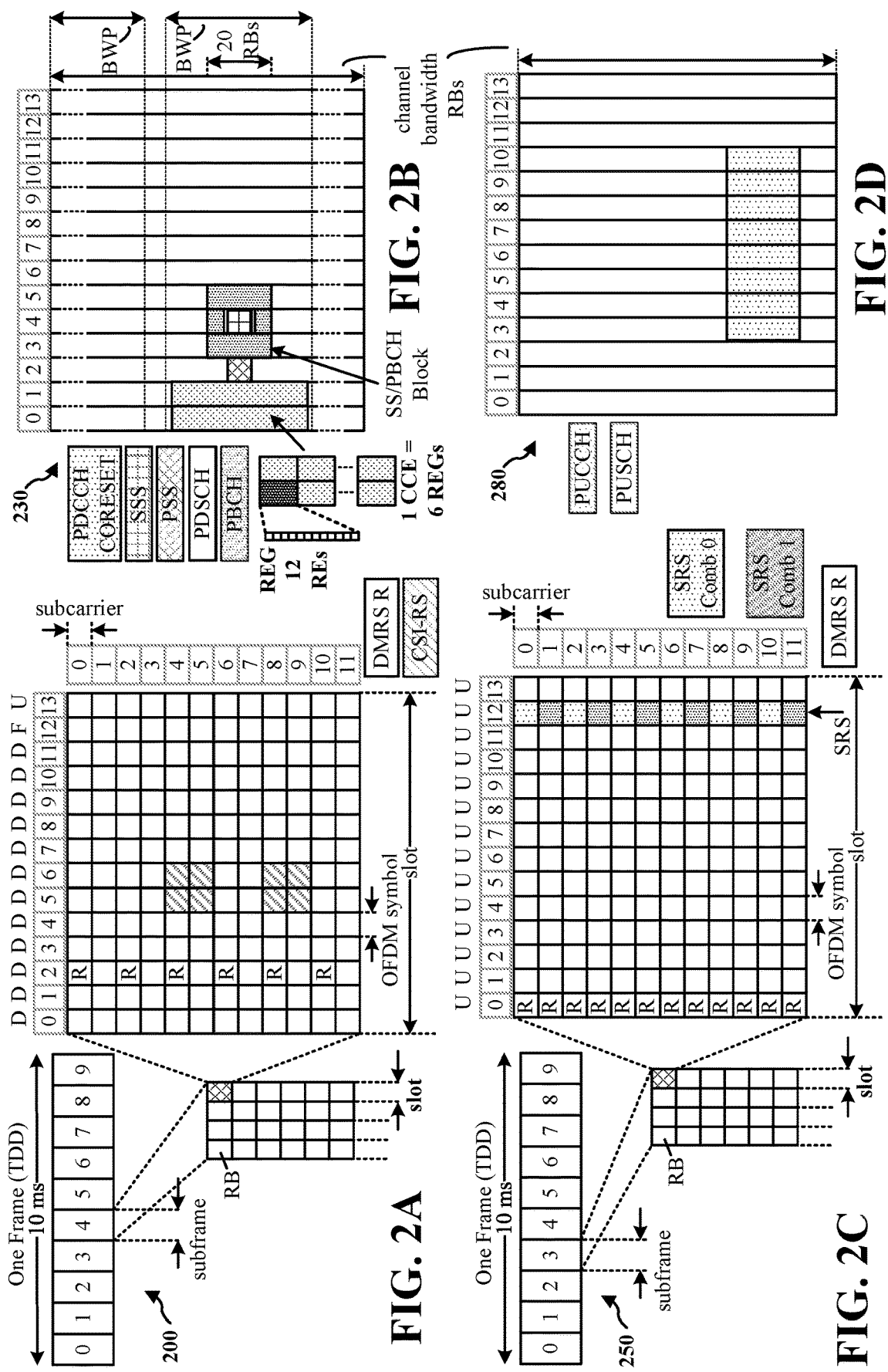
FIG. 2A is a diagram illustrating an example of a first subframe within a 5G NR frame structure.
FIG. 2B is a diagram illustrating an example of DL channels within a 5G NR subframe.
FIG. 2C is a diagram illustrating an example of a second subframe within a 5G NR frame structure.
FIG. 2D is a diagram illustrating an example of UL channels within a 5G NR subframe.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS<br>$\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. As shown in Table 1, the subcarrier spacing may be equal to $2^\mu * 15$ kHz, where μ is the numerology 0 to 4. As such, the numerology μt=0 has a subcarrier spacing of 15 kHz and the numerology 1.1=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS)

may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
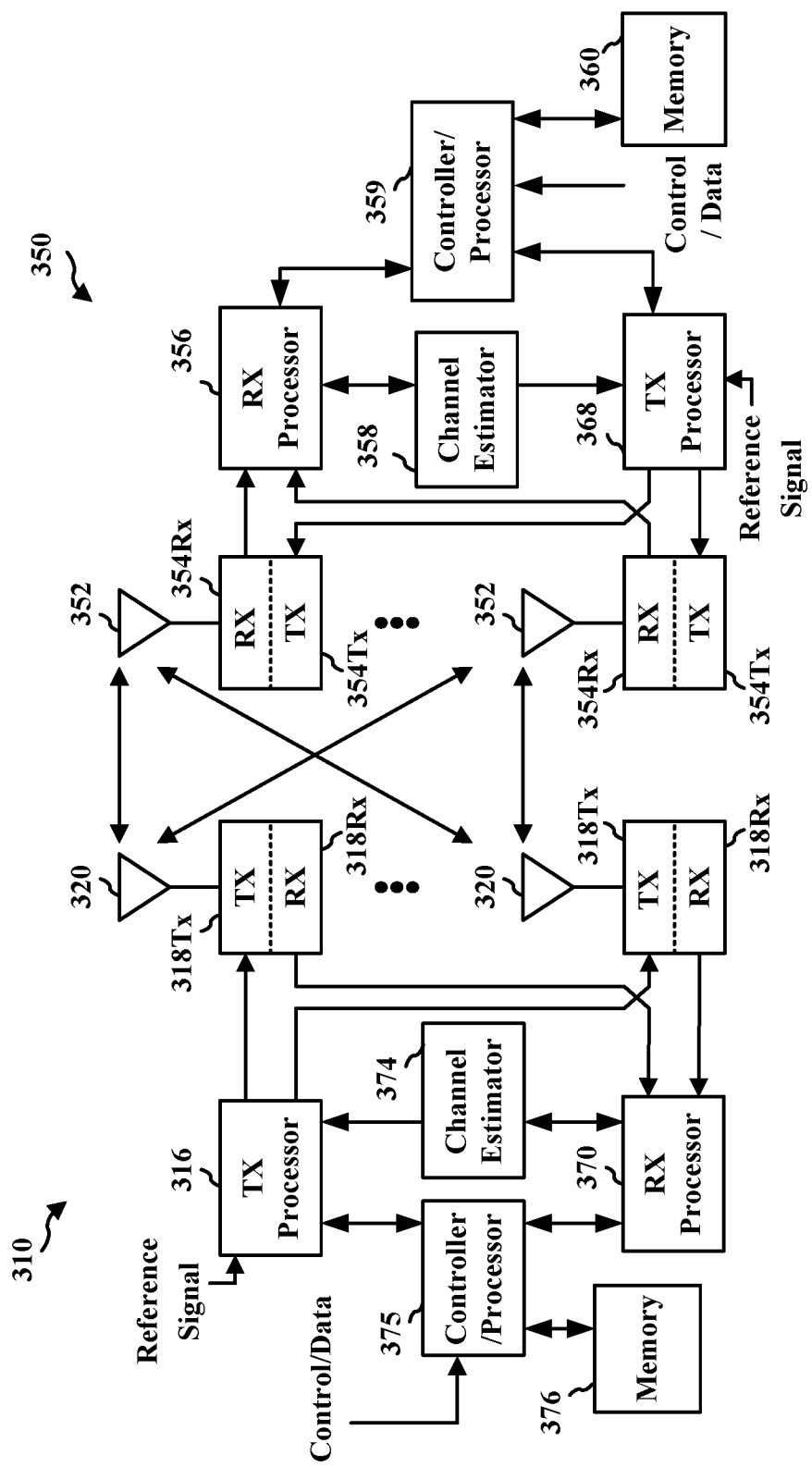
FIG. 3 is a block diagram that illustrates an example of a first wireless device that is configured to exchange wireless communication with a second wireless device.

FIG. 3 is a block diagram that illustrates an example of a first wireless device that is configured to exchange wireless communication with a second wireless device. In the illustrated example of FIG. 3, the first wireless device may include a base station 310, the second wireless device may include a UE 350, and the base station 310 may be in communication with the UE 350 in an access network. As shown in FIG. 3, the base station 310 includes a transmit processor (TX processor 316), a transmitter 318Tx, a receiver 318Rx, antennas 320, a receive processor (RX processor 370), a channel estimator 374, a controller/processor 375, and at least one memory 376. The example UE 350 includes antennas 352, a transmitter 354Tx, a receiver 354Rx, an RX processor 356, a channel estimator 358, a controller/processor 359, at least one memory 360, and a TX processor 368. In other examples, the base station 310 and/or the UE 350 may include additional or alternative components.

In the DL, Internet protocol (IP) packets may be provided to the controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The TX processor 316 and the RX processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna of the antennas 320 via a separate transmitter (e.g., the transmitter 318Tx). Each transmitter 318Tx may modulate a radio frequency (RF) carrier with a respective spatial stream for transmission.

At the UE 350, each receiver 354Rx receives a signal through its respective antenna of the antennas 352. Each receiver 354Rx recovers information modulated onto an RF carrier and provides the information to the RX processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, two or more of the multiple spatial streams may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with the at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna of the antennas 352 via separate transmitters (e.g., the transmitter 354Tx). Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna of the antennas 320. Each receiver 318Rx recovers information modulated onto an RF carrier and provides the information to the RX processor 370.

The controller/processor 375 can be associated with the at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 316, the RX processor 370, and the controller/processor 375 may be configured to perform aspects in connection with the uplink distortion component 199 of FIG. 1 and/or the uplink multiplexing component 197 of FIG. 1.

Figure 4:
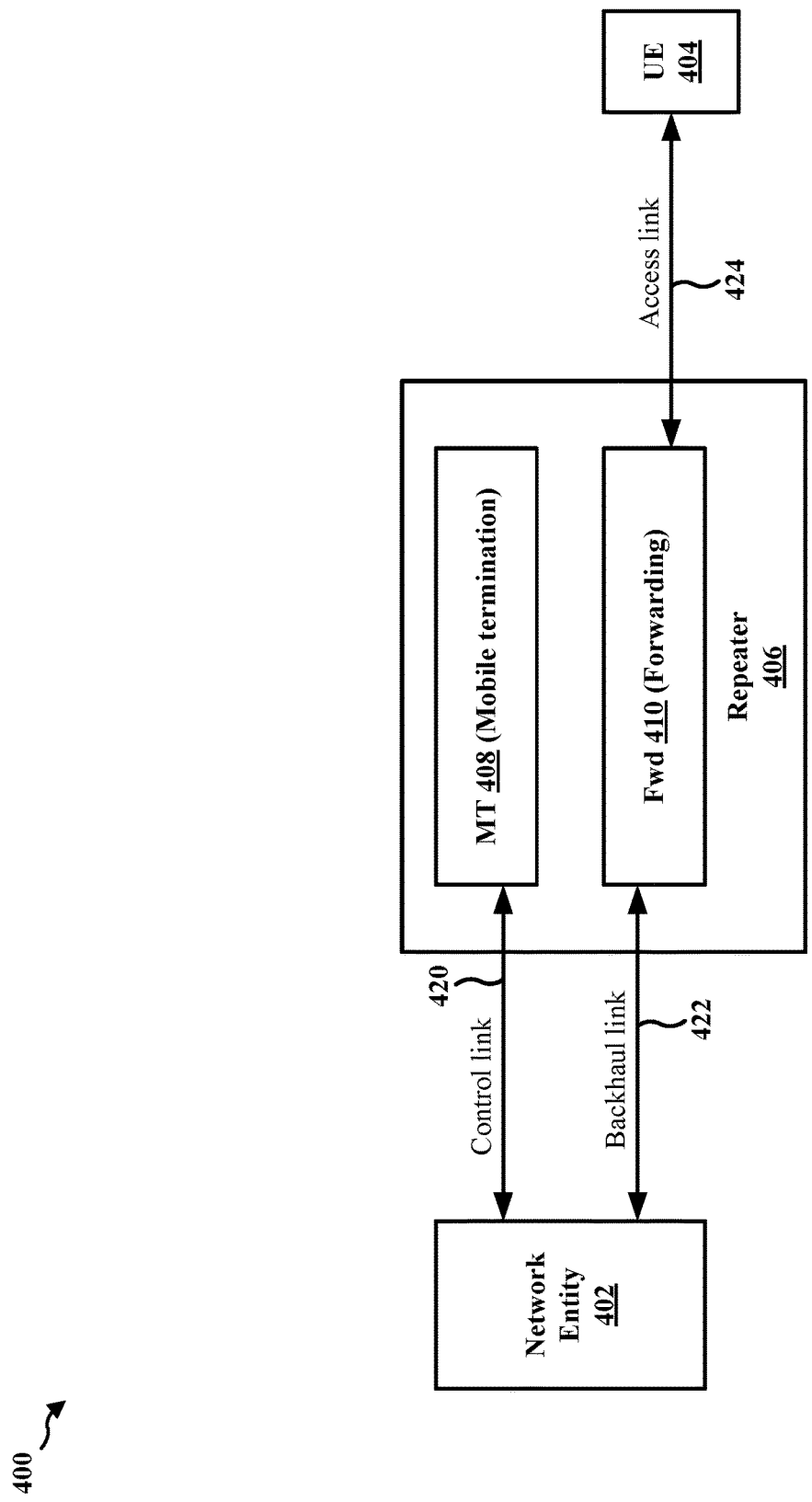
FIG. 4 is a diagram illustrating an example of a wireless communications system, in accordance with various aspects of the present disclosure.

FIG. 4 is a diagram illustrating an example of a wireless communications system 400, as presented herein. In the illustrated example of FIG. 4, a network entity 402 is in communication with a UE 404 via a repeater 406. One or more aspects described for the network entity 402 may be performed by a base station or a component of a base station, such as a CU, a DU, and/or an RU. Signaling between the network entity 402, the UE 404, and/or the repeater 406 may include semi-static signaling and/or dynamic signaling. For example, signaling between the network entity 402, the UE 404, and/or the repeater 406 may include RRC signaling, a MAC-control element (MAC-CE), DCI, Orbital Angular Momentum (OAM) and/or OAM-related signaling, etc. Aspects of the repeater 406 may be implemented by an NCR. The repeater 406 may be an analog node. For example, the repeater 406 may be configured to receive a signal, amplify the received signal, and forward the amplified signal. In some examples, the repeater 406 may be configured to avoid performing digital processing on a received signal.

In some examples, operation of the repeater 406 may be controlled by the network entity 402. For example, the network entity 402 may communicate control signals to the repeater 406. In the example of FIG. 4, the repeater 406 includes a mobile termination component (e.g., an MT component 408 ("MT")) to facilitate communicating control signals with the network entity 402. Aspects of the MT component 408 may be implemented by a Uu interface. In some examples, the network entity 402 and the MT component 408 may establish a control link 420. The network entity 402 may output downlink communications that are obtained by the MT component 408 via the control link 420. Additionally, the MT component 408 may provide uplink communications to the network entity 402 via the control link 420. Control signaling communicated via the control link 420 may also be referred to as "side control information."

As shown in FIG. 4, the repeater 406 also includes a forwarding component (e.g., a forwarding component 410 ("Fwd")). The forwarding component 410 may be configured to extend coverage of the network entity 402. For example, the repeater 406 may be configured to receive a signal, amplify the signal, and then forward the signal between the network entity 402 and the UE 404. The forwarding component 410 may communicate signals in the downlink direction (e.g., from the network entity 402 to the UE 404) and/or in the uplink direction (e.g., from the UE 404 to the network entity 402). In the example of FIG. 4, communication between the network entity 402 and the UE 404, via the repeater 406, may occur over a backhaul link 422 (e.g., between the network entity 402 and the forwarding component 410) and an access link 424 (e.g., between the forwarding component 410 and the UE 404).

Figure 5:
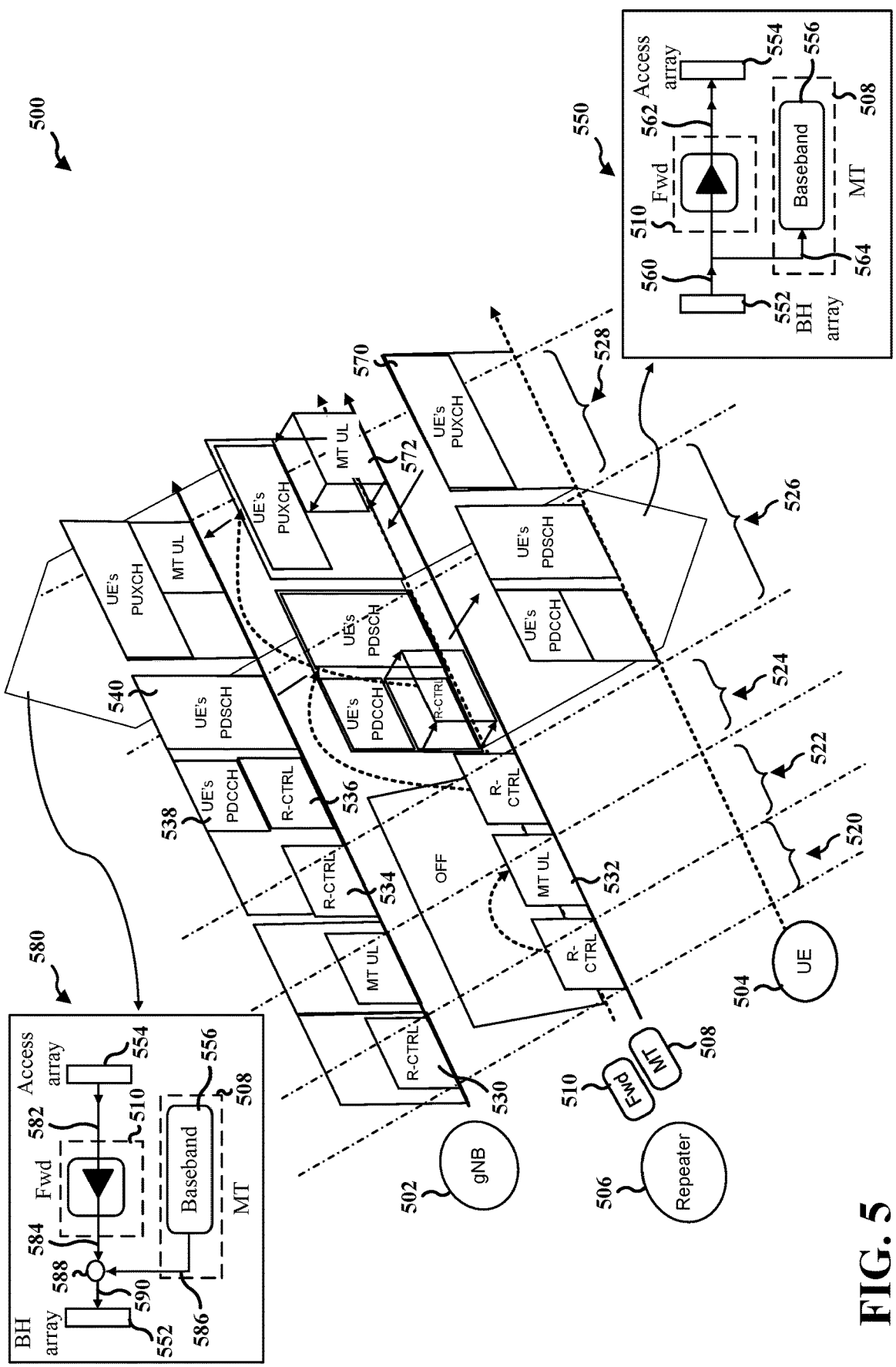
FIG. 5 is a diagram illustrating an example of a wireless communications system employing resource multiplexing, in accordance with various aspects of the present disclosure.

FIG. 5 is a diagram illustrating an example of a wireless communications system 500 employing resource multiplexing, as presented herein. In the illustrated example of FIG. 5, the wireless communications system 500 includes a network entity 502 ("gNB"), a UE 504, and a repeater 506, such as an NCR, including an MT component 508 and a forwarding component 510 ("Fwd"). Aspects of the repeater 506, the MT component 508, and the forwarding component 510 may be similar to the repeater 406, the MT component 408, and the forwarding component 410, respectively of FIG. 4. The forwarding component 510 may be configured to forward downlink signals from the network entity 502 to the UE 504, and to forward uplink signals from the UE 504 to the network entity 502.

The MT component 508 may also be configured to obtain downlink signals from the network entity 502. The downlink signals from the network entity 502 may include control signaling to control operation of the MT component 508. The MT component 508 may also be configured to output (e.g., provide) uplink signals to the network entity 502. The uplink signals may include reports, capability information, and/or other indications based on the control signaling.

In some scenarios, there may be signals at the repeater 506 that are associated with the MT component 508 (e.g., MT signals) and/or the UE 504 (e.g., UE signals). In some such scenarios, the repeater 506 may perform multiplexing of the signals. In some examples, the repeater 506 may perform time-division multiplexing (TDM) of the MT signals and the UE signals. For example, when the MT component 508 component is performing an uplink operation or a downlink operation with the network entity 502, the forwarding component 510 may be set to an OFF state. Correspondingly, when the forwarding component 510 is performing an uplink operation or a downlink operation with the network entity 502 or the UE 504, the MT component 508 may be set to an OFF state.

In the illustrated example of FIG. 5, the network entity 502, the UE 504, and/or the repeater 506 may communicate over five example time periods (e.g., a first slot 520, a second slot 522, a third slot 524, a fourth slot 526, and a fifth slot 528). Although the time periods of FIG. 5 refer to slots, in other examples, the time periods may refer to other durations of time, such as symbols, or multiple slots/symbols, etc. In the example of FIG. 5, the repeater 506 is employing TDM during the first three periods. That is, when the MT component 508 is communicating with the network entity 502 (e.g., in the downlink direction or the uplink direction), then the forwarding component 510 is set to the OFF state and is not communicating with the UE 504. For example, during the first slot 520 of FIG. 5, the network entity 502 communicates first control communication 530 ("R-CTRL") to the MT component 508. During a second slot 522, the MT component 508 has a first MT uplink communication 532 ("MT UL") for the network entity 502 and communicates the first MT uplink communication 532. In a similar manner, during a third slot 524 of FIG. 5, the network entity 502 communicates a second control communication 534 to the MT component 508. As shown in FIG. 5, during the first slot 520, the second slot 522, and the third slot 524, the MT component 508 and the network entity 502 are in communication, and communication with the UE 504 (e.g., via the forwarding component 510) is off.

In some scenarios, communications for the UE 504 (e.g., the UE signals) and communications for the MT component 508) (e.g., the MT signals) may be simultaneous (e.g., overlap in a time domain). In some such examples, the UE signals and the MT signals may be frequency-division multiplexed (FDM). For example, for a slot, a first set of resources may be allocated for transmitting downlink control communications to the MT component 508, and a second set of resources may be allocated for transmitting downlink communications to the UE 504. In the illustrated example of FIG. 5, the fourth slot 526 is allocated for downlink communications from the network entity 502 to the UE 504 and/or the repeater 506. For example, during the fourth slot 526, the network entity 502 may transmit a third control communication 536 ("R-CTRL") to the MT component 508 using a first set of resources. The network entity 502 may also transmit a fourth control communication 538 ("UE's PDCCH") to the UE 504 using a second set of resources and first data communication 540 ("UE's PDSCH") using a third set of resources. The first set of resources, the second set of resources, and the third set of resources may each be allocated to respective time-frequency resources associated with the fourth slot 526.

In the example of FIG. 5, the repeater 506 may be configured to process signals for the MT component 508 and for forwarding to the UE 504 based on different resources. For example, FIG. 5 includes an example downlink architecture 550 for processing downlink communications at the repeater 506. For example, a backhaul array 552 ("BH array") may receive signals associated with the third control communication 536, the fourth control communication 538, and the first data communication 540. The backhaul array 552 may then output signals 560 based on the received signals. The forwarding component 510 of the repeater 506 may amplify the signals 560 and forward amplified signals 562 to the UE 504 via an access array 554.

Additionally, a signals copy 564 of the signals 560 is provided to the MT component 508 for processing via a baseband 556 of the MT component 508. In some examples, the baseband 556 may extract a portion of the signals copy 564 intended for the MT component 508, and corresponding to the third control communication 536, for example, based on the first set of resources.

In the uplink direction, the repeater 506 may combine an MT uplink signal with a UE uplink signal received from the UE 504, and forward the combined signal to the network entity 502. For example, during the fifth slot 528, the UE 504 may transmit a UE uplink communication 570 ("UE's PUXCH") that is obtained by the repeater 506. The UE uplink communication 570 may include PUCCH and/or PUSCH. Additionally, the MT component 508 may have a second MT uplink communication 572 for transmitting to the network entity 502. In such scenarios, the repeater 506 may be configured to transmit a combined uplink signal including the UE uplink communication 570 and the second MT uplink communication 572 to the network entity 502.

In the illustrated example of FIG. 5, an example uplink architecture 580 illustrating processing of uplink communications at the repeater 506. For example, the access array 554 may receive UE signals associated with the UE uplink communication 570 from the UE 504. The access array 554 may then output UE signals 582 that are obtained by the forwarding component 510. The forwarding component 510 may amplify the UE signals 582 to generate amplified signals 584. Additionally, the baseband 556 may generate MT signals 586 corresponding to the second MT uplink communication 572. A combiner 588 may combine the amplified signals 584 from the forwarding component 510 and the MT signals 586 from the MT component 508 to generate a combined uplink signal 590. The combined uplink signal 590 may be provided to the network entity 502 via the backhaul array 552. The combined uplink signal 590 may be associated with the UE uplink communication 570 and the second MT uplink communication 572. The network entity 502 may extract the UE uplink communication 570 from the combined uplink signal 590 based on a first set of resources allocated to UE uplink signals, and may extract the second MT uplink communication 572 from the combined uplink signal 590 based on a second set of resources allocated to MT uplink signals.

In some examples, when performing FDM of the UE uplink signal and the MT uplink signal, there may be phase distortion associated with the UE uplink signal. Additionally, or alternatively, when performing FDM of the UE uplink signal and the MT uplink signal, there may be a power mismatch between two the signals.

Figure 6:
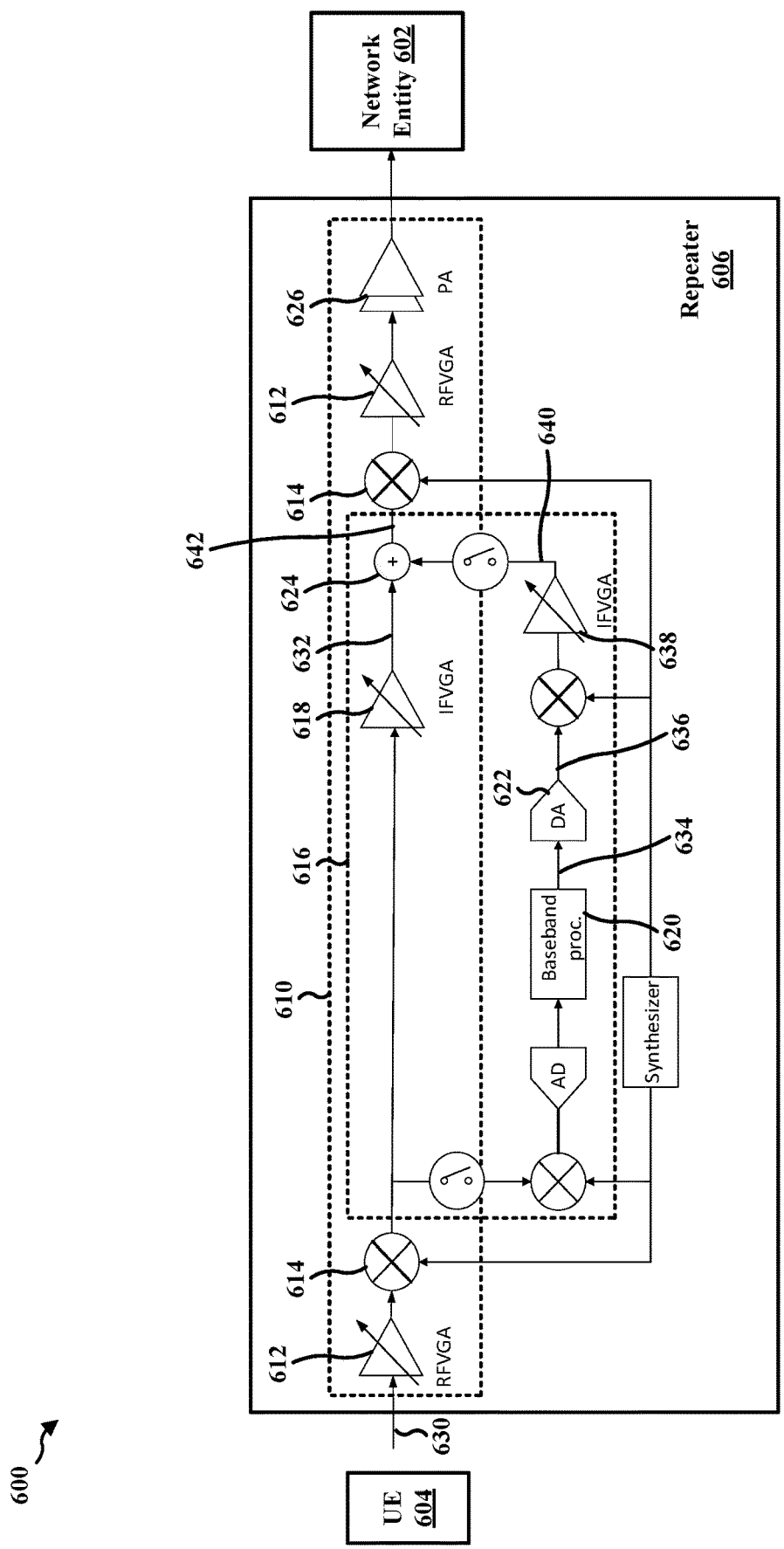
FIG. 6 is a diagram illustrating an example architecture of a repeater in communication with a network entity and a UE, in accordance with various aspects of the present disclosure.

FIG. 6 is a diagram illustrating an example architecture 600 of a repeater 606 in communication with a network entity 602 and a UE 604, as presented herein. In the example of FIG. 6, the repeater 606, such as an NCR, includes a first portion 610 and a second portion 616. The first portion 610 of the repeater 606 corresponds to a chain from an Rx antenna (not shown) to a Tx antenna (not shown). Aspects of an Rx antenna and a Tx antenna are described in connection with the example base station 310 of FIG. 3. The Rx antenna may receive a signal, such as a UE uplink signal 630 received from the UE 604. The Tx antenna may transmit a signal, such as a combined uplink signal 642 transmitted to the network entity 602. The second portion 616 of the repeater 606 facilitates processing in an intermediate frequency (IF).

The example architecture 600 includes variable-gain amplifiers (VGAs) to provide gain control, for example, based on a control voltage. A VGA may also be referred to as a voltage-controlled amplifier (VCO). An RFVGA is a variable-gain amplifier that provides gain control in the RF domain. An IFVGA is a variable-gain amplifier that provides gain control in the IF domain. In the illustrated example of FIG. 6, an RFVGA 612 may receive a signal (e.g., the UE uplink signal 630 via an Rx antenna) and amplify the received signal in the RF domain for the next stages of processing. A component 614 may enable switching processing from the RF domain to the IF domain.

As shown in FIG. 6, the UE uplink signal 630 may pass through an amplifier 618 (e.g., an IFVGA) to provide gain control in the IF domain. The amplifier 618 may generate an amplified UE uplink signal 632. Although the example of FIG. 6 illustrates one example amplifier in the IF domain, in other examples, the UE uplink signal 630 may pass through one or more amplifiers in the IF domain to facilitate different amplification levels, which may then be forwarded to the network entity 602.

Additionally, a baseband processor 620 may generate an MT uplink signal 634 (e.g., the MT signals 586 of FIG. 5), which is then provided to a digital-to-analog converter 622 to convert the MT uplink signal 634 to the analog domain. The repeater 606 may then provide gain control on a converted MT uplink signal 636 (e.g., via an IFVGA 638) to generate an amplified MT uplink signal 640. The amplified MT uplink signal 640 may then be provided to a signal combiner 624. The signal combiner 624 then combines the amplified UE uplink signal 632 with the amplified MT uplink signal 640 to generate the combined uplink signal 642. The combined uplink signal 642 may then be converted into the RF domain before being transmitted to the network entity 602. In the example of FIG. 6, the combined uplink signal 642 may pass through a power amplifier (PA) (e.g., a PA 626) to increase the power of the combined uplink signal 642.

In some examples, when a signal travels through a power amplifier (e.g., the PA 626), an input signal may incur amplitude modulation (AM) distortion and/or phase modulation (PM) distortion. For example, an input signal x(t) provided to a power amplifier may be represented by Equation 1 (below).

$$x(t) = r(t)\cos(\omega_0 t + \psi(t) + \Phi(t))$$ Equation 1

In Equation 1, the term "r(t)" represents an information signal being provided, which is modified by a carrier frequency. In the example of Equation 1, the carrier frequency includes a frequency component "$\omega_0 t$" and a phase component "$\psi(t)$" that are both dependent on time. Equation 2 (below) represents an output signal y(t) that may be output by the power amplifier.

$$y(t) = A[r(t)]\cos(\omega_0 t + \psi(t) + \Phi(t))$$ Equation 2

In Equation 2, the information signal r(t) experiences an AM-AM conversion that may be represented by an output signal amplitude "A(r)." In some examples, the change in the amplitude of the output signal y(t) may be non-linear. For example, the output signal amplitude A(r) may be a function of the information signal r(t). Additionally, the carrier frequency may experience an AM-PM conversion that may be represented by an extra phase shift "Φ(r)." That is, while the input signal x(t) may be provided to the power amplifier to increase the amplitude of the input signal x(t), in some examples, the power amplifier may also introduce an extra phase shift Φ(r). In the example of Equation 2, the increase in the amplitude and the extra phase shift may be functions of the information signal r(t). For example, if the strength of the information signal r(t) increases, the amount of extra phase shift Φ(r) introduced by the power amplifier will be different.

In some examples, the output signal amplitude A(r), which may also be referred to as an AM-AM conversion, may be represented by Equation 3 (below). Additionally, the extra phase shift Φ(r), which may also be referred to as an AM-PM conversion, may be presented by Equation 4 (below).

$$A(r) = \frac{\alpha_a r}{(1 + \beta_a r^2)}$$ Equation 3

$$\Phi(r) = \frac{\alpha_\Phi r^2}{(1 + \beta_\Phi r^2)}$$ Equation 4

As shown in Equation 3, the AM-AM conversion is based on an $\alpha_\alpha$ parameter and a $\beta_\alpha$ parameter. Similarly, in Equation 4, the AM-PM conversion is based on an $\alpha_\Phi$ parameter and a $\beta_\Phi$ parameter.

In Equation 3 and Equation 4, the AM-AM conversion and the AM-PM conversion, respectively, are based on a Saleh model. However, in other examples, the AM-AM conversion and/or the AM-PM conversion may be based on other models.

Figure 7:
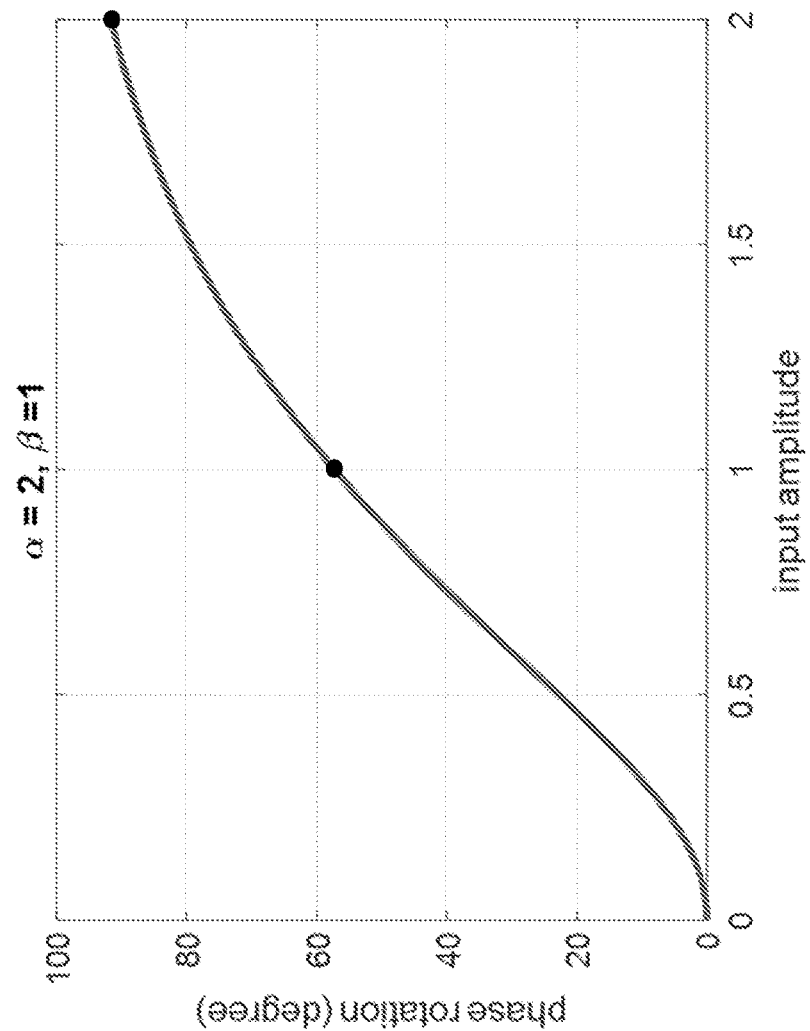
FIG. 7 is a diagram illustrating an example graph representing a relationship between phase rotation and input amplitude, in accordance with various aspects of the present disclosure.

FIG. 7 is a diagram illustrating an example graph 700 representing a relationship between phase rotation and input amplitude, as presented herein. In the example of FIG. 7, the α parameter is set to two (α=2) and the β parameter is set to one (β=1). In the illustrated example of FIG. 7, the x-axis represents the input amplitude, and the y-axis represents the extra phase shift Φ(r), for example, based on Equation 4 (above). The extra phase shift Φ(r) is represented in degrees. As shown in the example of FIG. 7, the extra phase shift Φ(r) is a function of the input amplitude. For example, at a first point, the input amplitude is one, and at a second point, the input amplitude is two. As the input amplitude doubles (e.g., going from one to two), then the phase rotation may result in an extra phase shift of approximately 30 degrees.

Referring again to the example of FIG. 5, in an example, the UE uplink communication 570 may occupy more time resources than the second MT uplink communication 572. For example, the UE uplink communication 570 may occupy 14 symbols of the fifth slot 528, but the second MT uplink communication 572 may occupy a smaller portion of time resources of the fifth slot 528. For example, the second MT uplink communication 572 may occupy the last two symbols of the fifth slot 528. In such an example and in which the repeater 506 applies FDM, the majority of the symbols in the time domain are associated with the UE uplink communication 570. For example, the first 12 symbols of the fifth slot 528 may be occupied by the UE uplink communication 570, while the last two symbols of the fifth slot 528 may be occupied by the UE uplink communication 570 and the second MT uplink communication 572 overlapping in the time domain.

Figure 8:
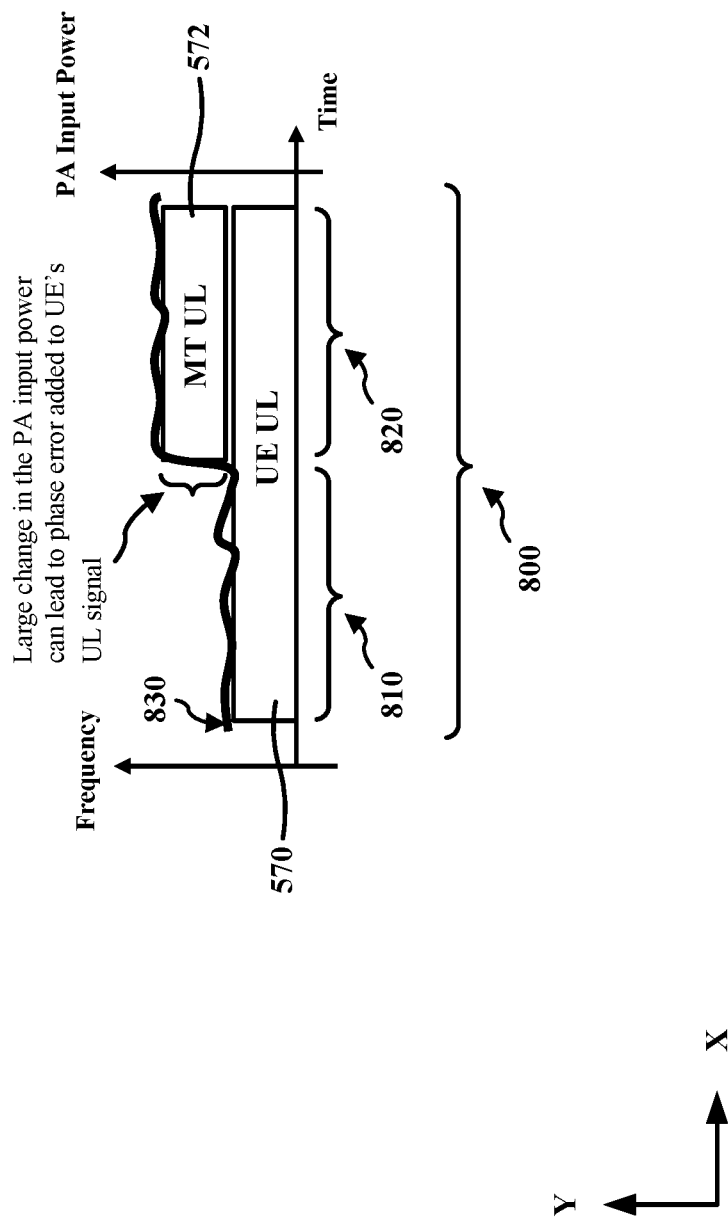
FIG. 8 is a diagram illustrating an example relationship of occupied resources in the time domain and the frequency domain for a slot, in accordance with various aspects of the present disclosure.

FIG. 8 is a diagram illustrating an example relationship of occupied resources in the time domain and the frequency domain for a slot 800, as presented herein. In the example of FIG. 8, the x-axis represents the time domain and the y-axis represents the frequency domain. As shown in FIG. 8, a first portion 810 of the slot 800 is occupied by a UE uplink communication ("UE UL"), such as the UE uplink communication 570 of FIG. 5. Additionally, a second portion 820 of the slot 800 is occupied by the UE uplink communication and the MT uplink communication ("MT UL"), such as the UE uplink communication 570 and the second MT uplink communication 572 of FIG. 5.

In the example of FIG. 8, the diagram also includes a PA input power indicator 830 of a PA input power. The PA input power may correspond to the power of the signal being input (or provided) to the PA 626 of FIG. 6. As shown in FIG. 8, the PA input power during the first portion 810 of the slot 800 is lower than the PA input power during the second portion 820 of the slot 800. That is, when a repeater, such as an NCR, starts to add the signal of the second MT uplink communication 572 to the on-going signal of the UE uplink communication 570 (e.g., during the second portion 820), the overall PA input power increases. In some examples, the change in the PA input power may be abrupt. The change in the PA input power may also, or alternatively, result in an extra phase shift. For example, and based on the example of FIG. 7, if the PA input power is at one during the first portion 810, and the PA input power jumps to two during the second portion 820, the extra phase shift introduced during the second portion 820 may be approximately 30 degrees.

In examples in which the change in the PA input power is large, the change in the PA input power may result in a loss of phase continuity or phase coherence, which may correspond to a random phase shift between symbols of the UE uplink communication 570 and the symbols of the second MT uplink communication 572. The loss of phase continuity may introduce complexity at the network entity in processing the received uplink signal. For example, by being unable to account for the extra phase shift, the network entity receiving the combined uplink signal may be unable to successfully receive the UE uplink communication 570 and/or the second MT uplink communication 572, which may result in errors and a degradation in network performance.

Figure 9:
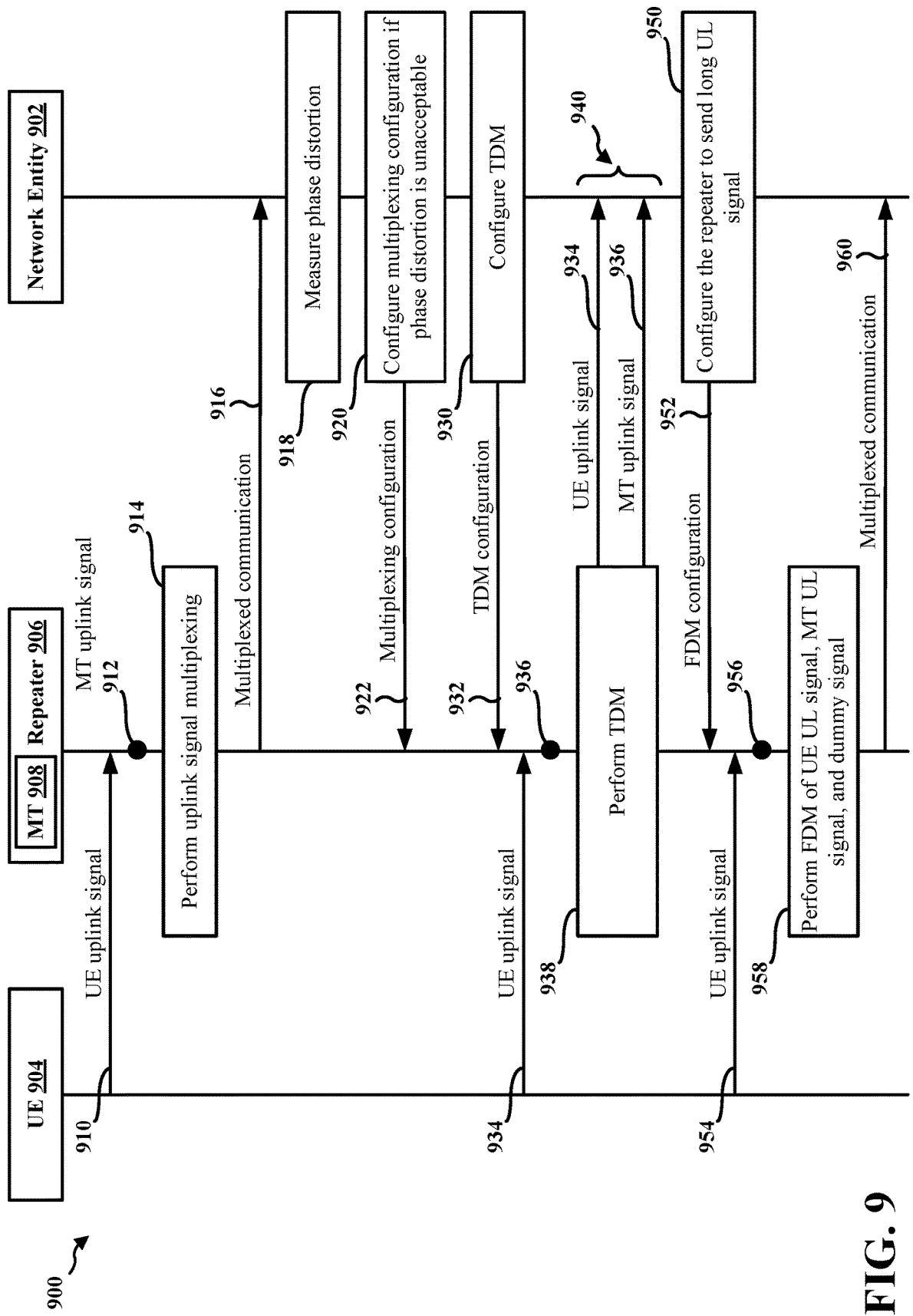
FIG. 9 illustrates an example communication flow between a network entity, a UE, and a repeater, in accordance with various aspects of the present disclosure.

FIG. 9 illustrates an example communication flow 900 between a network entity 902, a UE 904, and a repeater 906, as presented herein. One or more aspects described for the network entity 902 may be performed by a component of a base station or a network entity, such as a CU, a DU, and/or an RU. In the illustrated example, the communication flow 900 facilitates techniques to resolve unacceptable phase distortion associated with multiplexing uplink signals at the repeater 906. Aspects of the network entity 902 may be implemented by the base station 102 of FIG. 1, the base station 310 of FIG. 3, and/or the network entity 402 of FIG. 4. Aspects of the UE 904 may be implemented by the UE 104 of FIG. 1, the UE 350 of FIG. 3, and/or the UE 404 of FIG. 4. Aspects of the repeater 906 may be implemented by the repeater 106 of FIG. 1 and/or the repeater 406 of FIG. 4. Although not shown in the illustrated example of FIG. 9, in additional or alternative examples, the network entity 902, the UE 904, and/or the repeater 906 may be in communication with one or more other base stations, UEs, and/or repeaters.

In the illustrated example of FIG. 9, the repeater 906 is in communication with the network entity 902 and the UE 904. The repeater 906 may include an MT component 908, as described in connection with the MT component 408 of FIG. 4. Although not shown in the illustrated example of FIG. 9, the repeater 906 may also include a forwarding component, such as the forwarding component 410 of FIG. 4, to forward communications between the network entity 902 and the UE 904.

As shown in FIG. 9, the UE 904 may transmit (e.g., output) a first UE uplink signal 910 that is obtained (e.g., received) by the repeater 906. The repeater 906 may obtain the first UE uplink signal 910 via an access link, such as the access link 424 of FIG. 4. The first UE uplink signal 910 may be a communication intended for the network entity 902, as described in connection with the UE uplink communication 570 of FIG. 5. The MT component 908 of the repeater 906 may also generate a first MT uplink signal 912, as described in connection with the second MT uplink communication 572 of FIG. 5. The repeater 906 may perform a multiplexing procedure 914 to perform multiplexing the first UE uplink signal 910 and the first MT uplink signal 912. In some examples, the multiplexing procedure 914 may utilize frequency-division multiplexing of the first UE uplink signal 910 and the first MT uplink signal 912 to generate a first multiplexed communication 916. The repeater 906 may then provide (e.g., transmit or output) the first multiplexed communication 916 that is received by the network entity 902. The repeater 906 may output the first multiplexed communication 916 via a backhaul link, such as the backhaul link 422 of FIG. 4.

In the example of FIG. 9, the network entity 902 performs a measurement procedure 918 to measure a phase distortion associated with the first multiplexed communication 916. In some examples, the network entity 902 may perform a configuration procedure 920 to configure a multiplexing configuration 922 at the repeater 906. For example, the network entity 902 may perform the configuration procedure 920 if the phase distortion of the first multiplexed communication 916 is unacceptable. For example, there may be a first range of phase distortion that is acceptable and a second range of phase distortion that is unacceptable. When the measured phase distortion is within the first phase distortion range, the network entity 902 may receive (e.g., successfully process or decode) the first UE uplink signal 910 and the first MT uplink signal 912 of the first multiplexed communication 916. When the measured phase distortion is within the second phase distortion range (e.g., outside the first phase distortion range), then the network entity 902 may be unable to receive (e.g., unsuccessfully process or decode) at least one of the first UE uplink signal 910 and the first MT uplink signal 912 of the first multiplexed communication 916. As shown in FIG. 9, the network entity 902 may provide the multiplexing configuration 922 that is obtained by the repeater 906. The repeater 906 may use the multiplexing configuration 922 to perform subsequent multiplexing of uplink signals, such as an UE uplink signal received from the UE 904 and an MUT uplink signal generated by the MT component 908.

In some examples, the multiplexing configuration 922 may be associated with configuring TDM at the repeater 906. For example, the network entity 902 may perform a TDM configuration procedure 930 to generate a TDM configuration 932 to configure at the repeater 906. As shown in FIG. 9, the network entity 902 may provide the TDM configuration 932 that is obtained by the repeater 906. The TDM configuration 932 may cause the repeater 906 to employ TDM when multiplexing uplink signals, such as an UE uplink signal received from the UE 904 and an MUT uplink signal generated by the MT component 908.

For example, the UE 904 may transmit a second UE uplink signal 934 that is obtained by the repeater 906. The MT component 908 of the repeater 906 may also generate a second MT uplink signal 936. In the illustrated example of FIG. 9, the repeater 906 may perform a TDM procedure 938 based on the TDM configuration 932. For example, the repeater 906 may output a second multiplexed communication 940 that is obtained by the network entity 902. The second multiplexed communication 940 may include the second UE uplink signal 934 and the second MT uplink signal 936. However, the second UE uplink signal 934 and the second MT uplink signal 936 may be non-overlapping in the time domain. Aspects of a multiplexed communication employing TDM are described in connection with an example of FIG. 10A.

Figure 10A:
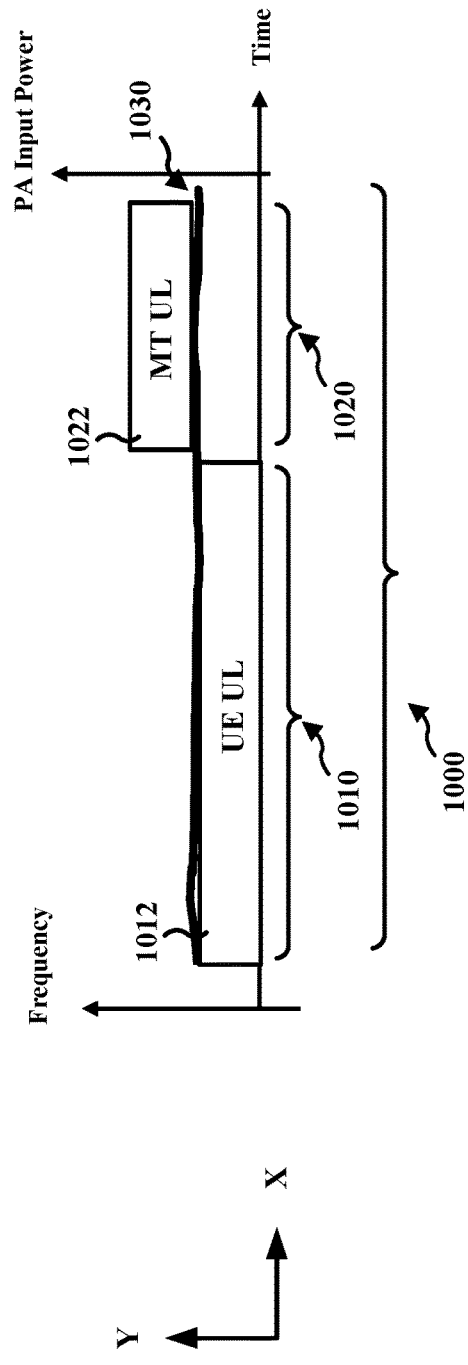
FIG. 10A is a diagram illustrating an example relationship of a time-division multiplexed signal and a power amplifier input power for a slot, in accordance with various aspects of the present disclosure.

FIG. 10A is a diagram illustrating an example relationship of a time-division multiplexed signal and a power amplifier input power for a slot 1000, as presented herein. In the example of FIG. 10A, the x-axis represents the time domain and the y-axis represents the frequency domain. As shown in FIG. 10A, a first portion 1010 of the slot 1000 is occupied by a UE uplink signal 1012 ("UE UL"). Aspects of the UE uplink signal 1012 may correspond to the second UE uplink signal 934 of FIG. 9. Additionally, a second portion 1020 of the slot 1000 is occupied by an MT uplink signal 1022 ("MT UL"). Aspects of the MT uplink signal 1022 may correspond to the second MT uplink signal 936 of FIG. 9.

As shown in FIG. 10A, the UE uplink signal 1012 and the MT uplink signal 1022 are time-division multiplexed. For example, the UE uplink signal 1012 occupies a first set of time resources that are non-overlapping with a second set of time resources associated with the MT uplink signal 1022.

Although the example of FIG. 10A illustrates the UE uplink signal 1012 and the MT uplink signal 1022 being non-overlapping in the frequency domain, in other examples, the UE uplink signal 1012 and the MT uplink signal 1022 may partially or completely overlap in the frequency domain. For example, the UE uplink signal 1012 may occupy (or span) a first set of frequency resources, the MT uplink signal 1022 may occupy (or span) a second set of frequency resources, and the first set of frequency resources may partially overlap with the second set of frequency resources. In other examples, the first set of frequency resources and the second set of frequency resources may be the same frequency resources.

In the example of FIG. 10A, the diagram also includes PA input power indicator 1030 of a PA input power. The PA input power may correspond to the power of the signal being input to the PA 626 of FIG. 6. As shown in FIG. 10A, the PA input power during the first portion 1010 of the slot 1000 is relatively the same as the PA input power during the second portion 1020 of the slot 1000. That is, when the repeater employs TDM to multiplex the UE uplink signal 1012 and the MT uplink signal 1022, the overall PA input power stays relatively constant across the first portion 1010 to the second portion 1020, and, thus, may avoid an abrupt change in the PA input power, such as the abrupt change shown in the example of FIG. 8. In some examples, the change in the PA input power may be relatively small and, thus, the extra phase shift (e.g., phase distortion) associated with the multiplexed communication of slot 1000 may be within the first phase distortion range of phase distortion that is acceptable to the network entity.

Referring again to the example of FIG. 9, in some examples, the multiplexing configuration 922 may configure the repeater 906 to employ FDM when performing multiplexing of signals. For example, the network entity 902 may perform an FDM configuration procedure 950 to generate an FDM configuration 952. As shown in FIG. 9, the network entity 902 may output the FDM configuration 952, which is obtained by the repeater 906, to configure the FDM configuration 952 at the repeater 906. The FDM configuration 952 may cause the repeater 906 to output a long uplink signal when performing multiplexing of uplink signals. For example, the FDM configuration 952 may configure a dummy signal for the repeater 906 to use when performing multiplexing. The repeater 906 may multiplex the dummy signal with a UE uplink signal for portions of the UE uplink signal that are non-overlapping with an MT uplink signal.

For example, the UE 904 may transmit a third UE uplink signal 954 that is obtained by the repeater 906. The MT component of the repeater 906 may also generate a third MT uplink signal 956. In the illustrated example of FIG. 9, the repeater 906 may perform an FDM procedure 958 based on the FDM configuration 952. For example, the repeater 906 may output a third multiplexed communication 960 that is obtained by the network entity 902. The third multiplexed communication 960 may include the third UE uplink signal 954 multiplexed with the third MT uplink signal 956 and a dummy signal in the frequency domain. For example, the third UE uplink signal 954 may occupy 14 symbols and the third MT uplink signal 956 may occupy two symbols. The repeater may add 12 symbols of a dummy signal to the third MT uplink signal 956 so that a modified third MT uplink signal occupies 14 symbols (e.g., the same quantity of symbols as the third UE uplink signal 954). Aspects of a multiplexed communication employing FDM with a dummy signal are described in connection with the example of FIG. 10B.

Figure 10B:
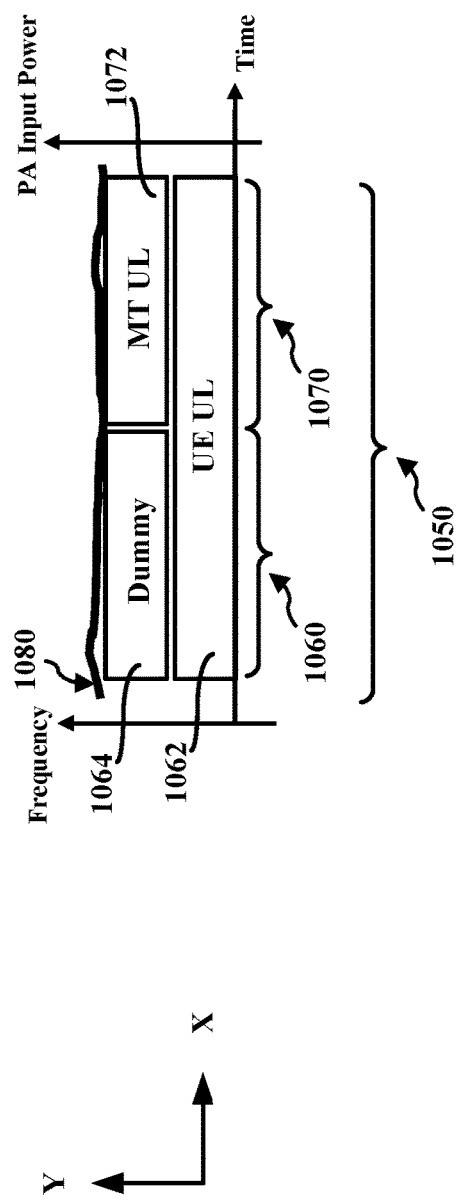
FIG. 10B is a diagram illustrating an example relationship of a frequency-division multiplexed signal and a power amplifier input power for a slot, in accordance with various aspects of the present disclosure.

FIG. 10B is a diagram illustrating an example relationship of a frequency-division multiplexed signal and a power amplifier input power for a slot 1050, as presented herein. In the example of FIG. 10B, the x-axis represents the time domain and the y-axis represents the frequency domain. As shown in FIG. 10B, a first portion 1060 of the slot 1050 is occupied by a UE uplink signal 1062 ("UE UL") and a dummy signal 1064. Aspects of the UE uplink signal 1062 may correspond to the third UE uplink signal 954 of FIG. 9. Aspects of the dummy signal 1064 may be configured based on an FDM configuration, such as the example FDM configuration 952 of FIG. 9. Additionally, a second portion 1070 of the slot 1050 is occupied by an MT uplink signal 1072 ("MT UL") and the UE uplink signal 1062. Aspects of the MT uplink signal 1072 may correspond to the third MT uplink signal 956 of FIG. 9.

As shown in FIG. 10B, the UE uplink signal 1062 and the MT uplink signal 1072 are frequency-division multiplexed. For example, during the second portion 1070 of the slot 1050, the UE uplink signal 1062 and the MT uplink signal 1072 are occupying time resources that are overlapping in the time domain. Although the UE uplink signal 1062 and the MT uplink signal 1072 are occupying frequency resources that are non-overlapping in the frequency domain in the example of FIG. 10B, in other examples, the UE uplink signal 1062 and the MT uplink signal 1072 may occupy frequency resources that are at least partially overlapping in the frequency domain.

Additionally, during the first portion 1060, the UE uplink signal 1062 and the dummy signal 1064 are occupying time resources that are overlapping in the time domain. In the illustrated example of FIG. 10B, the UE uplink signal 1062 and the dummy signal 1064 are occupying frequency resources that are non-overlapping in the frequency domain. However, in other examples, the UE uplink signal 1062 and the dummy signal 1064 may occupy frequency resources that are least partially overlapping in the frequency domain.

Although the example of FIG. 10B illustrates the dummy signal 1064 and the MT uplink signal 1072 overlapping in the frequency domain, in other examples, the dummy signal 1064 and the MT uplink signal 1072 may partially overlap in the frequency domain or may be non-overlapping in the frequency domain. For example, the dummy signal 1064 may occupy a first set of frequency resources, the MT uplink signal 1072 may occupy a second set of frequency resources, and the first set of frequency resources may partially overlap with the second set of frequency resources. In other examples, the first set of frequency resources and the second set of frequency resources may be different (e.g., non-overlapping) frequency resources.

In the example of FIG. 10B, the diagram also includes a PA input power indicator 1080 of a PA input power. The PA input power may correspond to the power of the signal being input to the PA 626 of FIG. 6. As shown in FIG. 10B, the PA input power during the first portion 1060 of the slot 1050 is relatively the same as the PA input power during the second portion 1070 of the slot 1050. That is, when the repeater employs FDM to multiplex the UE uplink signal 1062 with the dummy signal 1064 and the MT uplink signal 1072, the overall PA input power stays relatively constant across the first portion 1060 and the second portion 1070 of the slot 1050 and, thus, may result in avoiding an abrupt change in the PA input power, such as the abrupt change shown in the example of FIG. 8. In some examples, the change in the PA input power between the first portion 1060 and the second portion 1070 may be relatively small and, thus, the extra phase shift (e.g., phase distortion) associated with the multiplexed communication of slot 1050 may be within the first phase distortion range of phase distortion that is acceptable to the network entity. In some aspects, a relatively small change in the PA input power may be determined with respect to a threshold value. For example, if the change in the PA input power is less than a threshold value, the change may be relatively small.

Although the examples of FIG. 10A and FIG. 10B illustrate techniques to reduce the change in the overall PA input power associated with the respective multiplexed communication, the TDM example of FIG. 10A and the FDM example of FIG. 10B provide different benefits. For example, the FDM example of FIG. 10B may provide lower latency and relatively better time domain resource utilization compared to the TDM example of FIG. 10A. However, the TDM example of FIG. 10A may provide relatively better frequency domain resource utilization compared to the FDM example of FIG. 10B. The TDM example of FIG. 10A may also utilize lower power consumption at the repeater compared to the FDM example of FIG. 10B. Referring again to the example of FIG. 9, the network entity 902 may perform the measurement procedure 918 based on the first multiplexed communication 916. For example, the network entity 902 may measure a first phase associated with the first UE uplink signal 910 portion (e.g., of the first multiplexed communication 916) and a second phase associated with the first MT uplink signal 912 portion (e.g., of the first multiplexed communication 916) and determine the phase distortion based on the first phase and the second phase.

However, the phase distortion observed by the network entity 902 may be due to one or more impairment factors. For example, variations in a channel may contribute to phase distortion that is observed by the network entity 902. Thus, it may be difficult for the network entity 902 to determine whether the source of a degraded signal is due to phase distortion introduced by the repeater or another impairment factor.

Aspects disclosed herein provide techniques for a repeater to provide feedback to the network entity to assist the network entity to determine a level of phase distortion that may be introduced by the repeater when transmitting multiplexed uplink signals. In some examples, the feedback may include an indication of distortion based on power levels and calibration and/or implementation at the repeater. In some examples, the feedback may include an adjustment indication associated with an uplink signal power and/or a power configuration of the repeater and/or the UE. In some examples, the feedback may include an indication of the AM-PM conversion parameters of the repeater.

In some examples, the network entity may use the feedback provided by the repeater to determine whether the observed phase distortion is due to the multiplexing of uplink signals at the repeater. For example, the network entity may use the feedback to determine whether the observed phase distortion may be attributed to the repeater. In examples in which the network entity determines that the observed phase distortion of a received multiplexed communication may be attributed to the repeater, the network entity may determine to apply a multiplexing configuration at the repeater. For example, the network entity may perform the TDM configuration procedure 930 of FIG. 9 to configure the repeater to perform time-division multiplexing of uplink signals (e.g., UE uplink signals and MT uplink signals). In other examples, the network entity may perform the FDM configuration procedure 950 of FIG. 9 to configure the repeater to perform frequency-division multiplexing of UE uplink signals with a dummy signal and MT uplink signals. In examples in which the network entity determines that the observed phase distortion may be attributed to another impairment factor (e.g., not due to the repeater), the network entity may determine to apply other techniques to improve communication performance of multiplexed uplink signals. For example, the network entity may determine to allocate different frequency resources to the multiplexed uplink signals.

Figure 11:
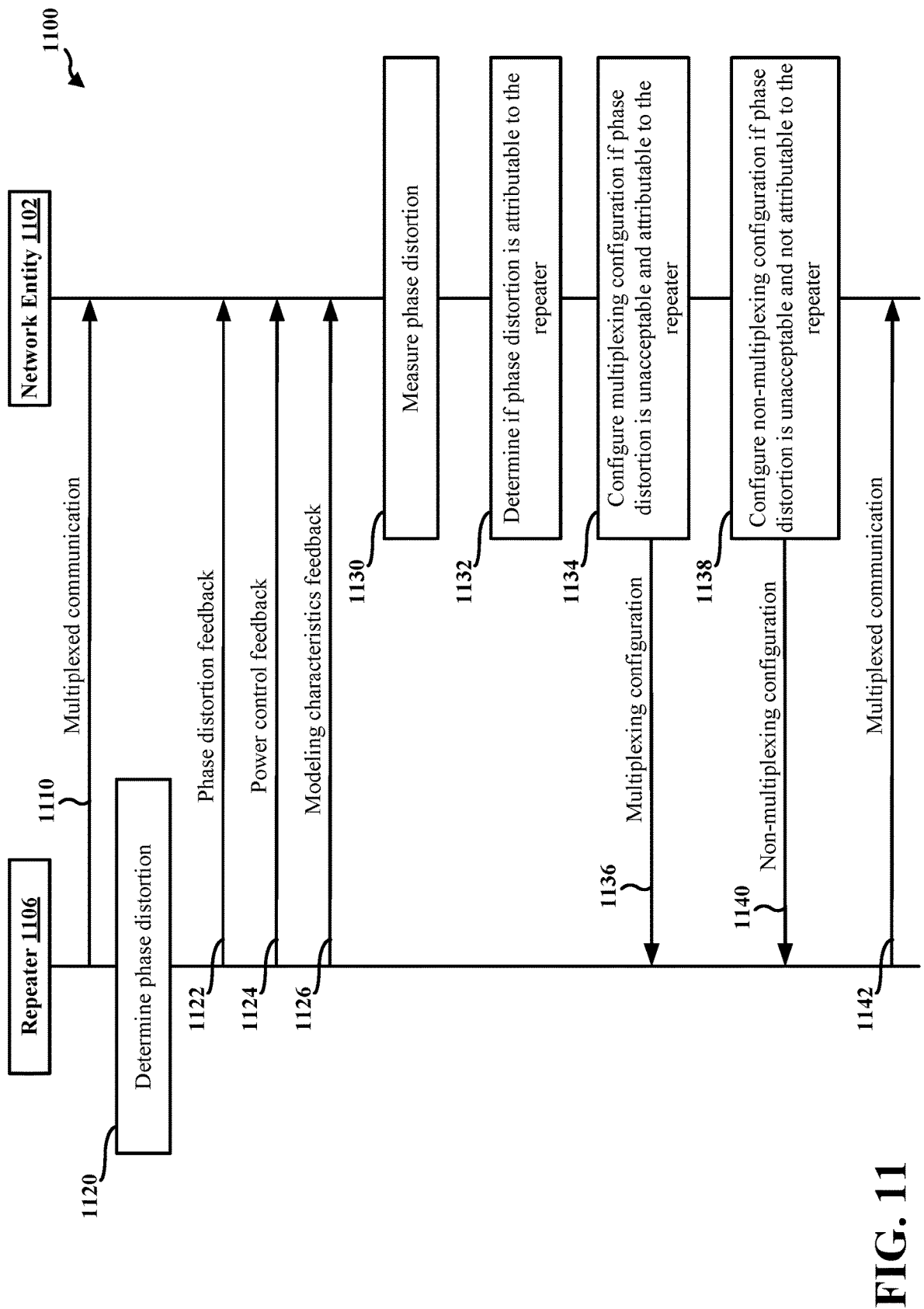
FIG. 11 illustrates an example communication flow between a network entity and a repeater, in accordance with various aspects of the present disclosure.

FIG. 11 illustrates an example communication flow 1100 between a network entity 1102 and a repeater 1106, as presented herein. One or more aspects described for the network entity 1102 may be performed by a component of a base station or a network entity, such as a CU, a DU, and/or an RU. In the illustrated example, the communication flow 1100 facilitates the repeater 1106 providing feedback related to phase distortion at the repeater 1106 to the network entity 1102. Aspects of the network entity 1102 may be implemented by the base station 102 of FIG. 1, the base station 310 of FIG. 3, the network entity 402 of FIG. 4, and/or the network entity 902 of FIG. 9. Aspects of the repeater 1106 may be implemented by the repeater 106 of FIG. 1, the repeater 406 of FIG. 4, and/or the repeater 906 of FIG. 9. Although not shown in the illustrated example of FIG. 11, in additional or alternative examples, the network entity 1102 and/or the repeater 1106 may be in communication with one or more other base stations, UEs, and/or repeaters.

In the illustrated example of FIG. 11, the repeater 1106 may output a first multiplexed communication 1110 that is obtained by the network entity 1102. The first multiplexed communication 1110 may include a UE uplink signal and an MT uplink signal. Aspects of the first multiplexed communication 1110 may be implemented by the first multiplexed communication 916 of FIG. 9.

The repeater 1106 may perform a phase distortion procedure 1120 to determine a phase distortion at the repeater 1106. In some examples, the repeater 1106 may determine the phase distortion based on power levels (e.g., PA input power) associated with uplink signals and/or a calibration of the repeater 1106. In some examples, the relation between the phase changes and the power level may be parameterized (e.g., as in Equation 3 and Equation 4), and the output of the calibration may be the value of the related parameters. In some examples, calibration of the repeater 1106 may include how the repeater 1106 learns phase changes with the power level. In some examples, the output of the calibration may include a look-up table mapping different power levels to different phase values. In some examples, the repeater 1106 may determine the phase distortion based on AM-PM conversion characteristics. For example, the repeater 1106 may apply Equation 3 and Equation 4 (reproduced below) to determine its phase distortion.

$$A(r) = \frac{\alpha_a r}{(1 + \beta_a r^2)} \quad \text{Equation 3}$$

$$\Phi(r) = \frac{\alpha_\Phi r^2}{(1 + \beta_\Phi r^2)} \quad \text{Equation 4}$$

As shown in FIG. 11, the repeater 1106 may provide feedback associated with the phase distortion at the repeater 1106 to the network entity 1102. For example, the repeater 1106 may provide phase distortion feedback 1122 that is obtained by the network entity 1102. The phase distortion feedback 1122 may indicate whether there is phase distortion at the repeater 1106 and/or an amount of phase distortion. In some examples, the phase distortion feedback 1122 may indicate an introduced phase distortion associated with a recent uplink communication. For example, the phase distortion feedback 1122 may indicate whether there was phase distortion associated with the first multiplexed communication 1110 and/or how much phase distortion was introduced in association with the first multiplexed communication 1110 by the repeater 1106.

In some examples, the phase distortion feedback 1122 may indicate an expected phase distortion associated with a future uplink communication and/or a hypothetical uplink communication. For example, based on power levels associated with uplink signals and the calibration of the repeater 1106, the repeater 1106 may have the ability to determine an expected phase distortion. In such examples, the phase distortion feedback 1122 may indicate the expected phase distortion.

In some examples, the repeater 1106 may provide power control feedback 1124 that is obtained by the network entity 1102. The power control feedback 1124 may indicate an adjustment to a power level associated with an uplink signal and/or a power configuration (e.g., a level of input power or output power, the gain setting, an amount of power back-off, etc.). The adjustment indicated by the power control feedback 1124 may reduce the phase distortion or limit the phase distortion impact to within a phase distortion range (e.g., within the first range of phase distortion that is acceptable). In some examples, the phase distortion range may be preconfigured at the repeater 1106. In some examples, the repeater 1106 may be configured with an indication of the phase distortion range. For example, the network entity 1102 may configure the repeater 1106 with the indication of the phase distortion range, for example, via RRC signaling, a MAC-CE, and/or DCI. Additionally, or alternatively, the network entity 1102 may configure the repeater 1106 with the indication of the phase distortion range via OAM signaling or OAM-related signaling.

In some examples, the power control feedback 1124 may indicate an adjustment that corresponds to the repeater 1106. For example, the power control feedback 1124 may indicate an adjustment to a power level applied to an MT uplink signal. In some examples, the power control feedback 1124 may indicate an adjustment to the power amplification applied by the repeater 1106 to a UE uplink signal.

Additionally, or alternatively, the power control feedback 1124 may indicate an adjustment that corresponds to a UE in communication with the network entity 1102 via the repeater 1106, such as the UE 904 in communication with the network entity 902 via the repeater 906 of FIG. 9. For example, the power control feedback 1124 may indicate an adjustment to a power level that the UE applies when transmitting a UE uplink signal that is received by the repeater 1106 for forwarding to the network entity 1102. In examples in which the power control feedback 1124 corresponds to the UE, the network entity 1102 may determine a change in transmission power associated with the UE based on the indicated adjustment. The network entity 1102 may then provide the change in the transmission power to the repeater 1106 to forward to the UE.

In some examples, the repeater 1106 may provide modeling characteristics feedback 1126 that is obtained by the network entity 1102. The modeling characteristics feedback 1126 may indicate the AM-PM conversion characteristics associated with the repeater 1106. In some examples, one or more AM-PM conversion characteristics may be grouped into one or more classes or categories. In some such examples, the modeling characteristics feedback 1126 may indicate a class or category mapping to AM-PM conversion characteristics of the repeater 1106. For example, a first category may correspond to a first set of AM-PM conversion characteristics and a second category may correspond to a second set of AM-PM conversion characteristics. In such examples, the modeling characteristics feedback 1126 may indicate the first category or the second category based on the AM-PM conversion characteristics of the repeater 1106. The network entity 1102 may then determine the AM-PM conversion characteristics of the repeater 1106 by mapping the indicated category to the first set of AM-PM conversion characteristics or to the second set of AM-PM conversion characteristics.

In some examples, the modeling characteristics feedback 1126 may indicate one or more parameters that represent the AM-PM conversion characteristics at the repeater 1106. For example, the modeling characteristics feedback 1126 may indicate the values of the α parameter and the β parameter associated with the Saleh model for non-linear amplifiers at the repeater 1106.

In some examples, the repeater 1106 may provide one or more of the phase distortion feedback 1122, the power control feedback 1124, and the modeling characteristics feedback 1126. In some examples, the feedback provided by the repeater 1106 may correspond to an MT uplink signal generated by an MT component of the repeater 1106, such as the MT component 908 of FIG. 9.

As shown in FIG. 11, the network entity 1102 may perform a measurement procedure 1130 to measure a phase distortion associated with a multiplexed communication. Aspects of the measurement procedure 1130 may be implemented by the measurement procedure 918 of FIG. 9. The network entity 1102 may perform a determination procedure 1132 to determine if the measured phase distortion (e.g., measured via the measurement procedure 1130) is attributable to the repeater 1106. For example, the network entity 1102 may use the feedback from the repeater 1106 (e.g., the phase distortion feedback 1122, the power control feedback 1124, and/or the modeling characteristics feedback 1126) to determine the phase distortion that is attributable to the repeater 1106. The network entity 1102 may then compare the determined phase distortion to the measured phase distortion and determine whether the measured phase distortion satisfies a phase distortion range associated with the determined phase distortion.

In the illustrated example of FIG. 11, if the network entity 1102 determines that the phase distortion is unacceptable (e.g., is within the second range of phase distortion) and is attributable to the repeater 1106, the network entity 1102 may perform a multiplexing configuration procedure 1134 to provide a multiplexing configuration 1136 to the repeater 1106. The network entity 1102 may provide the multiplexing configuration 1136 to the repeater 1106 to configure the repeater 1106 with a multiplexing configuration. In some examples, the multiplexing configuration 1136 may configure the repeater 1106 to employ time-division multiplexing, as described in connection with the TDM configuration 932 of FIG. 9. In other examples, the multiplexing configuration 1136 may configure the repeater 1106 to employ frequency-division multiplexing, as described in connection with the FDM configuration 952 of FIG. 9. Aspects of the multiplexing configuration procedure 1134 are described in connection with the configuration procedure 920, the TDM configuration procedure 930, and/or the FDM configuration procedure 950 of FIG. 9.

As shown in FIG. 11, if the network entity 1102 determines that the phase distortion is unacceptable (e.g., within the second range of phase distortion) and is not attributable to the repeater 1106, the network entity 1102 may perform a non-multiplexing configuration procedure 1138 to configure a non-multiplexing configuration 1140. The network entity 1102 may provide the non-multiplexing configuration 1140, that is obtained by the repeater 1106, to configure the repeater 1106 with the non-multiplexing configuration 1140. The non-multiplexing configuration 1140 may be applied by the repeater 1106 and/or a UE in communication with the network entity 1102 via the repeater 1106.

In the illustrated example of FIG. 11, the repeater 1106 may output a second multiplexed communication 1142 that is obtained by the network entity 1102. The second multiplexed communication 1142 may include a UE uplink signal time-division multiplexed with an MT uplink signal, as described in connection with the second multiplexed communication 940 of FIG. 9 and the example slot 1000 of FIG. 10A. In some examples, the second multiplexed communication 1142 may include a UE uplink signal frequency-division multiplexed with an MT uplink signal, as described in connection with the third multiplexed communication 960 of FIG. 9 and the example slot 1050 of FIG. 10B.

As described above, there may be a power mismatch between two signals when the repeater performs multiplexing of uplink signals. For example, when the repeater combines the UE uplink signal and the MT uplink signal to generate a multiplexed communication, there may be a relatively large mismatch between the respective powers of the uplink signals. In some examples, the MT uplink signal may be polluted with leakage associated with the UE uplink signal. In some such examples, the MT uplink signal may be combined with amplified noise and/or interference on unoccupied resource blocks (RBs). However, the MT uplink signal may not be associated with high signal to interference and noise ratio (SINR) and/or high modulation and coding scheme (MCS).

In some examples, the MT uplink signal and/or the UE uplink signal may be distorted due to a limited dynamic range associated with a power amplifier of the repeater (e.g., the PA 626 of FIG. 6). For example, a power amplifier of the repeater may be configured with a limited dynamic range, which may add non-linear amplification of a signal output by the repeater, such as a multiplexed signal.

Figure 12:
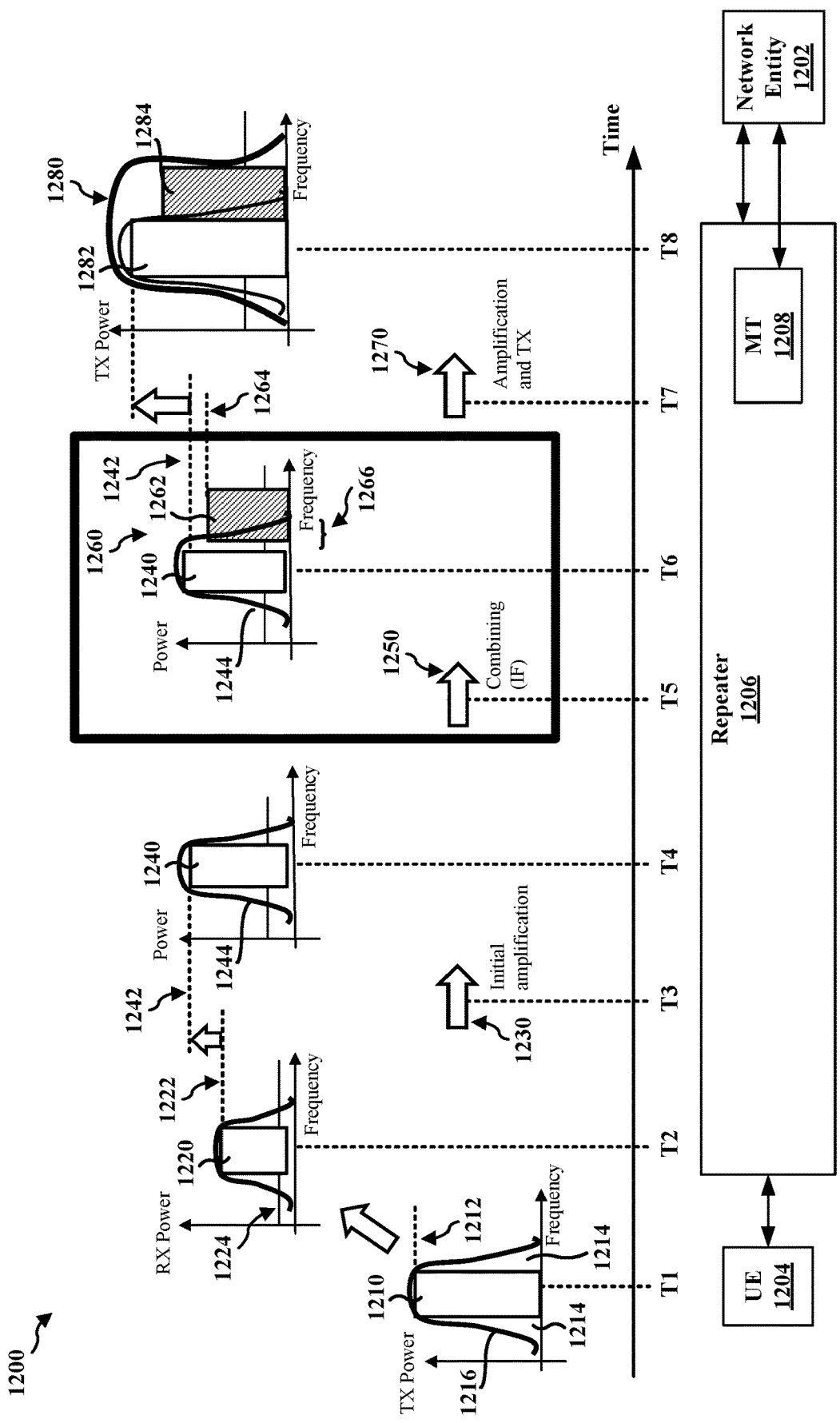
FIG. 12 is a diagram illustrating potential power mismatch between two signals in a communication system including a network entity, a UE, and a repeater including an MT component, in accordance with various aspects of the present disclosure.

FIG. 12 is a diagram 1200 illustrating potential power mismatch between two signals in a communication system including a network entity 1202, a UE 1204, and a repeater 1206 including an MT component 1208, as presented herein. In the example of FIG. 12, the repeater 1206 is configured to forward communications between the network entity 1202 and the UE 1204, for example, via a forwarding component of the repeater 1206, such as the forwarding component 410 of FIG. 4. The example of FIG. 12 illustrates changes in power relative to frequency resources and over time.

In the illustrated example of FIG. 12, the UE 1204 transmits a UE uplink signal 1210 at time T1. The UE 1204 may transmit the UE uplink signal 1210 with a transmit uplink signal power 1212. In the example of FIG. 12, the UE uplink signal 1210 may be associated with a first set of frequency resources. However, as shown in FIG. 12, there may be leakage signal 1214 into other frequencies (e.g., into frequency resources outside of the first set of frequency resources).

In the illustrated example of FIG. 12, the repeater 1206 obtains a received UE uplink signal 1220 at time T2. The received UE uplink signal 1220 may correspond to the UE uplink signal 1210 transmitted by the UE 1204. The repeater 1206 may obtain the received UE uplink signal 1220 with a receive uplink signal power 1222. In some examples, the receive uplink signal power 1222 may be less than the transmit uplink signal power 1212, for example, due to pathloss associated with a channel. In the example of FIG. 12, a noise floor 1224 may be associated with the received UE uplink signal 1220. The noise floor 1224 may indicate a level of noise associated with receiving the received UE uplink signal 1220. For example, the noise floor 1224 may correspond to thermal noise.

At time T3, the repeater 1206 may perform an initial amplification procedure 1230 of the received UE uplink signal 1220. For example, the initial amplification procedure 1230, at time T3, may increase the power associated with the received UE uplink signal 1220 to generate an amplified UE uplink signal 1240 at time T4. In the example of FIG. 12, the amplified UE uplink signal 1240 is associated with a UE uplink signal power 1242. As shown in FIG. 12, the UE uplink signal power 1242 is associated with a higher power level than the receive uplink signal power 1222 associated with the received UE uplink signal 1220.

At time T5, the repeater 1206 may perform a combining procedure 1250 on the amplified UE uplink signal 1240 and an MT uplink signal. For example, at time T6, a combined uplink signal 1260 includes the amplified UE uplink signal 1240 and an MT uplink signal 1262. The MT uplink signal 1262 may be generated by the MT component 1208. The amplified UE uplink signal 1240 may be associated with the UE uplink signal power 1242. The MT uplink signal 1262 may be associated with an MT uplink signal power 1264. In the illustrated example of FIG. 12, the combined uplink signal 1260 is a frequency-division multiplexed signal. For example, the amplified UE uplink signal 1240 occupies a first set of frequency resources that are non-overlapping in the frequency domain with a second set of frequency resources associated with the MT uplink signal 1262.

At time T7, the repeater 1206 performs a procedure 1270 to amplify and transmit the combined uplink signal 1260. For example, at time T8, the repeater 1206 may output a multiplexed uplink signal 1280. The procedure 1270 may increase an overall power associated with the multiplexed uplink signal 1280 and may also increase the power associated with a combined UE uplink signal 1282 and a combined MT uplink signal 1284 of the multiplexed uplink signal 1280.

In some examples, when performing the combining procedure 1250 at the time T5, there may be a large power mismatch between the amplified UE uplink signal 1240 and the MT uplink signal 1262. For example, a difference between the UE uplink signal power 1242 associated with the amplified UE uplink signal 1240 and the MT uplink signal power 1264 associated with the MT uplink signal 1262 may be larger than a threshold. In some such examples, the MT uplink signal 1262 may be polluted with leakage associated with the amplified UE uplink signal 1240.

For example, and referring to the UE uplink signal 1210 at the time T1, there may be leakage signal 1214 associated with frequency resources outside the frequency resources allocated to the UE uplink signal 1210. The leakage signal 1214 may be due to, for example, non-linearity and/or filtering associated with the UE uplink signal 1210. In the example of FIG. 12, a power spectral density (PSD) shape (e.g., a PSD shape 1216) indicates a power spectral shape associated with the UE uplink signal 1210 including the leakage signal 1214.

In the illustrated example of FIG. 12, after performing the initial amplification procedure 1230 at the time T3, all components associated with the received UE uplink signal 1220 are amplified. For example, the power of the amplified UE uplink signal 1240 is increased, the noise floor is increased, and the leakage signal is also increased. As shown in FIG. 12, a PSD shape 1244 indicates a power spectral shape associated with the amplified UE uplink signal 1240 at the time T4 and at the time T6. In the example of FIG. 12, at the time T6, a portion of the power spectral shape of the amplified UE uplink signal 1240 overlaps with the MT uplink signal 1262. For example, a leakage portion 1266 of the power spectral shape of the amplified UE uplink signal 1240 indicates a leakage of the amplified UE uplink signal 1240 into the MT uplink signal 1262. In the example of FIG. 12, the leakage indicated by the leakage portion 1266 may pollute the MT uplink signal 1262. For example, after the initial amplification procedure 1230, the power associated with the leakage portion 1266 may be relatively larger than the power of the MT uplink signal 1262 (e.g., the MT uplink signal power 1264). In such examples, the leakage indicated by the leakage portion 1266 may pollute the MT uplink signal 1262.

In some examples, a power mismatch between the two signals may cause one or both of the uplink signals to be distorted due to a limited dynamic range of the power amplifier of the repeater 1206. For example, the power amplifier may be associated with a limited dynamic range of 20 decibels (dB). In some such examples, the power amplifier may be configured to amplify a signal by 20 dB with a linear amplification. However, outside of the limited dynamic range (e.g., outside of the 20 dB), the amplification applied by the power amplifier may be saturated and associated with a non-linear region. As a result, the power gain added by the power amplifier may be non-linear and the signal may become distorted.

In examples in which a first signal is relatively stronger than a second signal (e.g., stronger than the limited dynamic range), then the weaker signal may become stronger in the non-linear region, which may result in the weaker signal being distorted. For example, if the difference between the UE uplink signal power 1242 and the MT uplink signal 1262 is more than the limited dynamic range (e.g., more than the 20 dB), then applying the procedure 1270 at the time T7 may result in the power gain associated with the combined UE uplink signal 1282 being linear, while the power gain associated with the combined MT uplink signal 1284 may be non-linear. In some such examples, the non-linear power gain associated with the combined MT uplink signal 1284 at the time T8 may cause the combined MT uplink signal 1284 to appear distorted compared to an expected power gain due to a linear amplification.

In some examples, if the difference between the UE uplink signal power 1242 and the MT uplink signal power 1264 is less than the limited dynamic range of the power amplifier of the repeater 1206 (e.g., at the time T6), then the power gain applied to the respective signals at the time T7 may appear linear (e.g., for the combined UE uplink signal 1282 and the combined MT uplink signal 1284 at the time T8). However, if the difference between the UE uplink signal power 1242 and the MT uplink signal power 1264 is greater than the limited dynamic range of the power amplifier of the repeater 1206, then the weaker signal may be distorted, for example, due to a non-linear power gain.

Aspects disclosed herein provide techniques for reducing or limiting a power imbalance between the combined UE uplink signal and the combined MT uplink signal. For example, disclosed aspects may limit the power of the amplified combined uplink signal ($P_{out}$) to be less than or equal to a maximum output power supported by the repeater ($P_{TXmax,UL}^{NCR}$). Disclosed aspects may also limit the amplification gain applied to the received UE uplink signal (e.g., at the time T7 of FIG. 12). In some examples, the repeater may limit the amplification gain applied regardless of whether the repeater is multiplexing the received UE uplink signal with an MT uplink signal. Disclosed aspects may also limit the difference in the PSD associated with the combined UE uplink signal and the PSD associated with the combined MT uplink signal to satisfy a PSD threshold. For example, the difference in the respective PSD may be less than or equal to the PSD threshold.

Figure 13:
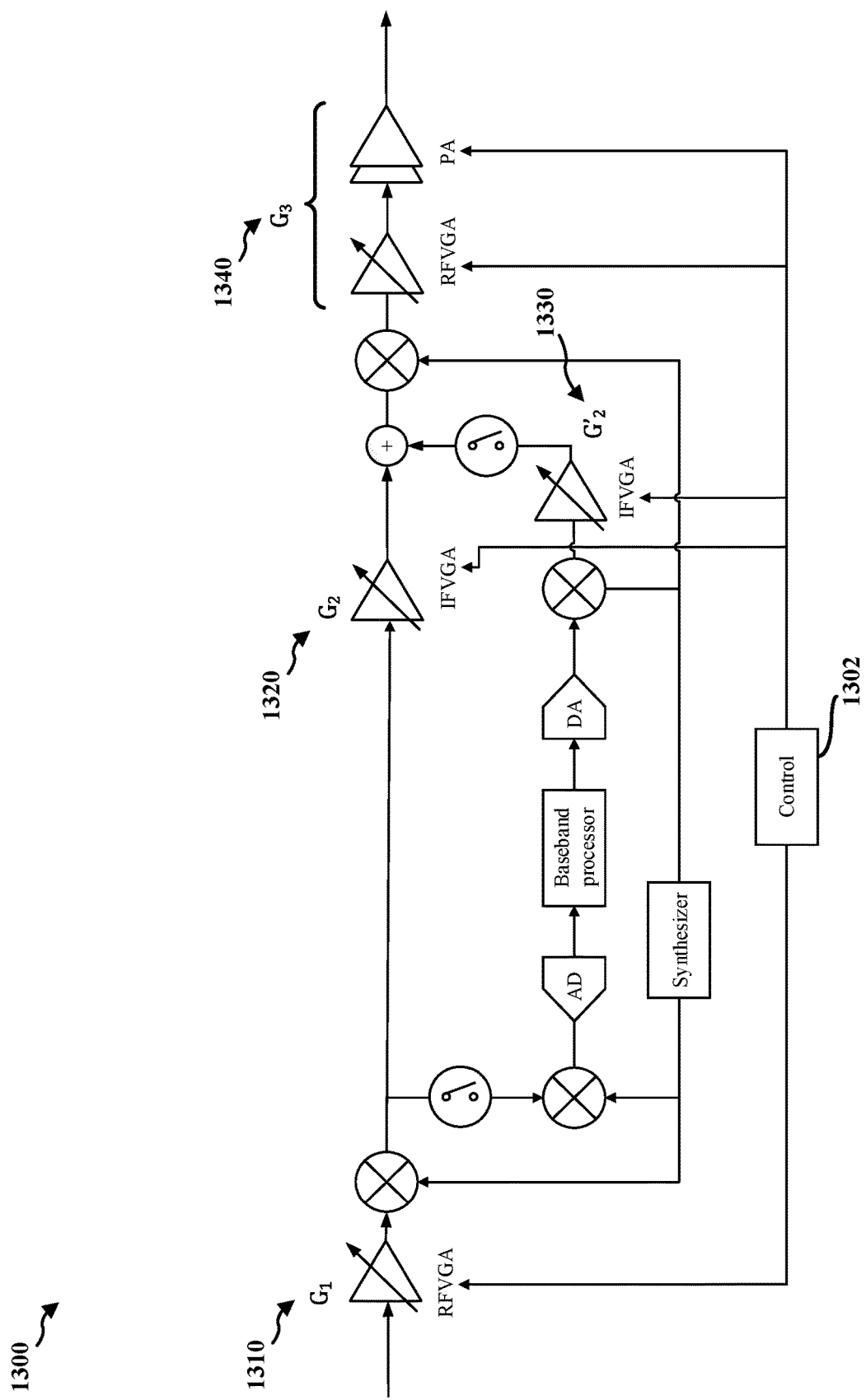
FIG. 13 is a diagram illustrating an example power control architecture of a repeater, in accordance with various aspects of the present disclosure.

FIG. 13 is a diagram illustrating an example power control architecture 1300 of a repeater, such as an repeater, as presented herein. Aspects of the power control architecture 1300 may be similar to the architecture 600 of FIG. 6. As shown in FIG. 13, the power control architecture 1300 includes multiple stages of power amplification. For example, the power control architecture 1300 includes a first power amplification stage 1310, a second power amplification stage 1320, a third power amplification stage 1330, and a fourth power amplification stage 1340. The first power amplification stage 1310 may apply a first power gain ("G$_1$"), the second power amplification stage 1320 may apply a second power gain ("G$_2$"), the third power amplification stage 1330 may apply a third power gain ("G'$_2$"), and the fourth power amplification stage 1340 may apply a fourth power gain ("G$_3$"). In the example of FIG. 13, the first power amplification stage 1310 and the fourth power amplification stage 1340 are amplification stages occurring in the RF domain, and the second power amplification stage 1320 and the third power amplification stage 1330 are amplification states occurring in the IF domain.

In the example of FIG. 13, the power amplification stages may be associated with variable gain amplifiers (VGAs). As shown in FIG. 13, a controller 1302 of the repeater may facilitate adjusting one or more of the VGAs. In some examples, the controller 1302 adjusting one or more of the VGAs may be automated. For example, a repeater implementation may support one or more algorithms and/or control logic that is able to process one or more inputs and/or measurements and then generate one or more outputs without involvement (e.g., signaling, information, etc.) from another node, such as a network entity. In some examples, the controller 1302 may adjust one or more of the VGAs based on commands obtained from a network entity.

Figure 14:
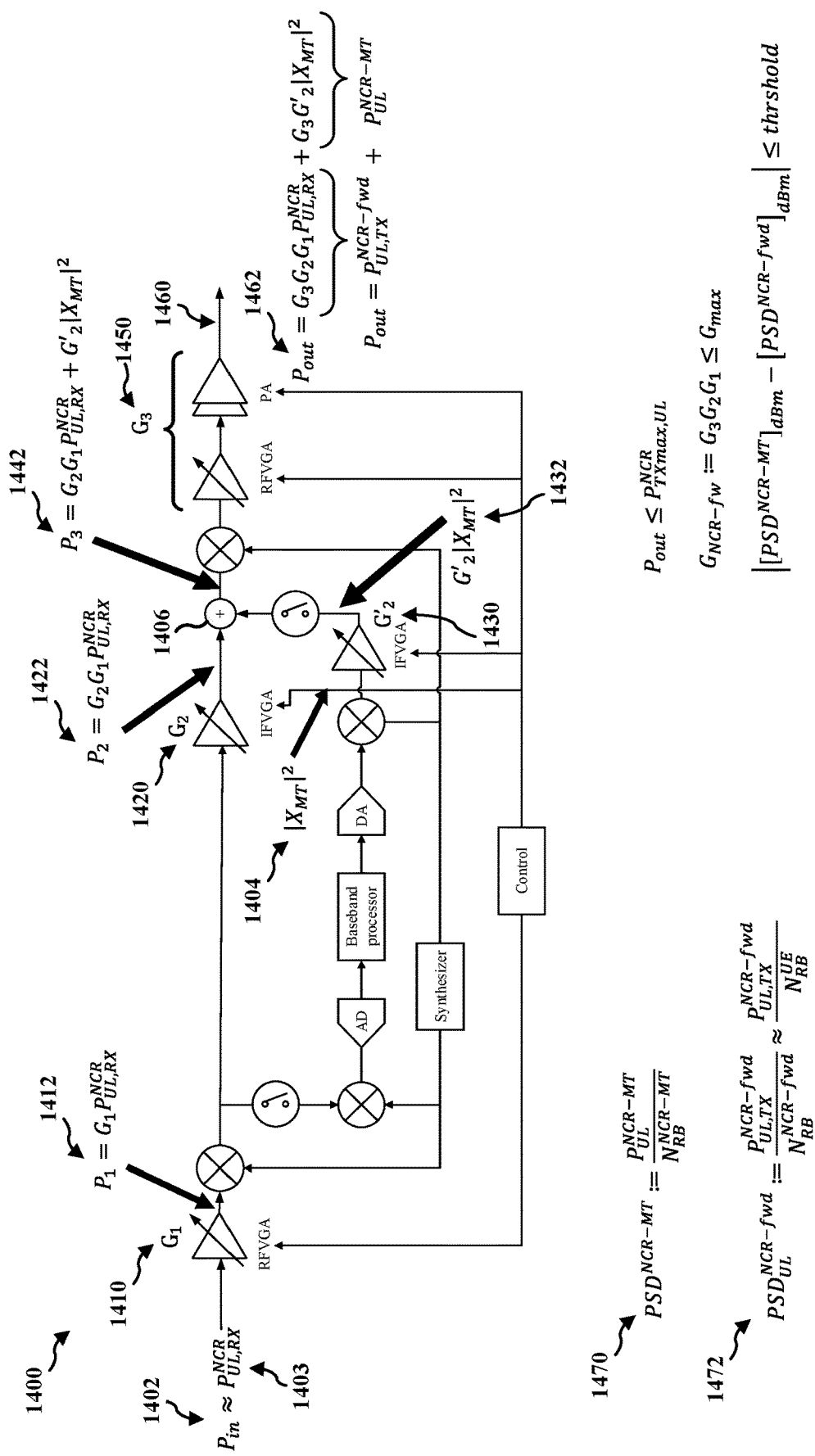
FIG. 14 is a diagram illustrating example powers of signals based on a power control architecture of a repeater, in accordance with various aspects of the present disclosure.

FIG. 14 is a diagram illustrating example powers of signals based on a power control architecture 1400 of a repeater, such as an NCR, as presented herein. Aspects of the power control architecture 1400 may be similar to the architecture 600 of FIG. 6 and/or the power control architecture 1300 of FIG. 13.

In the illustrated example of FIG. 14, an input power 1402 (P$_{in}$) is associated with an input signal. For example, the input signal may correspond to a received UE uplink signal (e.g., the received UE uplink signal 1220 of FIG. 12). The received UE uplink signal may have a received power 1403 (P$_{UL,Rx}^{NCR}$) that corresponds to the input power 1402. At a first power amplification stage 1410, the power control architecture 1400 applies a first power gain ("G$_1$") in the RF domain. After the first power amplification stage 1410, the signal may have a first power 1412 ("P$_1$") that is based on the power of the received UE uplink signal (P$_{UL,Rx}^{NCR}$) and the first power gain G$_1$.

At a second power amplification stage 1420, the power control architecture 1400 applies a second power gain ("G$_2$") in the IF domain. After the second power amplification stage 1420, the signal may have a second power 1422 ("P$_2$") that is based on the power of the received UE uplink signal (P$_{UL,Rx}^{NCR}$), the first power gain G$_1$, and the second power gain G$_2$.

As shown in FIG. 14, an MT uplink signal may be associated with an MT uplink signal power 1404 ("|X$_{MT}$|$^2$"). The MT uplink signal may pass through a third power amplification stage 1430. At the third power amplification stage 1430, the power control architecture 1400 may apply a third power gain ("G'$_2$") in the IF domain to the MT uplink signal. After the third power amplification stage 1430, the MT uplink signal may have an amplified MT signal power 1432 that is based on the MT uplink signal power 1404 (|X$_{MT}$|$^2$) and the third power gain G'$_2$.

In the example of FIG. 14, the power control architecture 1400 includes a signal combiner 1406 to combine the received UE uplink signal and the MT uplink signal. Aspects of the signal combiner 1406 may be similar to the signal combiner 624 of FIG. 6. As shown in FIG. 14, a combined signal that is output by the signal combiner 1406 may have a third power 1442 ("P$_3$") that is based on the second power ("P$_2$") and the amplified MT signal power 1432.

In the illustrated example of FIG. 14, the combined signal may travel through a fourth power amplification stage 1450. The fourth power amplification stage 1450 may apply a fourth power gain ("G$_3$") to the combined signal. The fourth power amplification stage 1450 may apply the fourth power gain in the RF domain.

In the example of FIG. 14, a combined output signal 1460 may be output by the repeater to a network entity. The combined output signal 1460 may be associated with an output power 1462 ("P$_{out}$"). In the example of FIG. 14, the output power 1462 is based on the power of the uplink signal being forwarded by the forwarding component of the repeater (P$_{UL,Tx}^{NCR-fwd}$) and the power of the uplink signal corresponding to the MT uplink signal (P$_{ULx}^{NCR-MT}$).

As described above, the power control architecture 1400 may enable the repeater to limit or reduce the power imbalance between the two uplink signals. In a first aspect, the repeater may limit the output power 1462 to be less than or equal to a maximum output power supported by the repeater. For example, the repeater may apply Equation 5 (below) to make sure that the overall power of the combined output signal 1460 is less than a transmit power budget.

$$P_{out} \leq P_{TXmax,UL}^{NCR} \qquad \text{Equation 5}$$

In Equation 5, the term "P$_{out}$" represents the overall power of the output power 1462, and the term "P$_{TXmax,UL}^{NCR}$" represents the transmit power budget. The transmit power budget may indicate a maximum output power supported by the repeater for uplink transmissions.

In a second aspect, the repeater may limit or reduce the power imbalance between the two uplink signals by applying Equation 6 (below). By applying Equation 6, the power control architecture 1400 limits the amplification gain applied to the received UE uplink signal.

$$G_{NCR\text{-}fwd} = G_1 G_2 G_3 \leq G_{max} \qquad \text{Equation 6}$$

In Equation 6, the term "G$_{NCR\text{-}fwd}$" represents the amplification gain applied by the forwarding component of the repeater to the received UE uplink signal, and the term "G$_{max}$" represents a maximum amplification gain. Additionally, as shown in Equation 6, the forwarding component amplification gain (G$_{NCR\text{-}fwd}$) may be represented by the product of the first power gain ("G$_1$"), the fourth power gain ("G$_3$"), and the fourth power gain ("G$_3$"). As shown in Equation 6, the forwarding component amplification gain (G$_{NCR\text{-}fwd}$) is capped by the maximum amplification gain (G$_{max}$). That is, the forwarding component amplification gain (G$_{NCR\text{-}fwd}$) is configured to be less than or equal to the maximum amplification gain (G$_{max}$).

In a third aspect, the repeater may limit the difference in an MT PSD 1470 ("PSD$^{NCR\text{-}MT}$") associated with the combined MT uplink signal (e.g., the combined MT uplink signal 1284 of FIG. 12) and a forwarding PSD 1472 ("PSD$^{NCR\text{-}fwd}$") associated with the combined UE uplink signal (e.g., the combined UE uplink signal 1282 of FIG. 12). In some examples, the repeater may apply Equation 7 (below) to limit the difference in the respective PSDs to satisfy a PSD threshold.

$$|[PSD^{NCR\text{-}MT}]_{dBm} - [PSD^{NCR\text{-}fwd}]_{dBm}| \leq \text{thrshold} \qquad \text{Equation 7}$$

In Equation 7, the term "[PSD$^{NCR\text{-}MT}$]$_{dBm}$" represents the PSD of the combined MT uplink signal (e.g., the MT PSD 1470), the term "[PSD$^{NCR\text{-}fwd}$]$_{dBm}$" represents the PSD of the combined UE uplink signal (e.g., the forwarding PSD 1472), and the term "thrshold" represents the PSD threshold. As shown in Equation 7, the MT PSD 1470 and the forwarding PSD 1472 may be measured in decibels relative to one milliwatt (dBm).

In examples in which the PSD threshold is satisfied, the power imbalance associated with the two uplink signals may be limited. In examples in which the PSD threshold is not satisfied (e.g., the difference in PSD is greater than the PSD threshold), then the repeater may still output the combined output signal 1460. However, performance associated with the combined output signal 1460 may be impacted.

Figure 15:
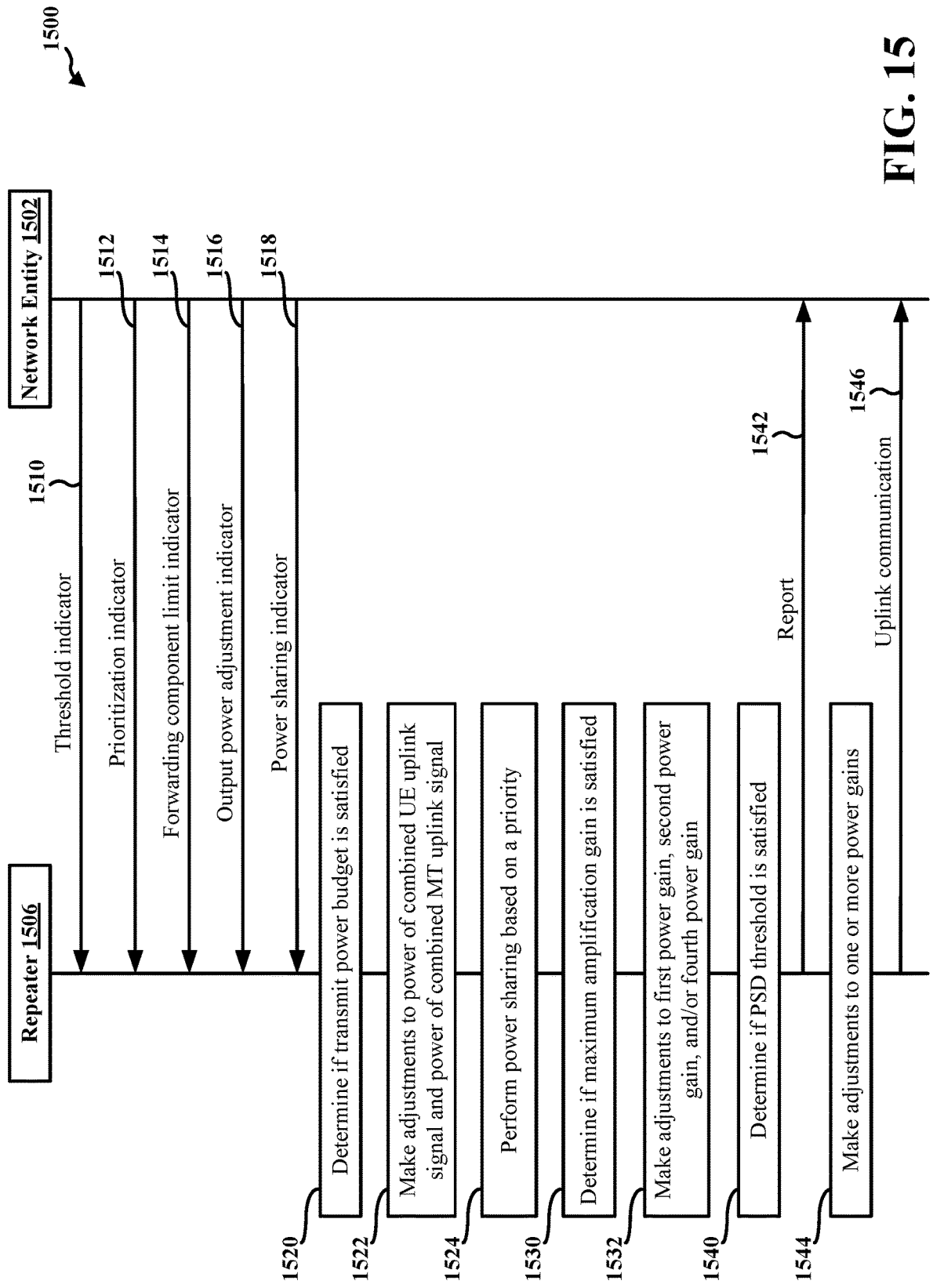
FIG. 15 illustrates an example communication flow between a network entity and a repeater, in accordance with various aspects of the present disclosure.

FIG. 15 illustrates an example communication flow 1500 between a network entity 1502 and a repeater 1506, as presented herein. One or more aspects described for the network entity 1502 may be performed by a component of a base station or a network entity, such as a CU, a DU, and/or an RU. In the illustrated example, the communication flow 1500 facilitates the repeater 1506 employing power control techniques to limit or reduce power imbalance between two uplink signals. Aspects of the network entity 1502 may be implemented by the base station 102 of FIG. 1, the base station 310 of FIG. 3, the network entity 402 of FIG. 4, the network entity 902 of FIG. 9, and/or the network entity 1102 of FIG. 11. Aspects of the repeater 1506 may be implemented by the repeater 106 of FIG. 1, the repeater 406 of FIG. 4, the repeater 906 of FIG. 9, and/or the repeater 1106 of FIG. 11. Although not shown in the illustrated example of FIG. 15, in additional or alternative examples, the network entity 1502 and/or the repeater 1506 may be in communication with one or more other base stations, UEs, or repeaters.

In the illustrated example of FIG. 15, the repeater 1506 applies one or more techniques to limit or reduce power imbalance between two uplink signals, such as a combined UE uplink signal and a combined MT uplink signal. In some examples, the repeater 1506 may apply the one or more techniques without side control information associated with power controls from the network entity 1502. For example, the repeater 1506 may apply procedures to satisfy a transmit power budget, to satisfy a maximum amplification gain, and/or to satisfy a PSD threshold.

In some examples, although the repeater 1506 may not receive side control information associated with power controls from the network entity 1502, the repeater 1506 may still receive indicators that configure one or more thresholds and/or prioritizations at the repeater 1506. For example, in the illustrated example of FIG. 15, the network entity 1502 may provide a threshold indicator 1510 that is obtained by the repeater 1506. The threshold indicator 1510 may configure one or more thresholds at the repeater 1506. In some examples, the threshold indicator 1510 may configure a PSD threshold at the repeater 1506. In some examples, the threshold indicator 1510 may configure an MCS threshold at the repeater 1506. In some examples, the threshold indicator 1510 may configure a signal to noise ratio (SNR) threshold at the repeater 1506. In some examples, the threshold indicator 1510 may configure a reference signal received power (RSRP) threshold at the repeater 1506.

In some examples, the threshold indicator 1510 may configure a measured RF power threshold and/or a measured IF power threshold at the repeater 1506. In some examples, the network entity 1502 may provide the threshold indicator 1510 via semi-static signaling. In some examples, the network entity 1502 may provide the threshold indicator 1510 via dynamic signaling. For example, the network entity 1502 may provide the threshold indicator 1510 for an upcoming operation at the repeater 1506. In some examples, the network entity 1502 may provide the threshold indicator 1510 via RRC signaling, a MAC-CE, DCI, OAM (and/or OAM-related) signaling, etc.

Although the example of FIG. 15 illustrates that the network entity 1502 provides the threshold indicator 1510 that is obtained by the repeater 1506, in other examples, the repeater 1506 may be preconfigured with one or more thresholds that may be indicated by the threshold indicator 1510.

In the illustrated example of FIG. 15, the repeater 1506 may apply a power determination procedure 1520 to determine whether the output power of a combined output signal satisfies a transmit power budget. For example, the repeater 1506 may apply Equation 5 (reproduced below) to determine if the transmit power budget ($P_{TXmax,UL}^{NCR}$) is satisfied.

$$P_{out} \leq P_{TXmax,UL}^{NCR} \qquad \text{Equation 5}$$

In some examples in which the output power is shared by the combined UE uplink signal and the combined MT uplink signal, the repeater 1506 may determine to make an adjustment to the power of the combined UE uplink signal and/or the power of the combined MT uplink signal to satisfy the transmit power budget. In some examples, the repeater 1506 may perform an adjustments procedure 1522 to adjust the power of the combined UE uplink signal and/or the power of the combined MT uplink signal to satisfy the transmit power budget. For example, the transmit power budget may be 32 dBm, and the output power of the combined output signal may be 35 dBm. In some such examples, the repeater 1506 may reduce the power of the combined UE uplink signal and the power of the combined MT uplink signal by 3 dBm each to satisfy the transmit power budget.

In some examples, the repeater 1506 may perform a power sharing procedure 1524 to facilitate power sharing between the combined UE uplink signal and the combined MT uplink signal based on priorities. For example, the repeater 1506 may be configured to prioritize the combined MT uplink signal. In some such examples, the repeater 1506 may first allocate power to the combined MT uplink signal and may then allocate any remaining power (e.g., based on the transmit power budget) to the combined UE uplink signal. In some examples, the repeater 1506 may be configured with a minimum power gain and/or a minimum amplification gain. In some such examples, if the adjusted power of the combined UE uplink signal fails to satisfy the minimum power gain and/or the minimum amplification gain, the repeater 1506 may determine to drop the combined UE uplink signal. For example, the repeater 1506 may determine to skip forwarding the received UE uplink signal.

Although the above example describes a scenario in which the repeater 1506 prioritizes the combined MT uplink signal, in other examples, the repeater 1506 may apply additional or alternate priorities when performing power sharing to satisfy the transmit power budget. For example, the repeater 1506 may be configured to prioritize the combined UE uplink signal. In some examples, the repeater 1506 may be configured to prioritize a signal based on an earlier occurring time in the time domain. For example, a received UE uplink signal may be associated with a transmission time (e.g., from a UE) and an MT uplink signal may be associated with a generated time. In some such examples, the repeater 1506 may prioritize the received UE uplink signal when the transmission time occurs before the generation time, for example, in the time domain. In other examples, the repeater

1506 may prioritize the MT uplink signal when the generation time occurs before the transmission time, for example, in the time domain.

In some examples, the repeater 1506 may be configured to prioritize a signal based on its scheduled time. For example, a UE may receive scheduling information associated with the UE uplink signal for a first time and the MT component of the repeater 1506 may receive scheduling information associated with the MT uplink signal for a second time. In some such examples, the repeater 1506 may prioritize the respective uplink signal scheduled via the scheduling information associated with the earlier occurring time in the time domain. In some examples, the repeater 1506 may be configured to prioritize a signal that is dynamically scheduled earlier.

In some examples, the repeater 1506 may be configured to prioritize a signal that is dynamically scheduled over a signal that is semi-statically scheduled. For example, the received UE uplink signal may be associated with dynamic scheduling and the MT uplink signal may be associated with semi-static scheduling. In some such examples, the repeater 1506 may prioritize the received UE uplink signal over its MT uplink signal. In other examples, the repeater 1506 may be configured to prioritize a signal that is semi-statically scheduled over a signal that is dynamically scheduled.

In some examples, the repeater 1506 may be configured to prioritize a signal based on a prioritization value. For example, the network entity 1502 may output a prioritization indicator 1512 that indicates a first priority level associated with a received UE uplink signal and a second priority level associated with the MT uplink signal. In some such examples, the repeater 1506 may prioritize the uplink signal associated with the higher priority level.

In some examples, prioritization of an MT uplink signal or a UE uplink signal, at the repeater 1506, may be channel-specific. For example, the repeater 1506 may be configured to prioritize a signal that is associated with a control channel over a signal that is associated with a data channel.

Figure 16:
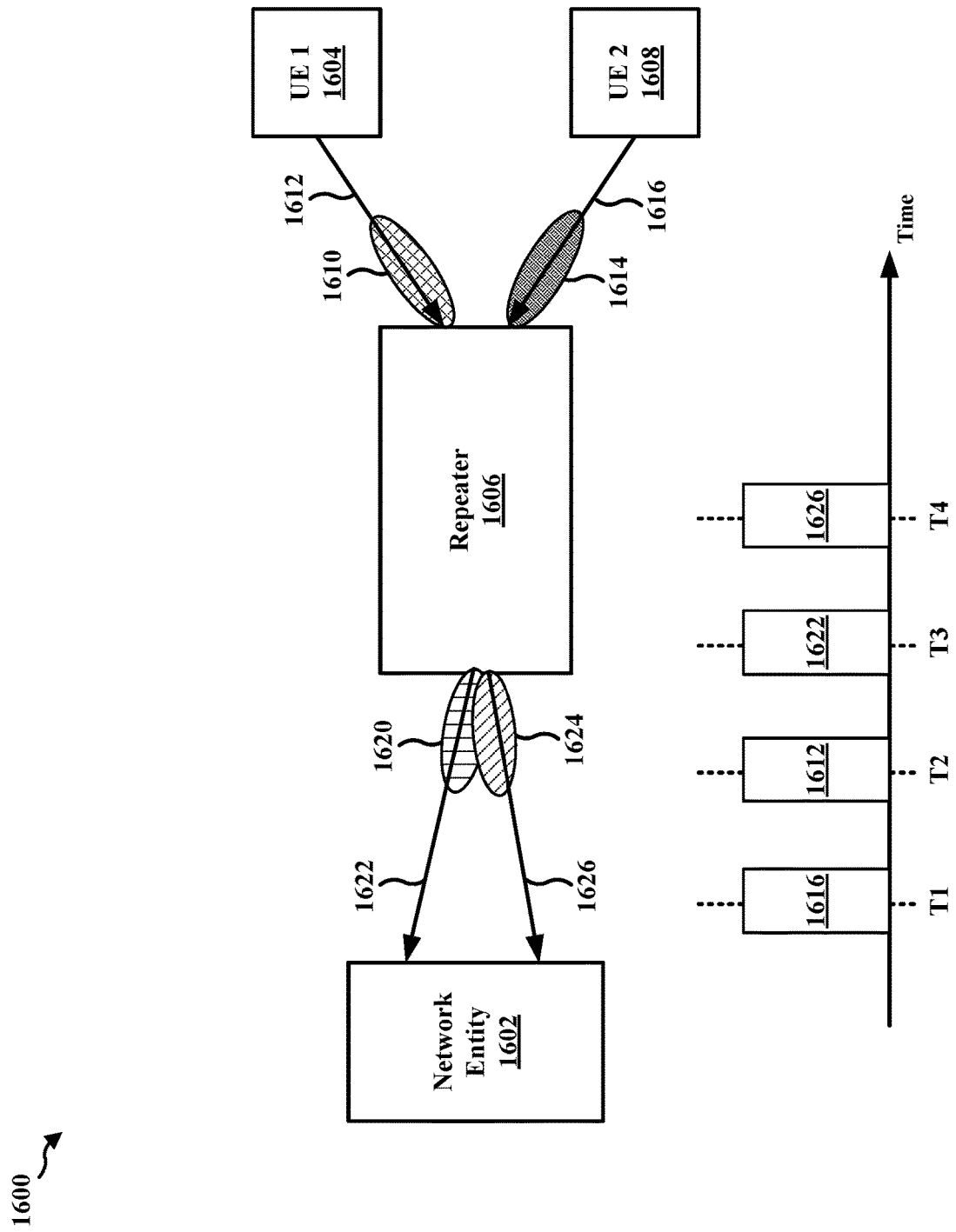
FIG. 16 is a diagram illustrating an example of a wireless communications system, in accordance with various aspects of the present disclosure.

In some examples, prioritization of an MT uplink signal or a UE uplink signal, at the repeater 1506, may be beam-specific. For example, FIG. 16 is a diagram illustrating an example of a wireless communications system 1600, as presented herein. The example wireless communications system 1600 includes a repeater 1606 in communication with a network entity 1602, a first UE 1604 ("UE 1"), and a second UE 1608 ("UE 2"). The repeater 1606 may be configured to communicate with one or more UEs via access link beams and may communicate with one or more network entities via backhaul link beams. For example, in the illustrated example of FIG. 16, the repeater 1606 includes a first access link beam 1610 and a second access link beam 1614. The example repeater 1606 of FIG. 16 also includes a first backhaul link beam 1620 and a second backhaul link beam 1624.

In some examples, the repeater 1606 may be configured to prioritize its MT uplink signal or a received UE uplink signal based on the access link beam that the repeater 1606 uses to receive a UE uplink signal for a given occasion. For example, the repeater 1606 may prioritize a UE uplink signal over its MT uplink signal when the repeater 1606 receives the UE uplink signal via the second access link beam 1614. Additionally, the repeater 1606 may prioritize its MT uplink signal over a UE uplink signal when the repeater 1606 receives the UE uplink signal via the first access link beam 1610. As shown in FIG. 16, the repeater 1606 may receive a first UE uplink signal 1612 from the first UE 1604 via the first access link beam 1610. The repeater 1606 may also be configured to receive a second UE uplink signal 1616 from the second UE 1608 via the second access link beam 1614. In the illustrated example of FIG. 16, the repeater 1606 may receive the second UE uplink signal 1616 at a time T1 and may receive the first UE uplink signal 1612 at a time T2. In some such examples, and based on the above prioritization rules, at the time T1, the repeater 1606 may prioritize the second UE uplink signal 1616 over its MT uplink signal. Additionally, at the time T2, the repeater 1606 may prioritize its MT uplink signal over the first UE uplink signal 1612.

In another example, the repeater 1606 may be configured to prioritize its MT uplink signal or a received UE uplink signal based on the backhaul link beam that the repeater 1606 uses to output a multiplexed communication for a given occasion. For example, the repeater 1606 may prioritize a UE uplink signal over its MT uplink signal when the repeater 1606 outputs a multiplexed communication via the first backhaul link beam 1620. Additionally, the repeater 1606 may prioritize its MT uplink signal over a UE uplink signal when the repeater 1606 outputs a multiplexed communication via second backhaul link beam 1624. As shown in FIG. 16, the repeater 1606 may output a first multiplexed communication 1622 to the network entity 1602 via the first backhaul link beam 1620. The repeater 1606 may also be configured to output a second multiplexed communication 1626 to the network entity 1602 via the second backhaul link beam 1624. In the illustrated example of FIG. 16, the repeater 1606 may output the first multiplexed communication 1622 at a time T3 and may output the second multiplexed communication 1626 at a time T4. In some such examples, and based on the above prioritization rules, at the time T3, the repeater 1606 may prioritize a received UE uplink signal over its MT uplink signal. Additionally, at the time T4, the repeater 1606 may prioritize its MT uplink signal over a received UE uplink signal. In some examples, the network entity 1602 may indicate or configure the backhaul link beam to use to communicate the multiplexed communication.

In some examples, prioritization of an MT uplink signal or a UE uplink signal at the repeater 1606 may be resource-specific. For example, prioritization may be based on different sets of time resources (e.g., slots, symbols, etc.), or different sets of frequency resources (e.g., channels, bands, carrier frequencies, BWP, etc.). In some such examples, the repeater 1606 may be configured to prioritize its MT uplink signal or a received UE uplink signal based on the time resource and/or the frequency resource used to output a multiplexed communication. In other examples, the repeater 1606 may be configured to prioritize the received UE uplink signal over its MT uplink signal based on the time resource and/or the frequency resource used to output a multiplexed communication.

In another example, resource-specific prioritization at the repeater 1606 may be extended to treat "uplink" time resources (e.g., symbols/slots) and "flexible" time resources differently. For example, the repeater 1606 may be configured to apply a first prioritization rule (e.g., prioritize its MT uplink signal over a received UE uplink signal) for time resources labeled as "uplink" time resources. The repeater 1606 may also be configured to apply a second prioritization rule (e.g., prioritize a received UE uplink signal over its MT uplink signal) for time resources labeled as "flexible" time resources. Aspects of "uplink" symbols/slots and "flexible" symbols/slots are described in connection with at least FIG. 2A.

In some examples, the repeater 1606 may be preconfigured with one or more different prioritization rules to apply.

In some examples, the network entity 1602 may provide an indicator that configures one or more different prioritization rules at the repeater 1606. For example, and referring again to the communication flow 1500 of FIG. 15, the network entity 1502 may provide a prioritization indicator 1512 that configures the one or more different prioritization rules at the repeater 1506. In addition to the power determination procedure 1520, the repeater 1506 may perform a gain determination procedure 1530 to determine if a maximum amplification gain is satisfied. For example, the repeater 1506 may apply Equation 6 (reproduced below) to determine if the maximum amplification gain ($G_{max}$) is satisfied.

$$G_{NCR\text{-}fwd} := G_1 G_2 G_3 \leq G_{max} \qquad \text{Equation 6}$$

In some examples in which the forwarding component amplification gain ($G_{NCR\_fwd}$) fails to satisfy the maximum amplification gain, the repeater 1506 may perform an adjustments procedure 1532 to adjust at least one of the first power gain ($G_1$), the second power gain ($G_2$), and the fourth power gain ($G_3$). For example, the controller 1302 of FIG. 13 may adjust the VGAs associated with the first power amplification stage 1310, the second power amplification stage 1320, and/or the fourth power amplification stage 1340 so that the forwarding component amplification gain satisfies the maximum amplification gain.

In some examples, the repeater 1506 may perform a PSD determination procedure 1540 to determine if a PSD threshold is satisfied. For example, the repeater 1506 may apply Equation 7 (reproduced below) to determine whether a power mismatch between the combined UE uplink signal and the combined MT uplink signal satisfies the PSD threshold.

$$|[PSD^{NCR\text{-}MT}]_{dBm} - [PSD^{NCR\text{-}fwd}]_{dBm}| \leq \text{thrshold} \qquad \text{Equation 7}$$

In some examples in which the repeater 1506 determines that the PSD threshold is not satisfied (e.g., the power mismatch is greater than the PSD threshold), the repeater 1506 may abstain from performing an adjustment to the power of the combined UE uplink signal and/or the power of the combined MT uplink signal. In some such examples, the combined UE uplink signal and/or the combined MT uplink signal may be impacted (e.g., distorted or polluted). The network entity 1502 may determine, based on an uplink communication 1546, that the repeater 1506 performing the multiplexing of the uplink signals is causing phase distortion and/or a power mismatch. In some such examples, the network entity 1502 may determine to provide a multiplexing configuration to the repeater 1506 to improve performance associated with the multiplexing. For example, the network entity 1502 may output the multiplexing configuration 922 of FIG. 9. In some examples, the multiplexing configuration may configure the repeater 1506 to employ time-division multiplexing of uplink signals, as described in connection with the TDM configuration 932 of FIG. 9. In some examples, the multiplexing configuration may configure the repeater 1506 to employ frequency-division multiplexing of uplink signals, as described in connection with FDM configuration 952 of FIG. 9. In some examples, the multiplexing configuration may provide a change in the power configuration of the repeater 1506 and/or a remote UE (e.g., the UE 904 of FIG. 9).

In some examples in which the repeater 1506 determines that the PSD threshold is not satisfied (e.g., the power mismatch is greater than the PSD threshold), the repeater 1506 may provide a report 1542 that is obtained by the network entity 1502. In some examples, the report 1542 may indicate that the power mismatch is greater than the PSD threshold. In some examples, the report 1542 may trigger the network entity 1502 to make a change associated with multiplexing of uplink signals at the repeater 1506. For example, the network entity 1502 may output the multiplexing configuration 922 of FIG. 9.

In some examples, the repeater 1506 may be configured to adjust its power configuration to avoid occurrences of power mismatches that fail to satisfy the PSD threshold. For example, the repeater 1506 may perform an adjustments procedure 1544 to adjust one or more power gains, for example, applied by the power control architecture 1400 of FIG. 14.

In some examples, the network entity 1502 may provide side control information for power control associated with the forwarding component of the repeater 1506. For example, the network entity 1502 may provide an indication to control the power of the combined UE uplink signal. In some examples, the network entity 1502 may provide a forwarding component limit indicator 1514 that is obtained by the repeater 1506. The forwarding component limit indicator 1514 may configure a power limit and/or an amplification limit associated with the forwarding operation at the forwarding component of the repeater 1506. For example, the forwarding component limit indicator 1514 may configure a maximum downlink output gain of the repeater 1506 ($\hat{G}_{max,DL}$) In some examples, the forwarding component limit indicator 1514 may configure a maximum downlink output power of the repeater 1506 ($\hat{P}_{max,DL}^{NCR}$).

In some examples, the network entity 1502 may provide an output power adjustment indicator 1516 that is obtained by the repeater 1506. The output power adjustment indicator 1516 may configure an adjusted maximum downlink output gain. Additionally, or alternatively, the output power adjustment indicator 1516 may configure an adjusted maximum downlink output power for the repeater 1506.

In some examples, the network entity 1502 may provide a power sharing indicator 1518 that is obtained by the repeater 1506. The power sharing indicator 1518 may configure the repeater 1506 on how to share power between the combined UE uplink signal and the combined MT uplink signal. For example, the power sharing indicator 1518 may indicate what fraction of total power (e.g., the $P_{out}$) to allocate to the combined MT uplink signal. In other examples, the power sharing indicator 1518 may indicate what fraction of total power (e.g., the $P_{out}$) to allocate to the combined UE uplink signal.

Although illustrated as separate communications in the example of FIG. 15, in other examples, one or more of the threshold indicator 1510, the prioritization indicator 1512, the forwarding component limit indicator 1514, the output power adjustment indicator 1516, and the power sharing indicator 1518 may be combined into a communication. In some examples, the network entity 1502 may provide one or more of the threshold indicator 1510, the prioritization indicator 1512, the forwarding component limit indicator 1514, the output power adjustment indicator 1516, and/or the power sharing indicator 1518 via a multiplexing configuration, such as the multiplexing configuration 922 of FIG. 9.

Figure 17:
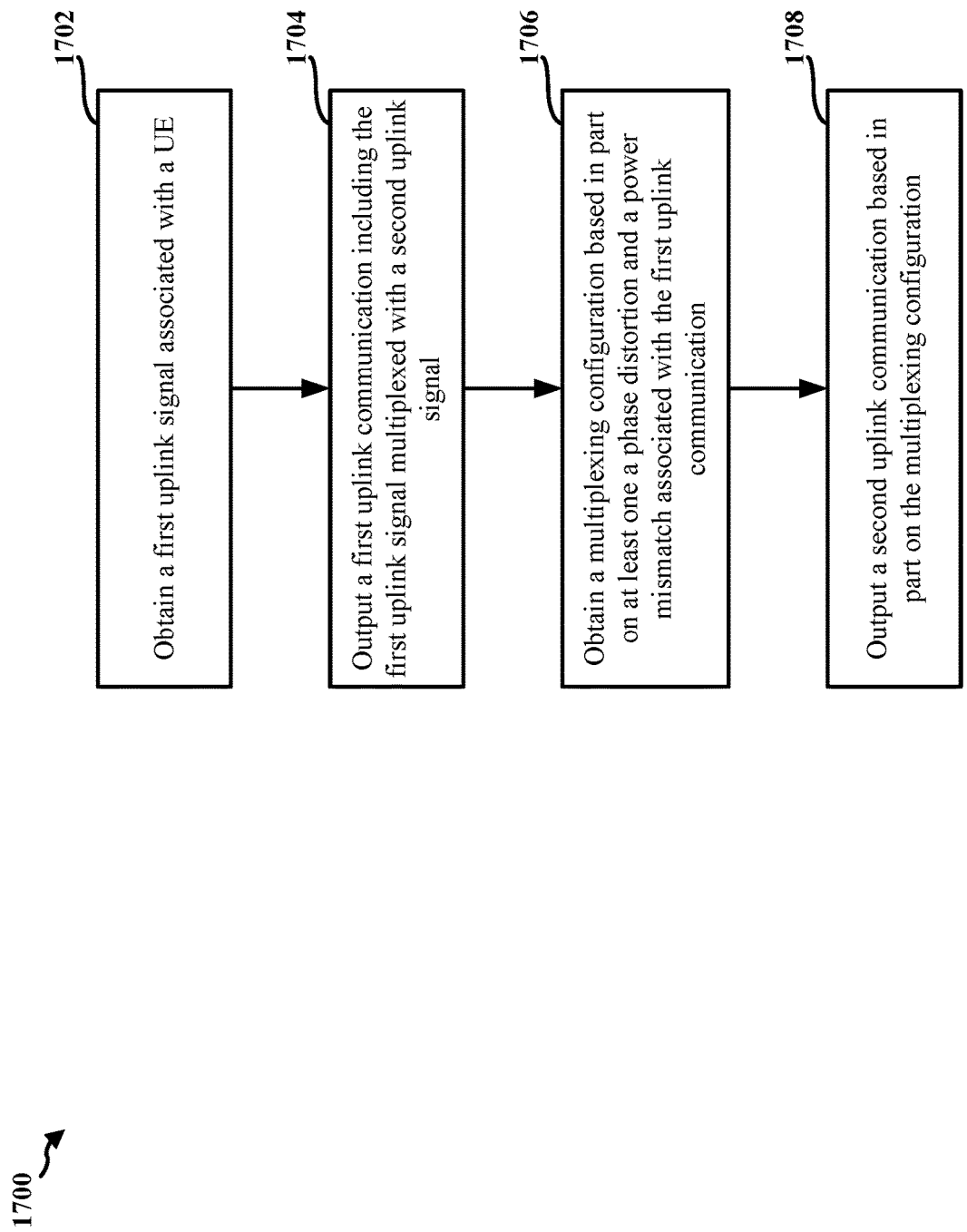
FIG. 17 is a flowchart of a method of wireless communication, in accordance with various aspects of the present disclosure.

FIG. 17 is a flowchart 1700 of a method of wireless communication. The method may be performed by a repeater (e.g., the repeater 106, and/or a network entity 1902 of FIG. 19). The method may facilitate reducing occurrences of phase distortion and/or power mismatch when multiplexing uplink signals at the repeater.

At 1702, the repeater obtains a first uplink signal associated with a UE, as described in connection with at least the first UE uplink signal 910 of FIG. 9. The obtaining of the first uplink signal, at 1702, may be performed by the uplink multiplexing component 197 of the network entity 1902 of FIG. 19.

At 1704, the repeater provides a first uplink communication including the first uplink signal multiplexed with a second uplink signal, as described in connection with at least the first multiplexed communication 916 of FIG. 9. The second uplink signal may be associated with an MT component of the repeater, as described in connection with at least the first MT uplink signal 912 of FIG. 9. The providing of the first uplink communication, at 1704, may be performed by the uplink multiplexing component 197 of the network entity 1902 of FIG. 19.

At 1706, the repeater obtains a multiplexing configuration based in part on at least one of a phase distortion and a power mismatch associated with the first uplink communication, as described in connection with at least the multiplexing configuration 922 of FIG. 9. The obtaining of the multiplexing configuration, at 1706, may be performed by the uplink multiplexing component 197 of the network entity 1902 of FIG. 19.

At 1708, the repeater provides a second uplink communication based in part on the multiplexing configuration, the second uplink communication including a third uplink signal multiplexed with a fourth uplink signal, as described in connection with at least the second multiplexed communication 940 and/or the third multiplexed communication 960 of FIG. 9. The providing of the second uplink communication, at 1708, may be performed by the uplink multiplexing component 197 of the network entity 1902 of FIG. 19.

Figure 18:
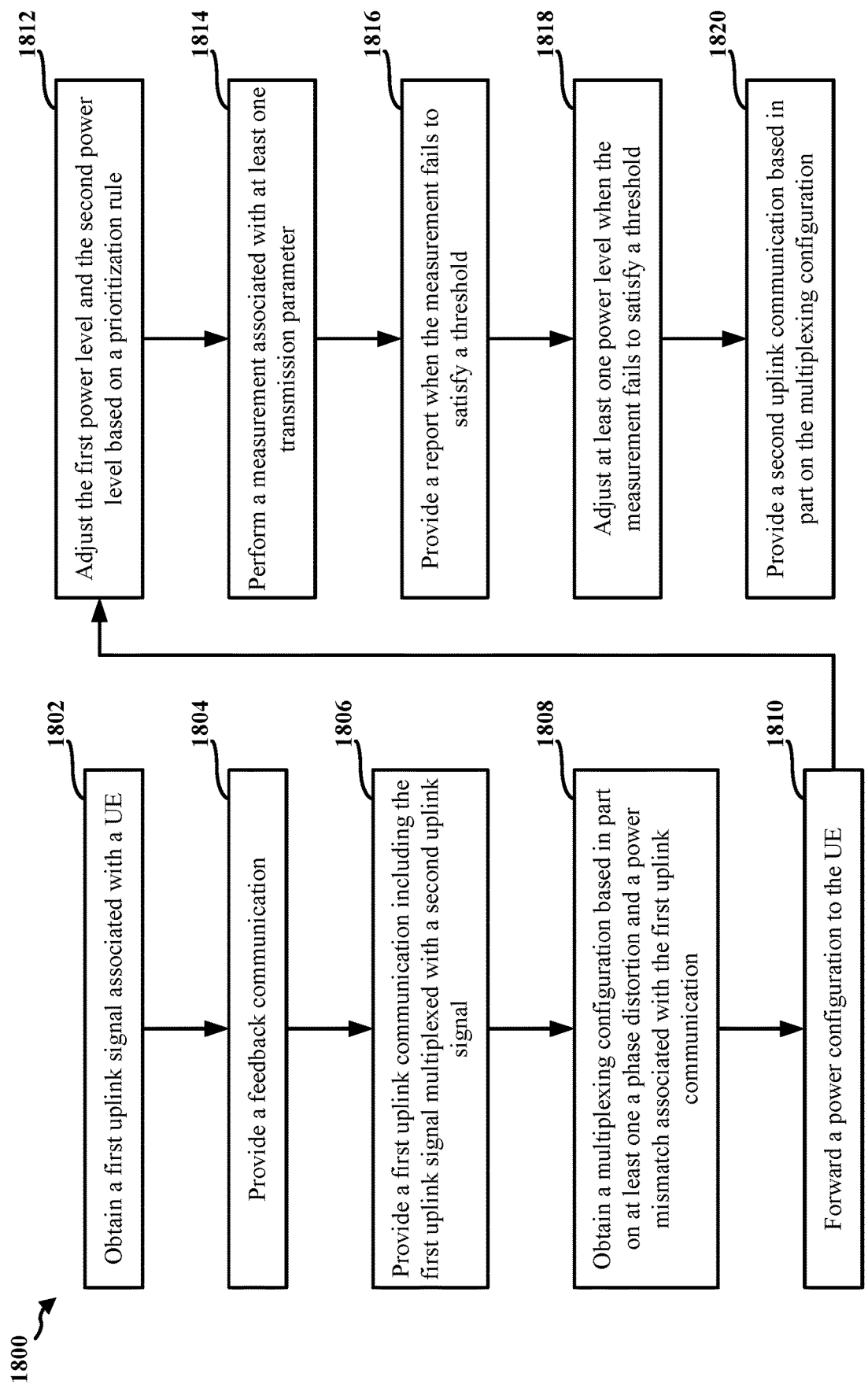
FIG. 18 is a flowchart of a method of wireless communication, in accordance with various aspects of the present disclosure.

FIG. 18 is a flowchart 1800 of a method of wireless communication. The method may be performed by a repeater (e.g., the repeater 106, and/or a network entity 1902 of FIG. 19). The method may facilitate reducing occurrences of phase distortion and/or power mismatch when multiplexing uplink signals at the repeater.

At 1802, the repeater obtains a first uplink signal associated with a UE, as described in connection with at least the first UE uplink signal 910 of FIG. 9. The obtaining of the first uplink signal, at 1802, may be performed by the uplink multiplexing component 197 of the network entity 1902 of FIG. 19.

At 1806, the repeater provides a first uplink communication including the first uplink signal multiplexed with a second uplink signal, as described in connection with at least the first multiplexed communication 916 of FIG. 9. The second uplink signal may be associated with an MT component of the repeater, as described in connection with at least the first MT uplink signal 912 of FIG. 9. The providing of the first uplink communication, at 1806, may be performed by the uplink multiplexing component 197 of the network entity 1902 of FIG. 19.

At 1808, the repeater obtains a multiplexing configuration based in part on at least one of a phase distortion and a power mismatch associated with the first uplink communication, as described in connection with at least the multiplexing configuration 922 of FIG. 9. The obtaining of the multiplexing configuration, at 1808, may be performed by the uplink multiplexing component 197 of the network entity 1902 of FIG. 19.

At 1820, the repeater provides a second uplink communication based in part on the multiplexing configuration, the second uplink communication including a third uplink signal multiplexed with a fourth uplink signal, as described in connection with at least the second multiplexed communication 940 and/or the third multiplexed communication 960 of FIG. 9. The providing of the second uplink communication, at 1820, may be performed by the uplink multiplexing component 197 of the network entity 1902 of FIG. 19.

In some examples, the multiplexing configuration (e.g., at 1808) may indicate a time-division multiplexing configuration, and the third uplink signal may be time-division multiplexed with the fourth uplink signal based on the multiplexing configuration, as described in connection with the TDM configuration 932, the second UE uplink signal 934, and the second MT uplink signal 936 of FIG. 9.

In some examples, the multiplexing configuration (e.g., at 1808) may indicate a dummy signal, as described in connection with at least the FDM configuration 952 of FIG. 9. In some examples, the third uplink signal may be frequency-division multiplexed with the fourth uplink signal, as described in connection with the third multiplexed communication 960 of FIG. 9. The third uplink signal may be associated with the UE, and the fourth uplink signal may be associated with the dummy signal, as described in connection with the UE uplink signal 1062 and the dummy signal 1064 of FIG. 10B, respectively In some examples, the repeater may provide, at 1804, a feedback communication. In some examples, the feedback communication may be associated with phase distortion for uplink communications, as described in connection with the phase distortion feedback 1122, the power control feedback 1124, and/or the modeling characteristics feedback 1126 of FIG. 11. The multiplexing configuration (e.g., at 1808) may be based on the feedback communication. The providing of the feedback communication, at 1804, may be performed by the uplink multiplexing component 197 of the network entity 1902 of FIG. 19.

In some examples, the feedback communication (e.g., at 1804), may include a phase distortion indication associated with the first uplink communication, and the first uplink communication may be provided prior to the feedback communication in a time-domain, as described in connection with the first multiplexed communication 1110 and the phase distortion feedback 1122 of FIG. 11.

In some examples, the feedback communication (e.g., at 1804) may include a phase distortion indication associated with a second uplink communication, and the feedback communication may be provided prior to the second uplink communication in a time-domain, as described in connection with the phase distortion feedback 1122 and the second multiplexed communication 1142 of FIG. 11.

In some examples, the feedback communication (e.g., at 1804) may include a power control adjustment associated with at least one of the UE and the repeater, as described in connection with the power control feedback 1124 of FIG. 11. In some examples, the power control adjustment may be associated with the UE and the multiplexing configuration (e.g., at 1808) may include a power configuration associated with the UE. The repeater may, at 1810, forward the power configuration to the UE. In some examples, the power control adjustment may be associated with the repeater and the multiplexing configuration (e.g., at 1808) may include a power configuration associated with the repeater. The forwarding of the power configuration, at 1810, may be performed by the uplink multiplexing component 197 of the network entity 1902 of FIG. 19.

In some examples, the feedback communication (e.g., at 1804) may indicate at least one modeling characteristic associated with AM-PM conversion, as described in connection with modeling characteristics feedback 1126 of FIG. 11. In some examples, the feedback communication may include a category indicator. In some such examples, the category indicator may correspond to the at least one modeling characteristic.

In some examples, the third uplink signal (e.g., at 1820) may be associated with a first power level, the fourth uplink signal may be associated with a second power level, and a total power level associated with the second uplink communication may satisfy a maximum power output threshold, as described in connection with the transmit power budget and Equation 5 (above).

In some examples, an amplification gain associated with the third uplink signal (e.g., at 1820) may satisfy a maximum amplification gain, as described in connection with Equation 6 (above). Additionally, a difference between a first power spectral density (PSD) and a second PSD may satisfy a PSD threshold, the first PSD being associated with the third uplink signal and the second PSD being associated with the fourth uplink signal, as described in connection with Equation 7 (above).

In some examples, the multiplexing configuration (e.g., at 1808) may indicate a prioritization rule between the third uplink signal and the fourth uplink signal, as described in connection with the prioritization indicator 1512 of FIG. 15. In some examples, the repeater may adjust, at 1812, the first power level and the second power level based on the prioritization rule, as described in connection with the power sharing procedure 1524 of FIG. 15. The adjusting of the power level, at 1812, may be performed by the uplink multiplexing component 197 of the network entity 1902 of FIG. 19.

In some examples, the prioritization rule between the third uplink signal and the fourth uplink signal may be based on at least one of: the third uplink signal being associated with the UE, the third uplink signal being associated with the repeater, the third uplink signal being associated with an earlier transmission time than the fourth uplink signal in a time-domain, the third uplink signal being associated with an earlier scheduling time than the fourth uplink signal in the time-domain, the third uplink signal being associated with a dynamically scheduled signal and the fourth uplink signal being associated with a semi-statically scheduled signal, the third uplink signal being associated with a higher prioritization level than the fourth uplink signal. In some examples, the prioritization rule between the third uplink signal and the fourth uplink signal may be channel-specific. In some examples, the prioritization rule between the third uplink signal and the fourth uplink signal may be beam-specific. In some examples, the prioritization rule between the third uplink signal and the fourth uplink signal may be resource-specific.

In some examples, the multiplexing configuration (e.g., at 1808) may indicate a minimum gain, and the first power level and the second power level may each satisfy the minimum gain.

In some examples, the multiplexing configuration (e.g., at 1808) may indicate a threshold associated with at least one transmission parameter, as described in connection with the threshold indicator 1510 of FIG. 15. In some such examples, the repeater may perform, at 1814, a measurement associated with the at least one transmission parameter. The repeater may also provide, at 1816, a report when the measurement fails to satisfy the threshold, as described in connection with the PSD determination procedure 1540 and the report 1542 of FIG. 15. In some examples, the at least one transmission parameter may include one or more of: a modulation and coding scheme (MCS), a signal-to-noise ratio (SNR), a reference signal received power (RSRP), a radio frequency (RF) power, and an intermediate frequency (IF) power. The performing of the measurement, at 1814, and the providing of the report, at 1816, may be performed by the uplink multiplexing component 197 of the network entity 1902 of FIG. 19.

In some examples, the repeater may perform (e.g., at 1814) a measurement associated with at least one transmission parameter. The repeater may also adjust, at 1818, at least one of a first power level associated with the third uplink signal and a second power level associated with the fourth uplink signal when the measurement fails to satisfy a threshold associated with the at least one transmission parameter, as described in connection with the PSD determination procedure 1540 and the adjustments procedure 1544 of FIG. 15. The adjusting of the at least one power level, at 1818, may be performed by the uplink multiplexing component 197 of the network entity 1902 of FIG. 19.

In some examples, the multiplexing configuration (e.g., at 1808) may indicate a power control configuration associated with a forwarding component of the repeater for the third uplink signal. In some such examples, the third uplink signal may be associated with the UE and the fourth uplink signal may be associated with the MT component. In some examples, the power control configuration may include a power limit associated with the third uplink signal and the forwarding component, as described in connection with the $\hat{P}_{TXmax,DL}^{NCR}$ of the forwarding component limit indicator 1514 of FIG. 15. In some examples, the power control configuration may include an amplification limit associated with the third uplink signal and the forwarding component, as described in connection with the $\hat{G}_{max,DL}$ of the forwarding component limit indicator 1514 of FIG. 15. In some examples, the power control configuration may include an output power adjustment associated with the third uplink signal and the forwarding component, as described in connection with the output power adjustment indicator 1516 of FIG. 15. In some examples, the power control configuration may include a power sharing configuration indicating a fraction of a total power associated with the second uplink communication to allocate to at least one of the third uplink signal and the fourth uplink signal, as described in connection with the power sharing indicator 1518 of FIG. 15.

Figure 19:
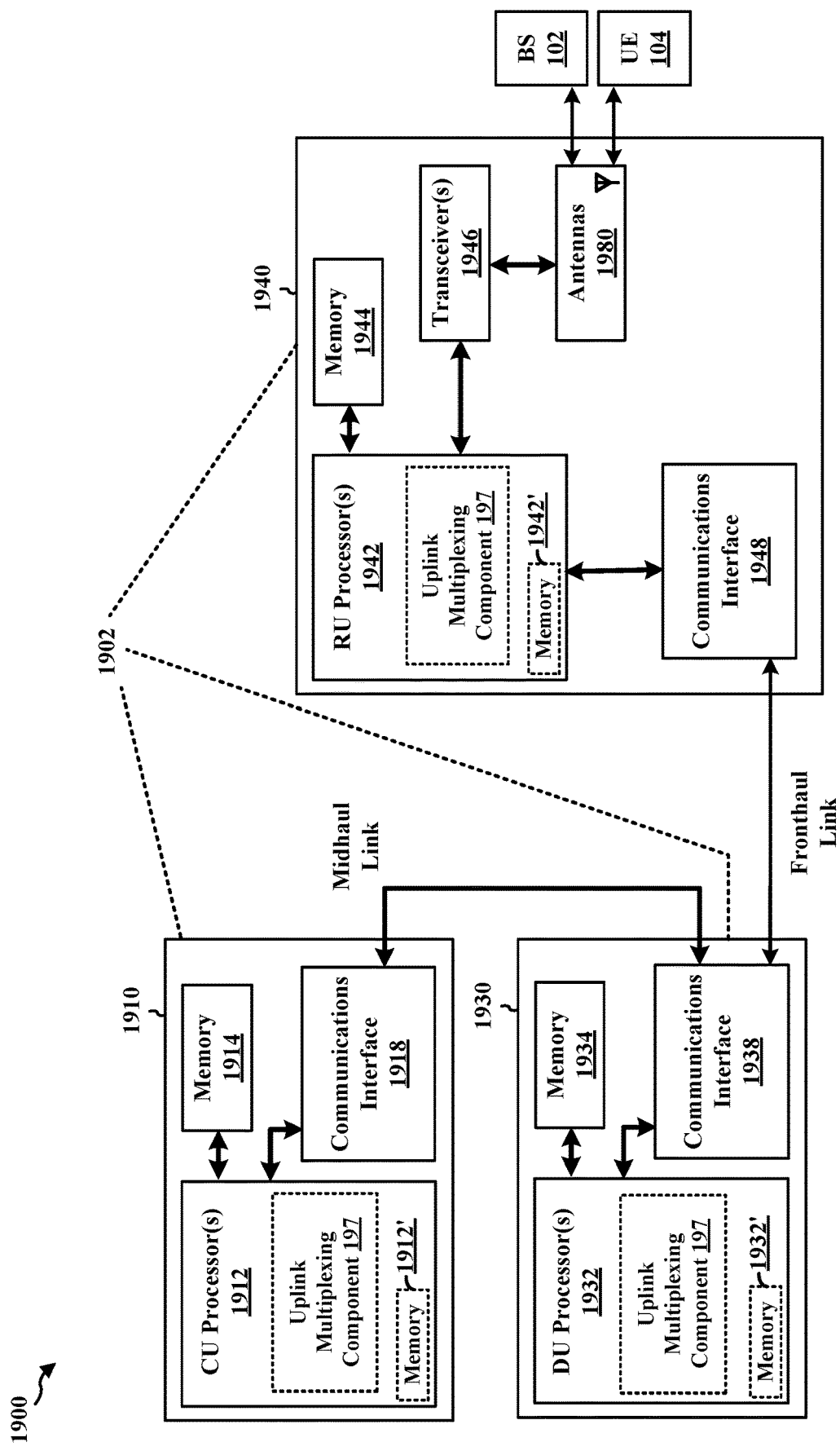
FIG. 19 is a diagram illustrating an example of a hardware implementation for a network entity, in accordance with various aspects of the present disclosure.

FIG. 19 is a diagram 1900 illustrating an example of a hardware implementation for a network entity 1902. The network entity 1902 may be a repeater, such as an NCR. The network entity 1902 may include at least one of a CU 1910, a DU 1930, or an RU 1940. For example, depending on the layer functionality handled by the uplink multiplexing component 197, the network entity 1902 may include the CU 1910; both the CU 1910 and the DU 1930; each of the CU 1910, the DU 1930, and the RU 1940; the DU 1930; both the DU 1930 and the RU 1940; or the RU 1940. The CU 1910 may include at least one CU processor (e.g., CU processor(s) 1912). The CU processor(s) 1912 may include at least one on-chip memory (e.g., on-chip memory 1912'). In some aspects, may further include additional memory modules 1914 and a communications interface 1918. The CU 1910 communicates with the DU 1930 through a midhaul link, such as an F1 interface. The DU 1930 may include at least one DU processor (e.g., DU processor(s) 1932). The DU processor(s) 1932 may include at least one on-chip memory (e.g., on-chip memory 1932'). In some aspects, the DU 1930 may further include additional memory modules 1934 and a communications interface 1938. The DU 1930 communicates with the RU 1940 through a fronthaul link. The RU 1940 may include at least one RU processor (e.g., RU processor(s) 1942). The RU processor(s) 1942 may include at least one on-chip memory (e.g., on-chip memory 1942'). In some aspects, the RU 1940 may further include additional memory modules 1944, one or more transceivers 1946, antennas 1980, and a communications interface 1948. The RU 1940 communicates with the UE 104 and/or the base station 102. The on-chip memories (e.g., the on-chip memory 1912', the on-chip memory 1932', and/or the on-chip memory 1942') and/or the additional memory modules (e.g., the additional memory modules 1914, the additional memory modules 1934, and/or the additional memory modules 1944) may each be considered a computer-readable medium/memory. Each computer-readable medium/memory may be non-transitory. Each of the CU processor(s) 1912, the DU processor(s) 1932, the RU processor(s) 1942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the uplink multiplexing component 197 may be configured to obtain a first uplink signal associated with a UE; provide a first uplink communication including the first uplink signal multiplexed with a second uplink signal, the second uplink signal being associated with a MT component of the repeater; obtain a multiplexing configuration based in part on at least one of a phase distortion and a power mismatch associated with the first uplink communication; and provide a second uplink communication based in part on the multiplexing configuration, the second uplink communication including a third uplink signal multiplexed with a fourth uplink signal.

The uplink multiplexing component 197 may be within one or more processors of one or more of the CU 1910, DU 1930, and the RU 1940. The uplink multiplexing component 197 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination.

The network entity 1902 may include a variety of components configured for various functions. For example, the uplink multiplexing component 197 may include one or more hardware components that perform each of the blocks of the algorithm in the flowcharts of FIG. 17 and/or FIG. 18.

In one configuration, the network entity 1902 may include means for obtaining a first uplink signal associated with a UE. The example network entity 1902 also includes means for providing a first uplink communication including the first uplink signal multiplexed with a second uplink signal, the second uplink signal being associated with a MT component of the repeater. The example network entity 1902 also includes means for obtaining a multiplexing configuration based in part on at least one of a phase distortion and a power mismatch associated with the first uplink communication. The example network entity 1902 also includes means for providing a second uplink communication based in part on the multiplexing configuration, the second uplink communication including a third uplink signal multiplexed with a fourth uplink signal.

In another configuration, the example network entity 1902 also includes means for providing a feedback communication associated with phase distortion for uplink communications, and where the multiplexing configuration is based on the feedback communication.

In another configuration, the example network entity 1902 also includes means for forwarding the power configuration to the UE.

The example network entity 1902 also includes means for adjusting the first power level and the second power level based on the prioritization rule.

In another configuration, the example network entity 1902 also includes means for performing a measurement associated with the at least one transmission parameter.

The example network entity 1902 also includes means for providing a report when the measurement fails to satisfy the threshold. The example network entity 1902 also includes means for adjusting at least one of a first power level associated with the third uplink signal and a second power level associated with the fourth uplink signal when the measurement fails to satisfy a threshold associated with the at least one transmission parameter.

The means may be the uplink multiplexing component 197 of the network entity 1902 configured to perform the functions recited by the means. As described supra, the network entity 1902 may include the TX processor 316, the RX processor 370, and the controller/processor 375. As such, in one configuration, the means may be the TX processor 316, the RX processor 370, and/or the controller/processor 375 configured to perform the functions recited by the means.

Figure 20:
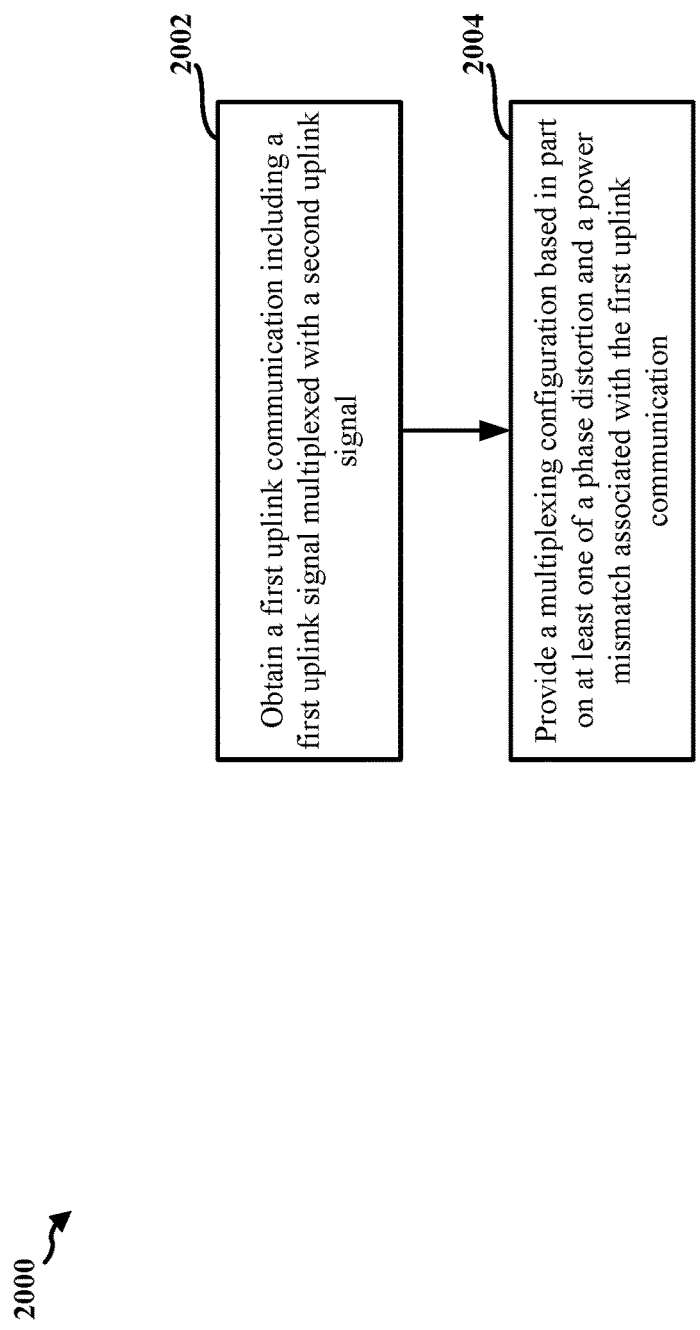
FIG. 20 is a flowchart of a method of wireless communication, in accordance with various aspects of the present disclosure.

FIG. 20 is a flowchart 2000 of a method of wireless communication. The method may be performed by a network entity (e.g., the base station 102 and/or a network entity, such as the network entity 402, the network entity 502, the network entity 602, the network entity 902, the network entity 1102, and/or network entity 1502. The method may facilitate reducing occurrences of phase distortion and/or power mismatch when multiplexing uplink signals at a repeater, such as an NCR.

At 2002, the network entity obtains a first uplink communication including a first uplink signal multiplexed with a second uplink signal, as described in connection with at least the first multiplexed communication 916 of FIG. 9. The first uplink signal may be associated with a UE, such as the first UE uplink signal 910 of FIG. 9. The second uplink signal may be associated with a repeater, such as the first MT uplink signal 912 of FIG. 9. The obtaining of the first uplink communication, at 2002, may be performed by the uplink distortion component 199 of FIG. 22.

At 2004, the network entity provides a multiplexing configuration based in part on at least one of a phase distortion and a power mismatch associated with the first uplink communication, as described in connection with at least the multiplexing configuration 922 of FIG. 9. The outputting of the multiplexing configuration, at 2004, may be performed by the uplink distortion component 199 of FIG. 22.

Figure 21:
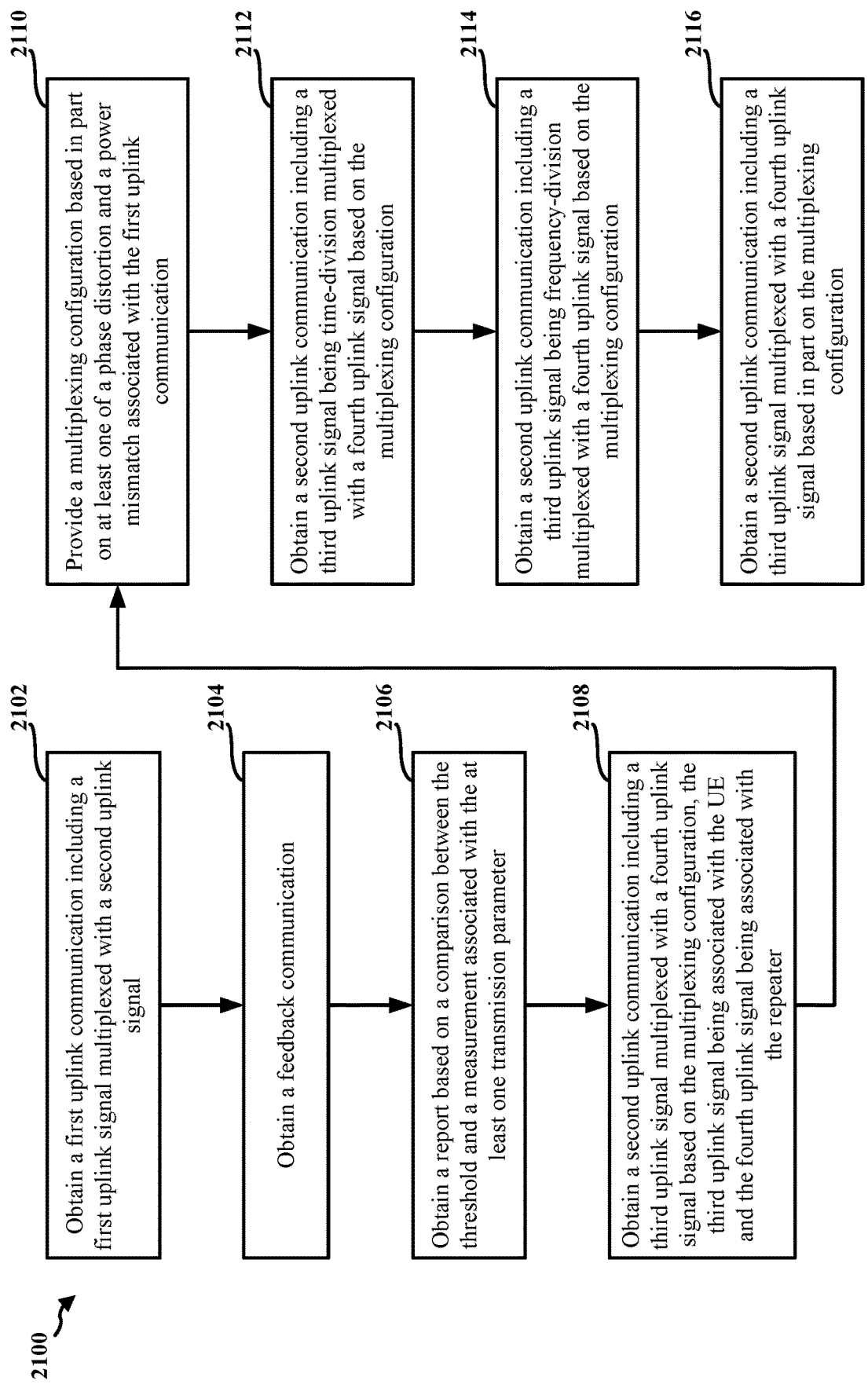
FIG. 21 is a flowchart of a method of wireless communication, in accordance with various aspects of the present disclosure.

FIG. 21 is a flowchart 2100 of a method of wireless communication. The method may be performed by a network entity (e.g., the base station 102 and/or a network entity, such as the network entity 402, the network entity 502, the network entity 602, the network entity 902, the network entity 1102, and/or network entity 1502. The method may facilitate reducing occurrences of phase distortion and/or power mismatch when multiplexing uplink signals at a repeater, such as an NCR.

At 2102, the network entity obtains a first uplink communication including a first uplink signal multiplexed with a second uplink signal, as described in connection with at least the first multiplexed communication 916 of FIG. 9. The first uplink signal may be associated with a UE, such as the first UE uplink signal 910 of FIG. 9. The second uplink signal may be associated with the repeater, such as the first MT uplink signal 912 of FIG. 9. The obtaining of the first uplink communication, at 2102, may be performed by the uplink distortion component 199 of the network entity 2202 of FIG. 22.

At 2110, the network entity provides a multiplexing configuration based in part on at least one of a phase distortion and a power mismatch associated with the first uplink communication, as described in connection with at least the multiplexing configuration 922 of FIG. 9. The providing of the multiplexing configuration, at 2110, may be performed by the uplink distortion component 199 of the network entity 2202 of FIG. 22.

In some examples, the multiplexing configuration may indicate a time-division multiplexing configuration at the repeater, as described in connection with at least the TDM configuration 932 of FIG. 9.

In some examples, the network entity may obtain, at 2112, a second uplink communication including a third uplink signal being time-division multiplexed with a fourth uplink signal based on the multiplexing configuration, as described in connection with at least the second multiplexed communication 940 of FIG. 9. In some examples, the third uplink signal may be associated with the UE and the fourth uplink signal may be associated with the repeater, as described in connection with the second UE uplink signal 934 and the second MT uplink signal 936 of FIG. 9, respectively. The obtaining of the second uplink communication, at 2112, may be performed by the uplink distortion component 199 of the network entity 2202 of FIG. 22.

In some examples, the multiplexing configuration (e.g., at 2110) may indicate a dummy signal to multiplex with subsequent uplink signals associated with the UE, as described in connection with at least the FDM configuration 952 of FIG. 9. In some examples, the network entity may obtain, at 2114, a second uplink communication including a third uplink signal being frequency-division multiplexed with a fourth uplink signal based on the multiplexing configuration, as described in connection with at least the third multiplexed communication 960 of FIG. 9. The third uplink signal may be associated with the UE and the fourth uplink signal may be associated with the dummy signal, as described in connection with the UE uplink signal 1062 and the dummy signal 1064 of FIG. 10B, respectively. The obtaining of the second uplink communication, at 2114, may be performed by the uplink distortion component 199 of the network entity 2202 of FIG. 22.

In some examples, the network entity may obtain, at 2104, a feedback communication. In some examples, the feedback communication may be associated with phase distortion for uplink communications, as described in connection with the phase distortion feedback 1122, the power control feedback 1124, and/or the modeling characteristics feedback 1126 of FIG. 11. In some examples, the multiplexing configuration (e.g., at 2110) may be based on the feedback communication. The obtaining of the feedback communication, at 2104, may be performed by the uplink distortion component 199 of the network entity 2202 of FIG. 22.

In some examples, the feedback communication (e.g., at 2104) may include a phase distortion indication associated with the first uplink communication, and the first uplink communication may be obtained prior to the feedback communication in a time-domain, as described in connection with the first multiplexed communication 1110 and the phase distortion feedback 1122 of FIG. 11.

In some examples, the feedback communication (e.g., at 2104) may include a phase distortion indication associated with a second uplink communication, and the first uplink communication may be obtained prior to the second uplink communication in a time-domain, as described in connection with the phase distortion feedback 1122 and the second multiplexed communication 1142 of FIG. 11.

In some examples, the feedback communication (e.g., at 2104) may include a power control adjustment associated with at least one of the UE and the repeater, as described in connection with the power control feedback 1124 of FIG. 11. In some examples, the power control adjustment may be associated with the UE and the multiplexing configuration may include a power configuration associated with the UE. In some examples, the power control adjustment may be associated with the repeater and the multiplexing configuration may include a power configuration associated with the repeater.

In some examples, the feedback communication (e.g., at 2104) may indicate at least one modeling characteristic associated with AM-PM conversion, as described in connection with modeling characteristics feedback 1126 of FIG. 11. In some examples, the feedback communication may include a category indicator, and the category indicator may correspond to the at least one modeling characteristic.

In some examples, the network entity may obtain, at 2116, a second uplink communication including a third uplink signal multiplexed with a fourth uplink signal based in part on the multiplexing configuration (e.g., at 2110), as described in connection with at least the multiplexed uplink signal 1280 of FIG. 12 and/or the combined output signal 1460 of FIG. 14. The third uplink signal may be associated with a first power level, the fourth uplink signal may be associated with a second power level, and a total power level associated with the second uplink communication may satisfy a maximum power output threshold, as described in connection with the transmit power budget and Equation 5 (above). The obtaining of the second uplink communication, at 2116, may be performed by the uplink distortion component 199 of the network entity 2202 of FIG. 22.

In some examples, the multiplexing configuration (e.g., at 2110) may indicate a prioritization rule between the third uplink signal and the fourth uplink signal, as described in connection with the prioritization indicator 1512 of FIG. 15. In some examples, the prioritization rule between the third uplink signal and the fourth uplink signal may be based on at least one of: the third uplink signal being associated with the UE, the third uplink signal being associated with the repeater, the third uplink signal being associated with an earlier transmission time than the fourth uplink signal in a time-domain, the third uplink signal being associated with an earlier scheduling time than the fourth uplink signal in the time-domain, the third uplink signal being associated with a dynamically scheduled signal and the fourth uplink signal being associated with a semi-statically scheduled signal, the third uplink signal being associated with a higher prioritization level than the fourth uplink signal. In some examples, the prioritization rule between the third uplink signal and the fourth uplink signal may be channel-specific. In some examples, the prioritization rule between the third uplink signal and the fourth uplink signal may be beam-specific. In some examples, the prioritization rule between the third uplink signal and the fourth uplink signal may be resource-specific.

In some examples, the multiplexing configuration (e.g., at 2110) may indicate a minimum gain, and the first power level and the second power level associated with the second uplink communication (e.g., at 2116) may each satisfy the minimum gain. In some examples, the network entity may provide the multiplexing configuration (e.g., at 2110) based on a detected power mismatch between the first uplink signal and the second uplink signal.

In some examples, the multiplexing configuration (e.g., at 2110) may indicate a threshold associated with at least one transmission parameter, as described in connection with at least the threshold indicator 1510 of FIG. 15. The network entity may obtain, at 2106, a report based on a comparison between the threshold and a measurement associated with the at least one transmission parameter, as described in connection with the report 1542 of FIG. 15. In some examples, the at least one transmission parameter may include one or more of: a modulation and coding scheme (MCS), a signal-to-noise ratio (SNR), a reference signal received power (RSRP), a radio frequency (RF) power, and an intermediate frequency (IF) power.

In some examples, the network entity may obtain, at 2108, a second uplink communication including a third uplink signal multiplexed with a fourth uplink signal based on the multiplexing configuration, the third uplink signal being associated with the UE and the fourth uplink signal being associated with the repeater. In some such examples, the multiplexing configuration (e.g., at 2110) may indicate a power control configuration associated with a forwarding operation for the third uplink signal. In some examples, the power control configuration may include a power limit associated with the third uplink signal and the forwarding operation, as described in connection with the $\hat{P}_{TXmax,DL}^{NCR}$ of the forwarding component limit indicator 1514 of FIG. 15. In some examples, the power control configuration may include an amplification limit associated with the third uplink signal and the forwarding operation, as described in connection with the $\hat{G}_{max,DL}$ of the forwarding component limit indicator 1514 of FIG. 15. In some examples, the power control configuration may include an output power adjustment associated with the third uplink signal and the forwarding operation, as described in connection with the output power adjustment indicator 1516 of FIG. 15. In some examples, the power control configuration may include a power sharing configuration indicating a fraction of a total power associated with the second uplink communication to allocate to at least one of the third uplink signal and the fourth uplink signal, as described in connection with the power sharing indicator 1518 of FIG. 15. The obtaining of the second uplink configuration, at 2108, may be performed by the uplink distortion component 199 of the network entity 2202 of FIG. 22.

Figure 22:
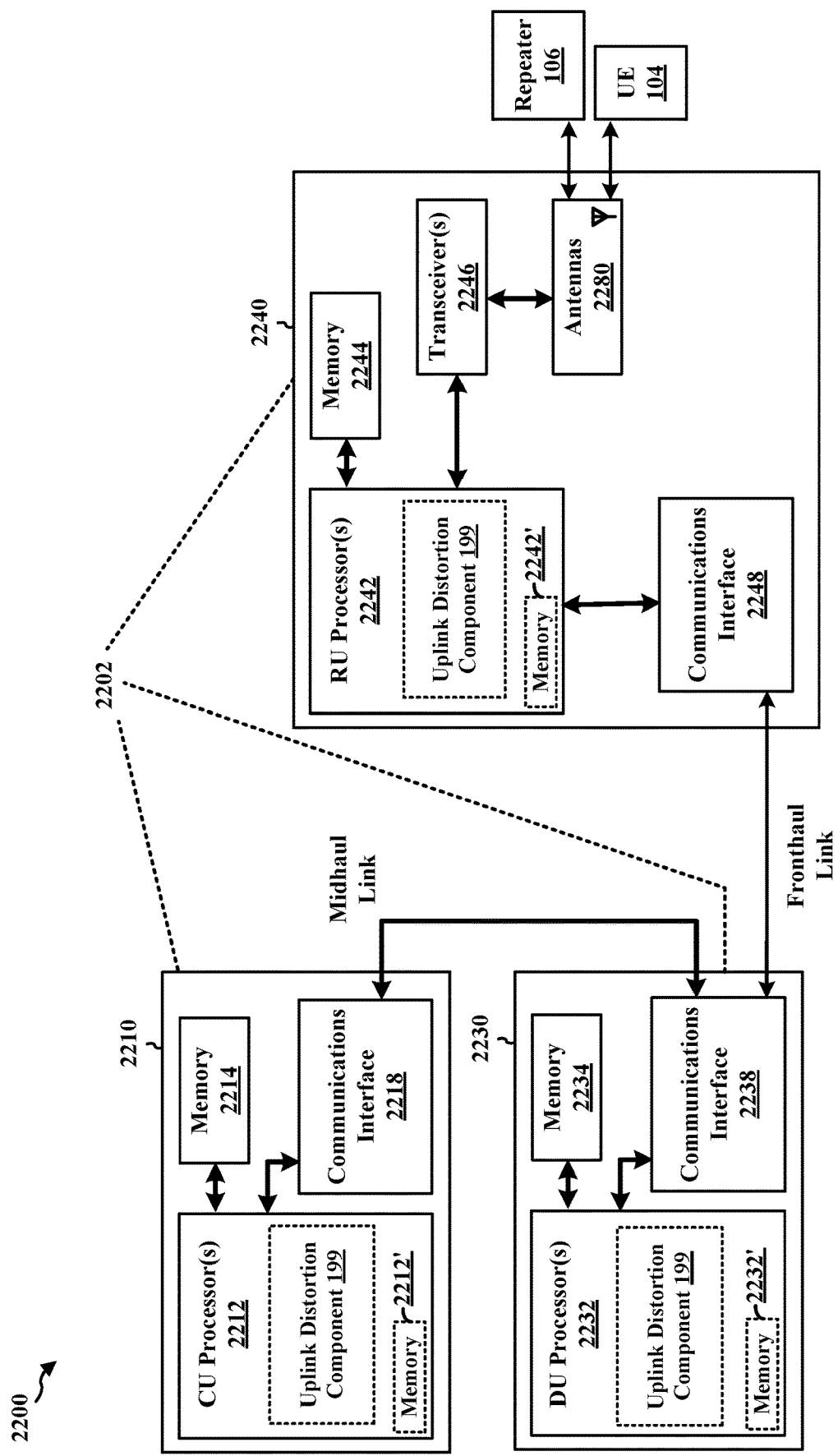
FIG. 22 is a diagram illustrating an example of a hardware implementation for a network entity, in accordance with various aspects of the present disclosure.

FIG. 22 is a diagram 2200 illustrating an example of a hardware implementation for a network entity 2202. The network entity 2202 may be a BS, a component of a BS, or may implement BS functionality. The network entity 2202 may include at least one of a CU 2210, a DU 2230, or an RU 2240. For example, depending on the layer functionality handled by the uplink distortion component 199, the network entity 2202 may include the CU 2210; both the CU 2210 and the DU 2230; each of the CU 2210, the DU 2230, and the RU 2240; the DU 2230; both the DU 2230 and the RU 2240; or the RU 2240. The CU 2210 may include at least one CU processor (e.g., CU processor(s) 2212). The CU processor(s) 2212 may include at least one on-chip memory (e.g., on-chip memory 2212'). In some aspects, may further include additional memory modules 2214 and a communications interface 2218. The CU 2210 communicates with the DU 2230 through a midhaul link, such as an F1 interface. The DU 2230 may include at least one DU processor (e.g., DU processor(s) 2232). The DU processor(s) 2232 may include at least one on-chip memory (e.g., on-chip memory 2232'). In some aspects, the DU 2230 may further include additional memory modules 2234 and a communications interface 2238. The DU 2230 communicates with the RU 2240 through a fronthaul link. The RU 2240 may include at least one RU processor (e.g., RU processor(s) 2242). The RU processor(s) 2242 may include at least one on-chip memory (e.g., on-chip memory 2242'). In some aspects, the RU 2240 may further include additional memory modules 2244, one or more transceivers 2246, antennas 2280, and a communications interface 2248. The RU 2240 communicates with the UE 104 and/or the repeater 106. The on-chip memories (e.g., the on-chip memory 2212', the on-chip memory 2232', and/or the on-chip memory 2242') and/or the additional memory modules (e.g., the additional memory modules 2214, the additional memory modules 2234, and/or the additional memory modules 2244) may each be considered a computer-readable medium/memory. Each computer-readable medium/memory may be non-transitory. Each of the CU processor(s) 2212, the DU processor(s) 2232, the RU processor(s) 2242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the uplink distortion component 199 may be configured to obtain a first uplink communication including a first uplink signal multiplexed with a second uplink signal, the first uplink signal associated with a UE and the second uplink signal associated with a repeater; and provide a multiplexing configuration based in part on at least one of a phase distortion and a power mismatch associated with the first uplink communication The uplink distortion component 199 may be within one or more processors of one or more of the CU 2210, DU 2230, and the RU 2240. The uplink distortion component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination.

The network entity 2202 may include a variety of components configured for various functions. For example, the uplink distortion component 199 may include one or more hardware components that perform each of the blocks of the algorithm in the flowcharts of FIG. 20 and/or FIG. 21.

In one configuration, the network entity 2202 may include means for obtaining a first uplink communication including a first uplink signal multiplexed with a second uplink signal, the first uplink signal associated with a UE and the second uplink signal associated with a repeater. The example network entity 2202 also includes means for providing a multiplexing configuration based in part on at least one of a phase distortion and a power mismatch associated with the first uplink communication.

In another configuration, the example network entity 2202 also includes means for obtaining a second uplink communication including a third uplink signal being time-division multiplexed with a fourth uplink signal based on the multiplexing configuration, the third uplink signal being associated with the UE and the fourth uplink signal being associated with the repeater.

In another configuration, the example network entity 2202 also includes means for obtaining a second uplink communication including a third uplink signal being frequency-division multiplexed with a fourth uplink signal based on the multiplexing configuration, the third uplink signal being associated with the UE and the fourth uplink signal being associated with the dummy signal.

In another configuration, the example network entity 2202 also includes means for obtaining a feedback communication associated with phase distortion for uplink communications, and where the multiplexing configuration is based on the feedback communication.

In another configuration, the example network entity 2202 also includes means for obtaining a second uplink communication including a third uplink signal multiplexed with a fourth uplink signal based in part on the multiplexing configuration, the third uplink signal being associated with a first power level, the fourth uplink signal being associated with a second power level, and a total power level associated with the second uplink communication satisfies a maximum power output threshold.

In another configuration, the example network entity 2202 also includes means for providing the multiplexing configuration based on a detected power mismatch between the first uplink signal and the second uplink signal.

In another configuration, the example network entity 2202 also includes means for obtaining a report based on a comparison between the threshold and a measurement associated with the at least one transmission parameter.

In another configuration, the example network entity 2202 also includes means for obtaining a second uplink communication including a third uplink signal multiplexed with a fourth uplink signal based on the multiplexing configuration, the third uplink signal being associated with the UE and the fourth uplink signal being associated with the repeater, and where the multiplexing configuration indicates a power control configuration associated with a forwarding operation for the third uplink signal.

The means may be the uplink distortion component 199 of the network entity 2202 configured to perform the functions recited by the means. As described supra, the network entity 2202 may include the TX processor 316, the RX processor 370, and the controller/processor 375. As such, in one configuration, the means may be the TX processor 316, the RX processor 370, and/or the controller/processor 375 configured to perform the functions recited by the means.

Aspects disclosed herein provide techniques for a repeater to provide feedback to the network entity to assist the network entity to determine a level of phase distortion that may be introduced by the repeater when transmitting multiplexed uplink signals. In some examples, the feedback may include an indication of distortion based on power levels and calibration and/or implementation at the repeater. In some examples, the feedback may include an adjustment indication associated with an uplink signal power and/or power configuration of the repeater and/or the UE. In some examples, the feedback may include an indication of the AM-PM conversion parameters of the repeater.

Additionally, aspects disclosed herein provide techniques for reducing or limiting a power imbalance between the combined UE uplink signal and the combined MT uplink signal. For example, disclosed aspects may limit the power of the amplified combined uplink signal ($P_{out}$) to be less than or equal to a maximum output power supported by the repeater ($P_{TXmax,UL}^{NCR}$). Disclosed aspects may also limit the amplification gain applied to the received UE uplink signal. In some examples, the limit on the amplification gain may be applied regardless of whether the repeater is multiplexing the received UE uplink signal with an MT uplink signal. Disclosed aspects may also limit the difference in the power spectral density (PSD) associated with the combined UE uplink signal and the PSD associated with the combined MT uplink signal to satisfy a PSD threshold (e.g., the difference is less than or equal to the PSD threshold).

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a base station, including: obtaining a first uplink communication including a first uplink signal multiplexed with a second uplink signal, the first uplink signal associated with a UE and the second uplink signal associated with a repeater; and providing a multiplexing configuration based in part on at least one of a phase distortion and a power mismatch associated with the first uplink communication.

Aspect 2 is the method of aspect 1, further including that the multiplexing configuration indicates a time-division multiplexing configuration at the repeater.

Aspect 3 is the method of any of aspects 1 and 2, further including: obtaining a second uplink communication including a third uplink signal being time-division multiplexed with a fourth uplink signal based on the multiplexing configuration, the third uplink signal being associated with the UE and the fourth uplink signal being associated with the repeater.

Aspect 4 is the method of aspect 1, further including that the multiplexing configuration indicates a dummy signal to multiplex with subsequent uplink signals associated with the UE.

Aspect 5 is the method of any of aspects 1 and 4, further including: obtaining a second uplink communication including a third uplink signal being frequency-division multiplexed with a fourth uplink signal based on the multiplexing configuration, the third uplink signal being associated with the UE and the fourth uplink signal being associated with the dummy signal.

Aspect 6 is the method of any of aspects 1 to 5, further including: obtaining a feedback communication associated with phase distortion for uplink communications, where the multiplexing configuration is based on the feedback communication.

Aspect 7 is the method of any of aspects 1 to 6, further including that the feedback communication includes a phase distortion indication associated with the first uplink communication, and the first uplink communication is obtained prior to the feedback communication in a time-domain.

Aspect 8 is the method of any of aspects 1 to 6, further including that the feedback communication includes a phase distortion indication associated with a second uplink communication, the first uplink communication obtained prior to the second uplink communication in a time-domain.

Aspect 9 is the method of any of aspects 1 to 8, further including that the feedback communication includes a power control adjustment associated with at least one of the UE and the repeater.

Aspect 10 is the method of any of aspects 1 to 9, further including that the power control adjustment is associated with the UE and the multiplexing configuration includes a power configuration associated with the UE.

Aspect 11 is the method of any of aspects 1 to 9, further including that the power control adjustment is associated with the repeater and the multiplexing configuration includes a power configuration associated with the repeater.

Aspect 12 is the method of any of aspects 1 to 11, further including that the feedback communication indicates at least one modeling characteristic associated with amplitude modulation-phase modulation (AM-PM) conversion.

Aspect 13 is the method of any of aspects 1 to 12, further including that the feedback communication includes a category indicator, and the category indicator corresponds to the at least one modeling characteristic.

Aspect 14 is the method of any of aspects 1 to 13, further including: obtaining a second uplink communication including a third uplink signal multiplexed with a fourth uplink signal based in part on the multiplexing configuration, the third uplink signal being associated with a first power level, the fourth uplink signal being associated with a second power level, and a total power level associated with the second uplink communication satisfies a maximum power output threshold.

Aspect 15 is the method of any of aspects 1 to 14, further including that the multiplexing configuration indicates a prioritization rule between the third uplink signal and the fourth uplink signal.

Aspect 16 is the method of any of aspects 1 to 15, further including that the prioritization rule between the third uplink signal and the fourth uplink signal is based on at least one of: the third uplink signal being associated with the UE, the third uplink signal being associated with the repeater, the third uplink signal being associated with an earlier transmission time than the fourth uplink signal in a time-domain, the third uplink signal being associated with an earlier scheduling time than the fourth uplink signal in the time-domain, the third uplink signal being associated with a dynamically scheduled signal and the fourth uplink signal being associated with a semi-statically scheduled signal, and the third uplink signal being associated with a higher prioritization level than the fourth uplink signal.

Aspect 17 is the method of any of aspects 1 to 16, further including that the prioritization rule between the third uplink signal and the fourth uplink signal is at least one of channel-specific, beam-specific, or resource-specific.

Aspect 18 is the method of any of aspects 1 to 17, further including that the multiplexing configuration indicates a minimum gain, and the first power level and the second power level each satisfy the minimum gain.

Aspect 19 is the method of any of aspects 1 to 18, further including that the network entity provides the multiplexing configuration based on a detected power mismatch between the first uplink signal and the second uplink signal.

Aspect 20 is the method of any of aspects 1 to 19, further including that the multiplexing configuration indicates a threshold associated with at least one transmission parameter, the method further comprising: obtaining a report based on a comparison between the threshold and a measurement associated with the at least one transmission parameter.

Aspect 21 is the method of any of aspects 1 to 20, further including that the at least one transmission parameter includes one or more of: a modulation and coding scheme (MCS), a signal-to-noise ratio (SNR), a reference signal received power (RSRP), a radio frequency (RF) power, and an intermediate frequency (IF) power.

Aspect 22 is the method of any of aspects 1 to 21, further including: obtaining a second uplink communication including a third uplink signal multiplexed with a fourth uplink signal based on the multiplexing configuration, the third uplink signal being associated with the UE and the fourth uplink signal being associated with the repeater, where the multiplexing configuration indicates a power control configuration associated with a forwarding operation for the third uplink signal.

Aspect 23 is the method of any of aspects 1 to 22, further including that the power control configuration includes at least one of: a power limit associated with the third uplink signal and the forwarding operation, an amplification limit associated with the third uplink signal and the forwarding operation, an output power adjustment associated with the third uplink signal and the forwarding operation, and a power sharing configuration indicating a fraction of a total power associated with the second uplink communication to allocate to at least one of the third uplink signal and the fourth uplink signal.

Aspect 24 is an apparatus for wireless communication at a base station including at least one memory and at least one processor coupled to the at least one memory and, based at least in part on information stored in the at least one memory, the at least one processor, individually or in any combination, is configured to cause the base station to implement the method of any of aspects 1 to 23.

In aspect 25, the apparatus of aspect 24 further includes at least one antenna coupled to the at least one processor.

In aspect 26, the apparatus of aspect 24 or 25 further includes at least one transceiver coupled to the at least one processor.

Aspect 27 is an apparatus for wireless communication including means for implementing the method of any of aspects 1 to 23.

In aspect 28, the apparatus of aspect 27 further includes at least one antenna coupled to the means to perform the method of any of aspects 1 to 23.

In aspect 29, the apparatus of aspect 27 or 28 further includes at least one transceiver coupled to the means to perform the method of any of aspects 1 to 23.

Aspect 30 is a non-transitory computer-readable storage medium storing computer executable code, where the code, when executed, causes at least one processor to implement the method of any of aspects 1 to 23.

Aspect 31 is a method of wireless communication at a repeater, including: obtaining a first uplink signal associated with a UE; providing a first uplink communication including the first uplink signal multiplexed with a second uplink signal, the second uplink signal being associated with a MT component of the repeater; obtaining a multiplexing configuration based in part on at least one of a phase distortion and a power mismatch associated with the first uplink communication; and providing a second uplink communication based in part on the multiplexing configuration, the second uplink communication including a third uplink signal multiplexed with a fourth uplink signal.

Aspect 32 is the method of aspect 31, further including that the multiplexing configuration indicates a time-division multiplexing configuration, and the third uplink signal being time-division multiplexed with the fourth uplink signal based on the multiplexing configuration.

Aspect 33 is the method of aspect 31, further including that the multiplexing configuration indicates a dummy signal, the third uplink signal being frequency-division multiplexed with the fourth uplink signal, the third uplink signal being associated with the UE, and the fourth uplink signal being associated with the dummy signal.

Aspect 34 is the method of any of aspects 31 to 33, further including: providing a feedback communication associated with phase distortion for uplink communications, and where the multiplexing configuration is based on the feedback communication.

Aspect 35 is the method of any of aspects 31 to 34, further including that the feedback communication includes a phase distortion indication associated with the first uplink communication, and the first uplink communication being provided prior to the feedback communication in a time-domain.

Aspect 36 is the method of any of aspects 31 to 34, further including that the feedback communication includes a phase distortion indication associated with the second uplink communication, the feedback communication being provided prior to the second uplink communication in a time-domain.

Aspect 37 is the method of any of aspects 31 to 36, further including that the feedback communication includes a power control adjustment associated with at least one of the UE and the repeater.

Aspect 38 is the method of any of aspects 31 to 37, further including that the power control adjustment is associated with the UE, the multiplexing configuration includes a power configuration associated with the UE, the method further comprising: forwarding the power configuration to the UE.

Aspect 39 is the method of any of aspects 31 to 37, further including that the power control adjustment is associated with the repeater and the multiplexing configuration includes a power configuration associated with the repeater.

Aspect 40 is the method of any of aspects 31 to 39, further including that the feedback communication indicates at least one modeling characteristic associated with amplitude modulation-phase modulation (AM-PM) conversion.

Aspect 41 is the method of any of aspects 31 to 40, further including that the feedback communication includes a category indicator, and the category indicator corresponds to the at least one modeling characteristic.

Aspect 42 is the method of any of aspects 31 to 41, further including that the third uplink signal being associated with a first power level, the fourth uplink signal being associated with a second power level, and a total power level associated with the second uplink communication satisfies a maximum power output threshold.

Aspect 43 is the method of any of aspects 31 to 42, further including that an amplification gain associated with the third uplink signal satisfies a maximum amplification gain, and a difference between a first PSD and a second PSD satisfying a PSD threshold, the first PSD being associated with the third uplink signal and the second PSD being associated with the fourth uplink signal.

Aspect 44 is the method of any of aspects 31 to 43, further including that the multiplexing configuration indicates a prioritization rule between the third uplink signal and the fourth uplink signal.

Aspect 45 is the method of any of aspects 31 to 44, further including: adjusting the first power level and the second power level based on the prioritization rule.

Aspect 46 is the method of any of aspects 31 to 45, further including that the prioritization rule between the third uplink signal and the fourth uplink signal is based on at least one of: the third uplink signal being associated with the UE, the third uplink signal being associated with the repeater, the third uplink signal being associated with an earlier transmission time than the fourth uplink signal in a time-domain, the third uplink signal being associated with an earlier scheduling time than the fourth uplink signal in the time-domain, the third uplink signal being associated with a dynamically scheduled signal and the fourth uplink signal being associated with a semi-statically scheduled signal, and the third uplink signal being associated with a higher prioritization level than the fourth uplink signal.

Aspect 47 is the method of any of aspects 31 to 46, further including that the prioritization rule between the third uplink signal and the fourth uplink signal is at least one of channel-specific, beam-specific, or resource-specific.

Aspect 48 is the method of any of aspects 31 to 47, further including that the multiplexing configuration indicates a minimum gain, and the first power level and the second power level each satisfy the minimum gain.

Aspect 49 is the method of any of aspects 31 to 48, further including that the multiplexing configuration indicates a threshold associated with at least one transmission parameter, the method further comprising: performing a measurement associated with the at least one transmission parameter; and providing a report when the measurement fails to satisfy the threshold.

Aspect 50 is the method of any of aspects 31 to 49, further including that the at least one transmission parameter includes one or more of: a modulation and coding scheme (MCS), a signal-to-noise ratio (SNR), a reference signal received power (RSRP), a radio frequency (RF) power, and an intermediate frequency (IF) power.

Aspect 51 is the method of any of aspects 31 to 50, further including: performing a measurement associated with at least one transmission parameter; and adjusting at least one of a first power level associated with the third uplink signal and a second power level associated with the fourth uplink signal when the measurement fails to satisfy a threshold associated with the at least one transmission parameter.

Aspect 52 is the method of any of aspects 31 to 51, further including that the multiplexing configuration indicates a power control configuration associated with a forwarding component of the repeater for the third uplink signal, the third uplink signal being associated with the UE and the fourth uplink signal being associated with the MT component.

Aspect 53 is the method of any of aspects 31 to 52, further including that the power control configuration includes at least one of: a power limit associated with the third uplink signal and the forwarding component, an amplification limit associated with the third uplink signal and the forwarding component, an output power adjustment associated with the third uplink signal and the forwarding component, and a power sharing configuration indicating a fraction of a total power associated with the second uplink communication to allocate to at least one of the third uplink signal and the fourth uplink signal.

Aspect 54 is an apparatus for wireless communication at a repeater including at least one processor coupled to at least one memory and, based at least in part on information stored in the at least one memory, the at least one processor, individually or in any combination, is configured to cause the repeater to implement the method any of aspects 31 to 53.

In aspect 55, the apparatus of aspect 54 further includes at least one antenna coupled to the at least one processor.

In aspect 56, the apparatus of aspect 54 or 55 further includes at least one transceiver coupled to the at least one processor.

Aspect 57 is an apparatus for wireless communication including means for implementing the method of any of aspects 31 to 53.

In aspect 58, the apparatus of aspect 57 further includes at least one antenna coupled to the means to perform the method of any of aspects 31 to 53.

In aspect 59, the apparatus of aspect 57 or 58 further includes at least one transceiver coupled to the means to perform the method of any of aspects 31 to 53.

Aspect 60 is a non-transitory computer-readable storage medium storing computer executable code, where the code, when executed, causes at least one processor to implement the method of any of aspects 31 to 53.

What is claimed is:

1. An apparatus for wireless communication at a repeater, comprising:
    at least one memory; and
    at least one processor coupled to the at least one memory and, based at least in part on information stored in the at least one memory, the at least one processor is configured to cause the repeater to:
        obtain a first uplink signal associated with a user equipment (UE);
        provide a first uplink communication including the first uplink signal multiplexed with a second uplink signal, the second uplink signal being associated with a mobile termination (MT) component of the repeater;
        obtain a multiplexing configuration based in part on at least one of a phase distortion or a power mismatch associated with the first uplink communication; and
        provide a second uplink communication based in part on the multiplexing configuration, the second uplink communication including a third uplink signal multiplexed with a fourth uplink signal, wherein the multiplexing configuration indicates a dummy signal, the third uplink signal being frequency-division multiplexed with the fourth uplink signal, the third uplink signal being associated with the UE, and the fourth uplink signal being associated with the dummy signal.

2. The apparatus of claim 1, wherein the repeater comprises a network-controlled repeater (NCR), and further comprising:
    at least one antenna coupled to the at least one processor, wherein the at least one processor is further configured to cause the NCR to:
        provide a feedback communication associated with the phase distortion for uplink communications, and wherein the multiplexing configuration is based on the feedback communication.

3. The apparatus of claim 2, wherein the feedback communication includes a phase distortion indication associated with the first uplink communication, and the first uplink communication being provided prior to the feedback communication in a time-domain.

4. The apparatus of claim 2, wherein the feedback communication includes a phase distortion indication associated with the second uplink communication, the feedback communication being provided prior to the second uplink communication in a time-domain.

5. The apparatus of claim 2, wherein the feedback communication includes a power control adjustment associated with at least one of the UE or the NCR.

6. The apparatus of claim 5, wherein the power control adjustment is associated with the UE, the multiplexing configuration includes a power configuration associated with the UE, and the at least one processor is further configured to cause the repeater to:
   forward the power configuration to the UE.

7. The apparatus of claim 5, wherein the power control adjustment is associated with the repeater and the multiplexing configuration includes a power configuration associated with the NCR.

8. The apparatus of claim 5, wherein the feedback communication indicates at least one modeling characteristic associated with amplitude modulation-phase modulation (AM-PM) conversion.

9. The apparatus of claim 8, wherein the feedback communication includes a category indicator, and the category indicator corresponds to the at least one modeling characteristic.

10. The apparatus of claim 1, wherein the third uplink signal being associated with a first power level, the fourth uplink signal being associated with a second power level, and a total power level associated with the second uplink communication satisfies a maximum power output threshold.

11. The apparatus of claim 10, wherein an amplification gain associated with the third uplink signal satisfies a maximum amplification gain, and a difference between a first power spectral density (PSD) and a second PSD satisfying a PSD threshold, the first PSD being associated with the third uplink signal and the second PSD being associated with the fourth uplink signal.

12. The apparatus of claim 11, wherein the multiplexing configuration indicates a prioritization rule between the third uplink signal and the fourth uplink signal.

13. The apparatus of claim 12, wherein the at least one processor is further configured to cause the repeater to:
   adjust the first power level and the second power level based on the prioritization rule.

14. The apparatus of claim 12, wherein the prioritization rule between the third uplink signal and the fourth uplink signal is based on at least one of:
   the third uplink signal being associated with the UE,
   the third uplink signal being associated with the repeater,
   the third uplink signal being associated with an earlier transmission time than the fourth uplink signal in a time-domain,
   the third uplink signal being associated with an earlier scheduling time than the fourth uplink signal in the time-domain,
   the third uplink signal being associated with a scheduled signal and the fourth uplink signal being associated with a semi-statically scheduled signal, or
   the third uplink signal being associated with a higher prioritization level than the fourth uplink signal.

15. The apparatus of claim 12, wherein the prioritization rule between the third uplink signal and the fourth uplink signal is channel-specific, beam-specific, or resource-specific.

16. The apparatus of claim 11, wherein the multiplexing configuration indicates a minimum gain, and the first power level and the second power level each satisfy the minimum gain.

17. The apparatus of claim 1, wherein the multiplexing configuration indicates a threshold associated with at least one transmission parameter, and the at least one processor is further configured to cause the repeater to:
   perform a measurement associated with the at least one transmission parameter; and
   provide a report when the measurement fails to satisfy the threshold.

18. The apparatus of claim 17, wherein the at least one transmission parameter includes one or more of:
   a modulation and coding scheme (MCS),
   a signal-to-noise ratio (SNR),
   a reference signal received power (RSRP),
   a radio frequency (RF) power, and
   an intermediate frequency (IF) power.

19. The apparatus of claim 1, wherein the at least one processor is further configured to cause the repeater to:
   perform a measurement associated with at least one transmission parameter; and
   adjust at least one of a first power level associated with the third uplink signal or a second power level associated with the fourth uplink signal when the measurement fails to satisfy a threshold associated with the at least one transmission parameter.

20. The apparatus of claim 1, wherein the multiplexing configuration indicates a power control configuration associated with a forwarding component of the repeater for the third uplink signal, the third uplink signal being associated with the UE and the fourth uplink signal being associated with the MT component.

21. The apparatus of claim 20, wherein the power control configuration includes at least one of:
   a power limit associated with the third uplink signal and the forwarding component,
   an amplification limit associated with the third uplink signal and the forwarding component,
   an output power adjustment associated with the third uplink signal and the forwarding component, or
   a power sharing configuration indicating a fraction of a total power associated with the second uplink communication to allocate to at least one of the third uplink signal or the fourth uplink signal.

22. A method of wireless communication at a repeater, comprising:
   obtaining a first uplink signal associated with a user equipment (UE);
   providing a first uplink communication including the first uplink signal multiplexed with a second uplink signal, the second uplink signal being associated with a mobile termination (MT) component of the repeater;
   obtaining a multiplexing configuration based in part on at least one of a phase distortion or a power mismatch associated with the first uplink communication; and
   providing a second uplink communication based in part on the multiplexing configuration, the second uplink communication including a third uplink signal multiplexed with a fourth uplink signal, wherein the multiplexing configuration indicates a dummy signal, the third uplink signal being frequency-division multiplexed with the fourth uplink signal, the third uplink signal being associated with the UE, and the fourth uplink signal being associated with the dummy signal.

23. An apparatus for wireless communication at a network entity, comprising:
- at least one memory; and
- at least one processor coupled to the at least one memory and, based at least in part on information stored in the at least one memory, the at least one processor is configured to cause the network entity to:
  - obtain a first uplink communication including a first uplink signal multiplexed with a second uplink signal, the first uplink signal associated with a user equipment (UE) and the second uplink signal associated with a repeater; and
  - provide a multiplexing configuration based in part on at least one of a phase distortion or a power mismatch associated with the first uplink communication, wherein the multiplexing configuration indicates a dummy signal to multiplex with subsequent uplink signals associated with the UE.

24. The apparatus of claim 23, wherein the repeater comprises a network-controlled repeater (NCR), and wherein the multiplexing configuration indicates a time-division multiplexing configuration at the NCR.

25. The apparatus of claim 24, further comprising:
- at least one antenna coupled to the at least one processor, wherein the at least one processor is further configured to cause the network entity to:
  - obtain a second uplink communication including a third uplink signal being time-division multiplexed with a fourth uplink signal based on the multiplexing configuration, the third uplink signal being associated with the UE and the fourth uplink signal being associated with the NCR.

26. The apparatus of claim 23, wherein the at least one processor is further configured to cause the network entity to:
- obtain a second uplink communication including a third uplink signal being frequency-division multiplexed with a fourth uplink signal based on the multiplexing configuration, the third uplink signal being associated with the UE and the fourth uplink signal being associated with the dummy signal.

27. A method of wireless communication at a network entity, comprising:
- obtaining a first uplink communication including a first uplink signal multiplexed with a second uplink signal, the first uplink signal associated with a user equipment (UE) and the second uplink signal associated with a network-controlled repeater (NCR); and
- providing a multiplexing configuration based in part on at least one of a phase distortion or a power mismatch associated with the first uplink communication, wherein the multiplexing configuration indicates a dummy signal to multiplex with subsequent uplink signals associated with the UE.

* * * * *